United States Patent
Yeo et al.

(10) Patent No.: US 12,171,000 B2
(45) Date of Patent: Dec. 17, 2024

(54) METHOD AND APPARATUS FOR TRANSMITTING/RECEIVING CHANNEL STATE INFORMATION IN WIRELESS COMMUNICATION SYSTEM

(71) Applicant: Samsung Electronics Co., Ltd., Gyeonggi-do (KR)

(72) Inventors: Jeongho Yeo, Gyeonggi-do (KR); Cheolkyu Shin, Gyeonggi-do (KR); Hyunseok Ryu, Gyeonggi-do (KR); Jinyoung Oh, Gyeonggi-do (KR); Sungjin Park, Gyeonggi-do (KR); Jonghyun Bang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 303 days.

(21) Appl. No.: 17/606,903

(22) PCT Filed: Apr. 14, 2020

(86) PCT No.: PCT/KR2020/005029
§ 371 (c)(1),
(2) Date: Oct. 27, 2021

(87) PCT Pub. No.: WO2020/222443
PCT Pub. Date: Nov. 5, 2020

(65) Prior Publication Data
US 2022/0232549 A1   Jul. 21, 2022

(30) Foreign Application Priority Data

May 2, 2019  (KR) .................. 10-2019-0051784

(51) Int. Cl.
*H04W 72/20* (2023.01)
*H04L 5/00* (2006.01)
*H04W 72/56* (2023.01)

(52) U.S. Cl.
CPC .......... *H04W 72/20* (2023.01); *H04L 5/0048* (2013.01); *H04L 5/0057* (2013.01); *H04W 72/56* (2023.01)

(58) Field of Classification Search
None
See application file for complete search history.

(56) References Cited

U.S. PATENT DOCUMENTS

| 10,624,076 B2 | 4/2020 | Kim et al. |
| 2018/0049220 A1 | 2/2018 | Patil et al. |

(Continued)

FOREIGN PATENT DOCUMENTS

| CN | 109075825 | 12/2018 |
| CN | 109478991 | 3/2019 |

(Continued)

OTHER PUBLICATIONS

European Search Report dated Apr. 22, 2022 issued in counterpart application No. 20798386.7-1213, 8 pages.

(Continued)

*Primary Examiner* — Otis L Thompson, Jr.
(74) *Attorney, Agent, or Firm* — The Farrell Law Firm, P.C.

(57) ABSTRACT

The present disclosure relates to a communication technique for converging an IoT technology with a 5G communication system for supporting a higher data transfer rate beyond the 4G system, and a system therefor. The present disclosure may be applied to intelligent services (for example, smart homes, smart buildings, smart cities, smart cars or connected cars, health care, digital education, retail, security and safety related services, etc.) on the basis of 5G communication technologies and IoT-related technologies. Further, the pres- (Continued)

ent disclosure may be applied to a method and apparatus for transmitting/receiving channel state information in a communication system.

16 Claims, 35 Drawing Sheets

(56) References Cited

U.S. PATENT DOCUMENTS

| | | | |
|---|---|---|---|
| 2019/0239203 | A1 | 8/2019 | Chae |
| 2019/0254091 | A1 | 8/2019 | Kim et al. |
| 2020/0177353 | A1 | 6/2020 | Ding et al. |
| 2021/0218511 | A1* | 7/2021 | Zhang .................. H04L 5/0048 |
| 2022/0015067 | A1 | 1/2022 | Li |
| 2022/0030598 | A1 | 1/2022 | Li |
| 2022/0182866 | A1* | 6/2022 | Lee ...................... H04B 17/318 |

FOREIGN PATENT DOCUMENTS

| | | |
|---|---|---|
| CN | 109495232 | 3/2019 |
| CN | 109565853 | 4/2019 |
| CN | 109644111 | 4/2019 |
| CN | 109644455 | 4/2019 |
| CN | 109691146 | 4/2019 |
| EP | 3 927 008 | 12/2021 |
| KR | 10-1927366 | 12/2018 |
| KR | 10-2020-0036693 | 4/2020 |
| KR | 10-2020-0036702 | 4/2020 |
| KR | 10-2020-0036717 | 4/2020 |
| KR | 10-2020-0036725 | 4/2020 |
| KR | 1020210099170 | 8/2021 |
| WO | WO 2020/192766 | 10/2020 |

OTHER PUBLICATIONS

PCT/ISA/210 Search Report issued on PCT/KR2020/005029, Jul. 23, 2020, pp. 5.
PCT/ISA/237 Written Opinion issued on PCT/KR2020/005029, Jul. 23, 2020, pp. 3.
Intel Corporation, 'Physical Layer Procedures for Nr V2X Sidelink Design', R1-1903450, 3GPP TSG RAN WG1 RAN1#96, Feb. 27, 2019, pp. 16.
LG Electronics, 'Discussion on physical layer procedures for NR sidelink', R1-1905443, 3GPP TSG RAN WG1 Meeting #96bis, Apr. 3, 2019, pp. 14.
LG Electronics, 'Discussion on physical layer structure for NR sidelink', R1-1905437, 3GPP TSG RAN WG1 #96bis, Apr. 3, 2019, pp. 20.
NTT Docomo, Inc., 'NR Sidelink Physical Layer Structure', R1-1905421, 3GPP TSG RAN WG1 #96bis, Apr. 3, 2019, pp. 12.
Intel Corporation, "Sidelink Physical Structure for NR V2X Communication", R1-1904294, 3GPP TSG RAN WG1 RAN1#96bis, Apr. 8-12, 2019, 16 pages.
Intel Corporation, "Physical Layer Procedures for NR V2X Sidelink Design", R1-1903450, 3GPP TSG RAN WG1 RAN1#96, Feb. 25-Mar. 1, 2019, 14 pages.
Chinese Office Action dated Dec. 25, 2023 issued in counterpart application No. 202080032758.7, 23 pages.
Huawei, HiSilicon, "Sidelink Physical Layer Procedures for NR V2X", R1-1903944, 3GPP TSG RAN WG1 Meeting #96bis, Apr. 8-12, 2019, 17 pages.
Intel Corporation, "Design of Physical Layer Procedures for NR V2X Sidelink Communication", R1-1904299, 3GPP TSG RAN WG1 RAN1#96bis, Apr. 8-12, 2019, 11 pages.
Korean Office Action dated Jun. 27, 2024 issued in counterpart application No. 10-2019-0051784, 12 pages.
Chinese Office Action dated Aug. 31, 2024 issued in counterpart application No. 202080032758.7, 11 pages.

* cited by examiner

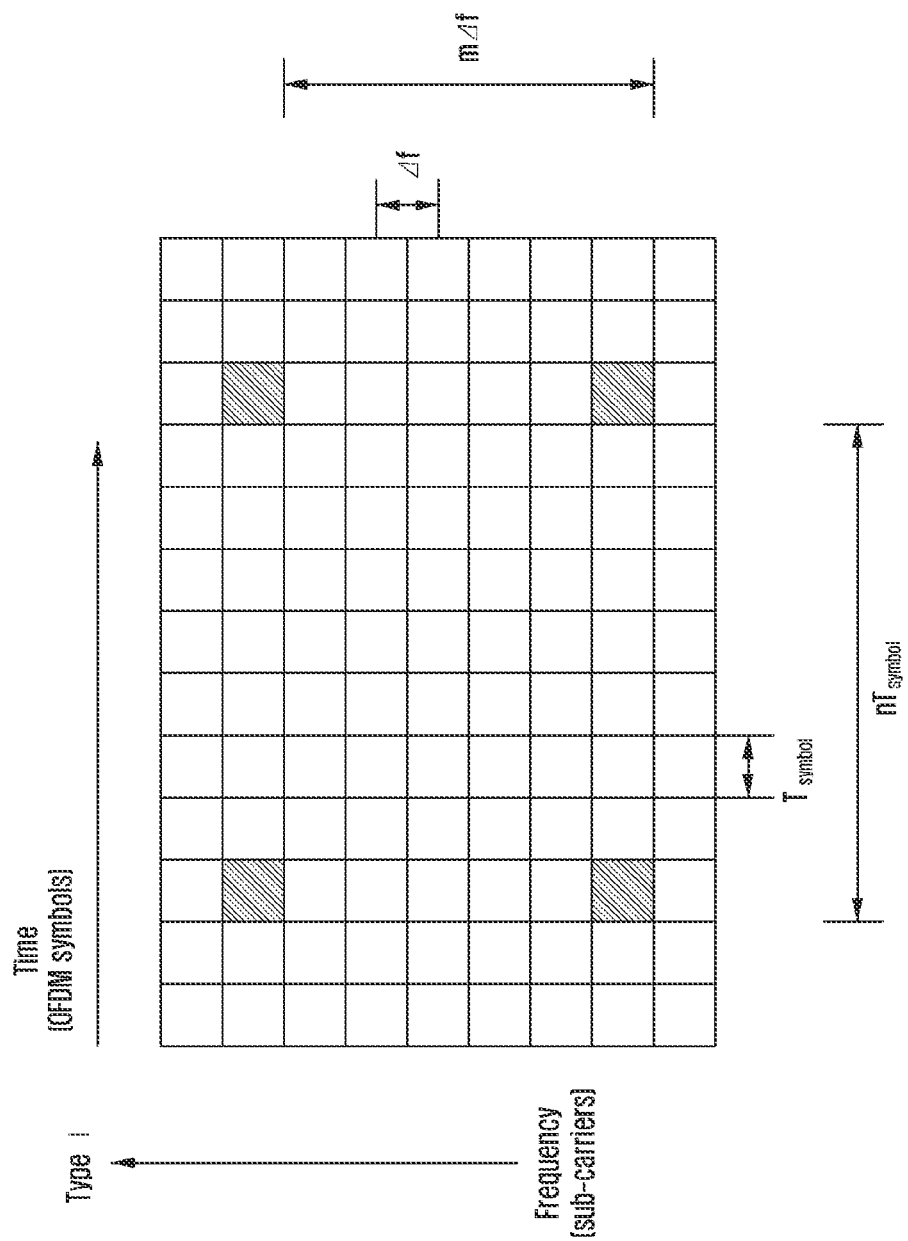

METHOD AND APPARATUS FOR TRANSMITTING/RECEIVING CHANNEL STATE INFORMATION IN WIRELESS COMMUNICATION SYSTEM

PRIORITY

This application is a National Phase Entry of PCT International Application No. PCT/KR2020/005029, which was filed on Apr. 14, 2020, and claims priority to Korean Patent Application No. 10-2019-0051784, which was filed on May 2, 2019, the content of each of which is incorporated herein by reference.

TECHNICAL FIELD

The disclosure relates to a wireless communication system and, more specifically, to a method and an apparatus for transmitting/receiving relevant signals and physical channels in order to exchange channel state information of a sidelink. More specifically, the disclosure relates to a method for configuring control information and a method and an apparatus for mapping and transmitting/receiving channel state information, when a terminal transmits control information and a reference signal through a sidelink, and when another terminal measures a channel from the reference signal and transfers a channel measurement result to the terminal that has transmitted the reference signal.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

DISCLOSURE OF INVENTION

Technical Problem

In a wireless communication system (particularly new radio (NR) system), signals may be transmitted/received between terminals through a sidelink. For example, a terminal may transmit sidelink control information, data, and the like to another terminal. If the transmitter is aware of the channel state between the transmitter and the receiver in connection with such a communication method using a sidelink, the transmitter may transmit signals to the receiving terminal after optimally selecting a scheduling parameter, such as MCS or the number of frequency resources, according to the channel. This may be similar to a case of data communication using a downlink and an uplink between a base station and a terminal, in which the terminal observes a reference signal from the base station, discovers the channel state of the downlink, and transfers channel state information (CSI) to the base station. That is, the transmitting terminal may transmit a reference signal to the receiving terminal through the sidelink, and the receiving terminal may measure the channel state of the sidelink from the transmitted reference signal and may transmit the measured channel state information to the transmitting terminal. In such a situation, the disclosure provides a method for transferring indication information instructing a transmission of channel state information, indication information indicating that channel state information is included, and the like, and a method and an apparatus for determining which resource is to be used to transmit/receive channel state information, thereby facilitating exchange of channel state information through the sidelink.

Solution to Problem

An embodiment of the disclosure for solving the above-mentioned problems may provide a method performed by a first terminal in a wireless communication system, the method including: obtaining channel state information (CSI); transmitting a physical sidelink control channel (PSCCH) including sidelink control information (SCI) to a second terminal; and transmitting a physical sidelink shared channel (PSSCH) including the CSI and data received from a higher layer to the second terminal, wherein the SCI includes quality of service (QOS) information and mapping information associated with the CSI and the data, and wherein the QoS information is determined based on whether the CSI is transmitted through the PSSCH.

In addition, an embodiment of the disclosure may provide a first terminal of a wireless communication system, the first terminal including: a transceiver; and a controller configured to perform control to obtain channel state information (CSI), transmit a physical sidelink control channel (PSCCH) including sidelink control information (SCI) to a second terminal via the transceiver, and transmit a physical sidelink shared channel (PSSCH) including the CSI and data received from a higher layer to the second terminal via the transceiver, wherein the SCI includes quality of service (QOS) information and mapping information associated with the CSI and the data, and wherein the QoS information is determined based on whether the CSI is transmitted through the PSSCH.

In addition, an embodiment of the disclosure may provide a method performed by a second terminal in a wireless communication system, the method including: transmitting a channel state information (CSI)-reference signal (RS) to a first terminal; receiving a physical sidelink control channel (PSCCH) including sidelink control information (SCI) from the first terminal; and receiving a physical sidelink shared channel (PSSCH) including the CSI and data, based on the SCI, from the first terminal, wherein the SCI includes quality of service (QOS) information and mapping information associated with the CSI and the data, and wherein the QoS information is determined based on whether the CSI is transmitted through the PSSCH.

In addition, an embodiment of the disclosure may provide a second terminal of a wireless communication system, the second terminal including: a transceiver; and a controller configured to perform control to transmit a channel state information (CSI)-reference signal (RS) to a first terminal via the transceiver, receive a physical sidelink control channel (PSCCH) including sidelink control information (SCI) from the first terminal via the transceiver, and receive a physical sidelink shared channel (PSSCH) including the CSI and data, based on the SCI, from the first terminal via the transceiver, wherein the SCI includes quality of service (QOS) information and mapping information associated with the CSI and the data, and wherein the QoS information is determined based on whether the CSI is transmitted through the PSSCH.

Advantageous Effects of Invention

An embodiment of the disclosure may provide a method and an apparatus for transmitting/receiving channel state information in a communication. In addition, an embodiment of the disclosure may provide a method and an apparatus for transmitting/receiving channel state information through a sidelink.

BRIEF DESCRIPTION OF DRAWINGS

FIG. 5D illustrates an example of time and frequency intervals between reference signals according to an embodiment of the disclosure;

MODE FOR THE INVENTION

Figure 1:
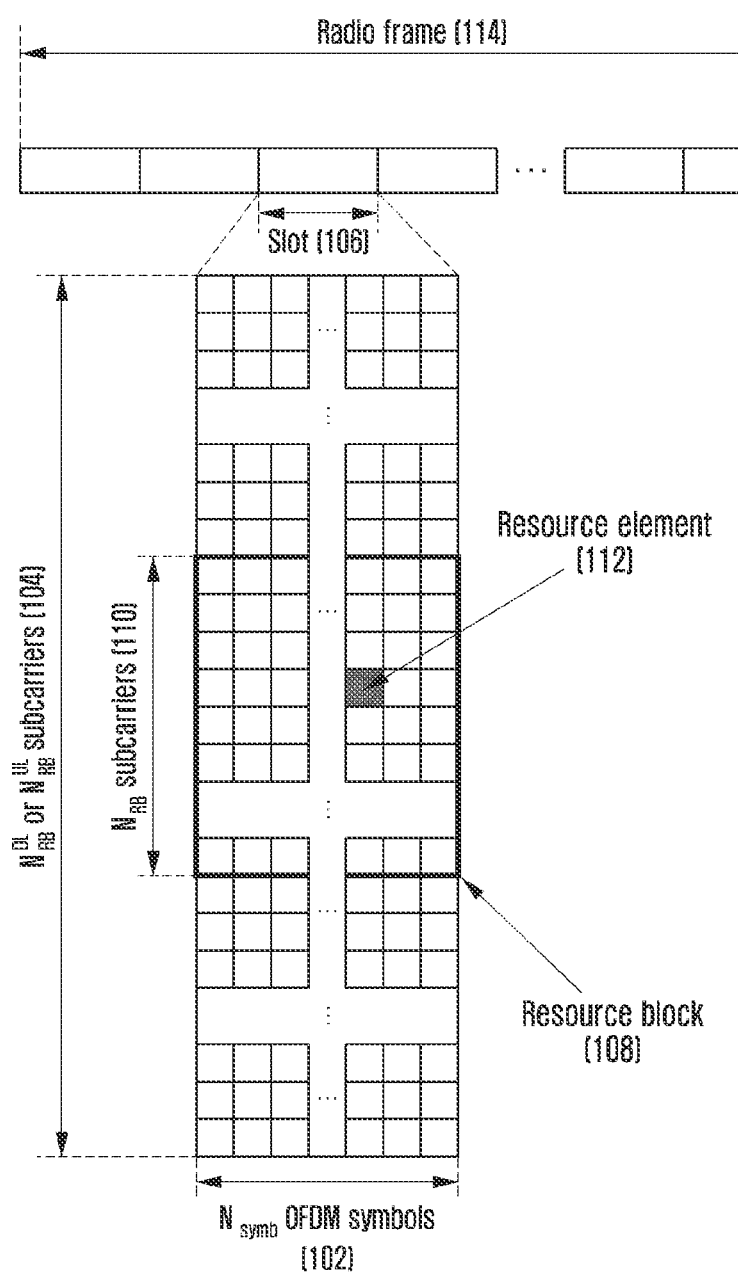
FIG. 1 illustrates a basic structure of a time-frequency domain, which is a radio resource domain in which data or a control channel is transmitted in a downlink or uplink in an NR system according to an embodiment of the disclosure.

New radio access technology (NR), which is a new 5G communication scheme, is designed to enable various services to be freely multiplexed in time and frequency resources. Accordingly, in the NR system, a waveform/numerology, a reference signal, and the like may be dynamically or freely allocated according to the needs of a corresponding service. In order to provide an optimal service to a terminal in wireless communication, it is required to perform data transmission optimized based on measurements of channel quality and interference. Accordingly, it is essential to accurately measure a channel state. However, unlike 4G communication for which the channel and interference characteristics are dramatically changed depending on a frequency resource, the channel and interference characteristics are dramatically changed depending on a service in a case of a 5G channel. Accordingly, subset support in a frequency resource group (FRG) dimension may be required in order to separately measure channel and interference characteristics for each frequency resource. Meanwhile, the types of services supported in the NR system may be categorized into enhanced mobile broadband (eMBB), massive machine type communications (mMTC), and ultra-reliable and low-latency communications (URLLC). The eMBB may be a service that targets high-speed a transmission of high-capacity data. The mMTC may be a service that targets minimizing power consumption by a terminal and access of multiple terminals. The URLLC may be a service that targets high-reliability and low-latency. Different requirements may be applied depending on the type of service applied to a terminal.

As described above, a plurality of services may be provided to a user in a communication system, and in order to provide the plurality of services to a user, there is a desire for a method and apparatus for providing respective services in the same time interval.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has evolved into a broadband wireless communication system that provides a high speed and high quality packet data service, like the communication standards of, for example, high speed packet access (HSPA), long term evolution (LTE or evolved universal terrestrial radio access (E-UTRA)), and LTE-advanced (LTE-A) of 3GPP, high rate packet data (HRPD) and ultra-mobile broadband (UMB) of 3GPP2, 802.16e of IEEE, and the like, departing from the early stage of providing only voice-oriented services. In addition, a communication standard of 5G or new radio (NR) is being made in connection with a 5G wireless communication system.

An NR system, which is a representative example of the broadband wireless communication systems, adopts an orthogonal frequency division multiplexing (OFDM) scheme in the downlink (DL) and in the uplink. More specifically, a cyclic-prefix OFDM (CP-OFDM) scheme is employed in the DL, and a discrete Fourier transform spreading OFDM (DFT-S-OFDM) scheme together with the CP-OFDM are employed in the uplink. The uplink refers to a radio link through which a terminal (user equipment (UE)) or a mobile station (MS) transmits data or control signals to a base station (eNode or BS). The downlink refers to a radio link through which a base station transmits data or control signals to a terminal. In multiple access schemes as described above, time-frequency resources, on which data or control information is to be carried to each user, are usually allocated and managed to satisfy orthogonality, i.e., not to overlap each other, so that data or control information for each user is distinguished.

If decoding failure occurs in the initial transmission, the NR system employs a hybrid automatic repeat request (HARQ) scheme for retransmitting the corresponding data in a physical layer. A HARQ scheme is designed to operate in such a way that if a receiver fails to accurately decode data, the receiver transmits information, that is, a negative acknowledgement (NACK), indicative of the decoding failure, thus enabling the transmitter to retransmit the corresponding data in the physical layer. The receiver may combine data retransmitted from the transmitter and previous data, decoding of which has failed, whereby data reception performance may increase. In addition, if the receiver accurately decodes data, the receiver transmits information (ACK) indicating that decoding is successfully executed, and thus enables the transmitter to transmit new data.

FIG. 1 illustrates a basic structure of a time-frequency domain, which is a radio resource domain in which data or a control channel is transmitted in a downlink or uplink in an NR system.

Referring to FIG. 1, the horizontal axis represents a time domain, and the vertical axis represents a frequency domain. The minimum transmission unit in the time domain is an OFDM symbol. $N_{symb}$ OFDM symbols 102 configure one slot 106. The length of the subframe is defined as 1.0 ms, and a radio frame 114 is defined as 10 ms. The minimum transmission unit in the frequency domain is a subcarrier, and the entire system transmission bandwidth includes a total of New subcarriers 104.

The basic resource unit in the time-frequency domain is a resource element (RE) 112, which may be indicated by an OFDM symbol index and a subcarrier index. A resource block (RB) 108 {or physical resource block (PRB)} may be defined by consecutive $N_{symb}$ OFDM symbols 102 in the time domain and consecutive $N_{RB}$ subcarriers 110 in the frequency domain. Therefore, one RB 108 may include $N_{symb} \times N_{RB}$ REs 112. In general, the minimum transmission unit of data is an RB. The NR system generally shows $N_{symb}=14$ and $N_{RB}=12$, and $N_{BW}$ and $N_{RB}$ may be proportional to the bandwidth of a system transmission band. The data rate may increase in proportion to the number of RBs scheduled to the terminal.

In the NR system, in a case of a FDD system in which downlink and uplink are operated at separate frequencies, the downlink transmission bandwidth and the uplink transmission bandwidth may be different from each other. The channel bandwidth indicates an RF bandwidth corresponding to the system transmission bandwidth. Table 1 and Table 2 show part of a correspondence among a system transmission bandwidth, a subcarrier spacing, and a channel bandwidth defined in the NR system at a frequency bandwidth below 6 GHz and at a frequency bandwidth above 6 GHZ, respectively. For example, in an NR system having a 100 MHz channel bandwidth at a 30 KHz subcarrier spacing, the transmission bandwidth is configured by 273 RBs. In the following, N/A may be a combination of a bandwidth and a subcarrier, which is not supported by the NR system.

TABLE 1

| Configuration of frequency range 1 (FR1) | | | | | | | |
|---|---|---|---|---|---|---|---|
| Channel bandwidth $BW_{Channel}$ [MHz] | Subcarrier spacing | 5 MHz | 10 MHz | 20 MHz | 50 MHz | 80 MHz | 100 MHz |
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

Configuration of frequency range 2 (FR2)

| Channel bandwidth $BW_{Channel}$ [MHz] | Subcarrier spacing | 50 MHz | 100 MHz | 200 MHz | 400 MHz |
|---|---|---|---|---|---|
| Transmission bandwidth configuration $N_{RB}$ | 60 kHz | 66 | 132 | 264 | N/A |
| | 120 kHz | 32 | 66 | 132 | 264 |

In the NR system, the frequency range may be divided and defined as FR1 and FR2.

TABLE 3

| Frequency range designation | Corresponding frequency range |
|---|---|
| FR1 | 450 MHz-7125 MHz |
| FR2 | 24250 MHz-52600 MHz |

In the above, the ranges of FR1 and FR2 may be differently changed and applied. For example, the frequency range of FR1 may be changed from 450 MHz to 6000 MHz and applied.

In the NR system, scheduling information for downlink data or uplink data may be transmitted from a base station to a terminal via downlink control information (DCI). The DCI is defined according to various formats, and the DCI may indicate whether it is scheduling information (UL grant) for uplink data or scheduling information (DL grant) for downlink data, whether it is a compact DCI having a small amount of control information, whether or not spatial multiplexing using multiple antennas is applied, or whether or not DCI for power control is applied, according to each format. For example, DCI format 1-1, which is scheduling control information (DL grant) for downlink data, may include at least one of the following pieces of control information.

Carrier indicator: indicates a carrier frequency at which transmission is performed.

DCI format indicator: indicates whether the corresponding DCI is for downlink or for uplink.

Bandwidth part (BWP) indicator: indicates a BWP in which transmission is performed.

Frequency domain resource assignment: indicates an RB of the frequency domain, which is allocated for data transmission. A resource is determined according to a system bandwidth and a resource allocation scheme.

Time domain resource assignment: indicates a slot and an OFDM symbol of the slot, in which a data-related channel is to be transmitted.

VRB-to-PRB mapping: indicates a mapping scheme by which a virtual RB (VRB) index is mapped to a physical RB (PRB) index.

Modulation and coding scheme (MCS): indicates a modulation scheme used for data transmission and the size of a transport block, which is data to be transmitted.

HARQ process number: indicates a process number of HARQ.

New data indicator: indicates whether HARQ transmission is initial transmission or retransmission.

Redundancy version: indicates the redundancy version of HARQ.

Transmit power control (TPC) command for physical uplink control channel (PUCCH): indicates a TPC command for the PUCCH serving as an uplink control channel.

In a case of data transmission through PUSCH, time-domain resource assignment may be performed based on information about a slot in which a PUSCH is transmitted, a start symbol position S in the corresponding slot, and the number L of symbols to which the PUSCH is mapped. In the above, S may be a relative position from the start of a slot, L may be the number of consecutive symbols, and S and L may be determined based on a start and length indicator value (SLIV) defined as follows.

$$(L-1) \leq 7 \text{ then}$$
$$SLIV = 14 \cdot (L-1) + S$$
$$\text{else}$$
$$SLIV = 14 \cdot (14-L+1) + (14-1-S)$$

In the NR system, a terminal may receive, through RRC configuration, an SLIV value, a PUSCH mapping type, and information on a slot in which the PUSCH is transmitted, in connection with one row (e.g., the information may be configured in the form of Table). Thereafter, for the time-domain resource assignment of the DCI, by indicating an index value in the table configured as above, a base station may transmit, to a terminal, the SLIV value, the PUSCH mapping type, and the information on the slot in which the PUSCH is transmitted.

In the NR system, the PUSCH mapping type is defined by type A and type B. In the PUSCH mapping type A, the first symbol among DMRS symbols is located at the second or the third OFDM symbol in a slot. In the PUSCH mapping type B, the first symbol among DMRS symbols is located at the first OFDM symbol in a time domain resource assigned via PUSCH transmission.

The PUSCH resource mapping method described above may be applied in a similar manner to downlink data transmission through the PDSCH. In the NR system, the PDSCH mapping type is defined by type A and type B and particularly, in mapping type B, the first symbol among DMRS symbols may be located in the first symbol of the PDSCH.

The DCI may be subjected to a channel coding and modulation process, and may then be transmitted through a physical downlink control channel (PDCCH), which is a downlink physical control channel. In the disclosure, a transmission of control information through a PDCCH or PUCCH may be expressed such that the PDCCH or PUCCH is transmitted. Similarly, a transmission of data through a PUSCH or PDSCH may be expressed such that the PUSCH or PDSCH is transmitted.

Generally, the DCI is scrambled with a specific radio network temporary identifier (RNTI) (or a terminal identifier), independently for each terminal, a cyclic redundancy identify (CRC) is added thereto, and channel coding is performed, whereby each independent PDCCH is configured and transmitted. The PDCCH is mapped and transmitted in a control resource set (CORESET) configured for a terminal.

The downlink data may be transmitted through a physical downlink shared channel (PDSCH) serving as a physical channel for downlink data transmission. The PDSCH may be transmitted after a control channel transmission interval, and scheduling information, such as a specific mapping position and modulation scheme, in the frequency domain may be determined based on DCI transmitted through the PDCCH.

Through an MCS among control information configuring the DCI, a base station may notify a terminal of a modulation scheme applied to a PDSCH to be transmitted, and the size (transport block size (TBS)) of data to be transmitted. In an embodiment, the MCS may be configured by 5 bits or more or fewer bits. The TBS corresponds to the size of data (transport block, TB) to be transmitted by the base station before channel coding for error correction is applied to the data.

In the disclosure, a transport block (TB) may include a medium access control (MAC) header, a MAC control element (CE), one or more MAC service data units (SDUs), and padding bits. Alternatively, the TB may indicate the unit of data, which is delivered from a MAC layer to a physical layer, or an MAC protocol data unit (MAC PDU).

The modulation schemes supported by the NR system are quadrature phase shift keying (QPSK), 16 quadrature amplitude modulation (16 QAM), 64 QAM, and 256 QAM. Modulation orders ($Q_m$) of the QPSK, 16 QAM, 64 QAM, and 256 QAM correspond to 2, 4, 6, and 8, respectively. That is, 2 bits per symbol in a case of QPSK modulation, 4 bits per symbol in a case of 16 QAM modulation, 6 bits per symbol in a case of 64 QAM modulation, and 8 bits per symbol in a case of 256 QAM modulation may be transmitted.

Figure 2:
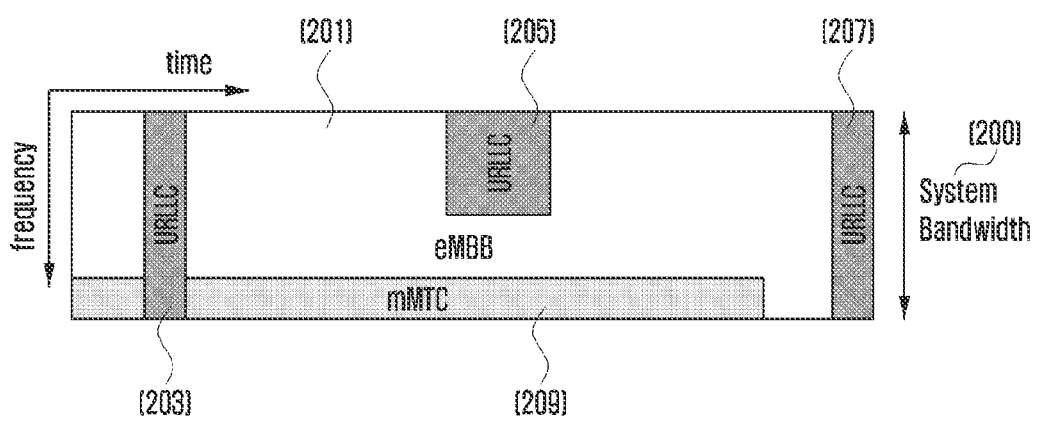
FIG. 2 illustrates an aspect in which pieces of data for eMBB, URLLC, and mMTC, which are services considered in a 5G or NR system, are allocated in frequency-time resources according to an embodiment of the disclosure.
Figure 3A:
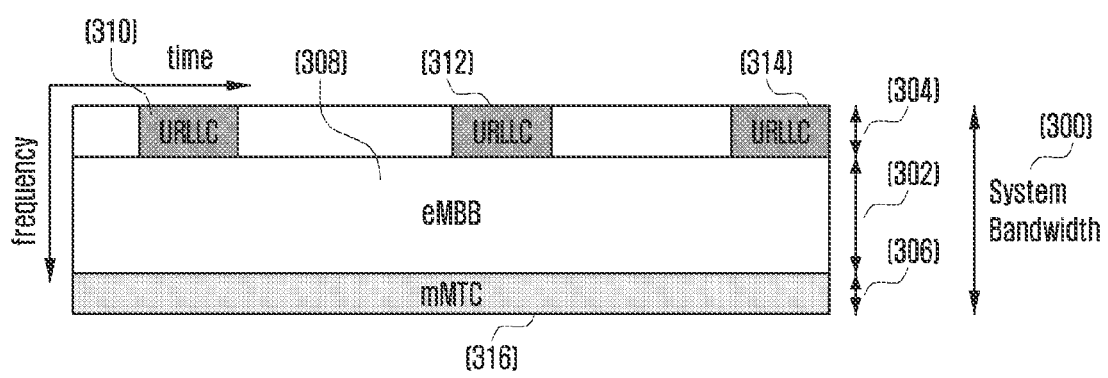
FIG. 3A illustrates an aspect in which pieces of data for eMBB, URLLC, and mMTC, which are services considered in a 5G or NR system, are allocated in frequency-time resources according to an embodiment of the disclosure.

FIG. 2 illustrates an aspect in which pieces of data for eMBB, URLLC, and mMTC, which are services considered in the 5G or NR system, are allocated in frequency-time resources, and FIG. 3A illustrates an aspect in which pieces of data for eMBB, URLLC, and mMTC, which are services considered in the 5G or NR system, are allocated in frequency-time resources.

Referring to FIGS. 2 and 3A, there may be presented a scheme in which frequency and time resources are allocated for performing information transmission in each system.

First, FIG. 2 illustrates an aspect in which pieces of data for eMBB, URLLC, and mMTC are allocated in the entire system frequency bandwidth 200. In the middle of allocation and a transmission of eMBB 201 and mMTC 209 in a specific frequency bandwidth, if URLLC data 203, 205, and 207 occur and transmission thereof is thus necessary, the URLLC data 203, 205, and 207 may be transmitted without emptying or transmitting a portion in which the eMBB 201 and the mMTC 209 have been already allocated. Since the URLLC needs to reduce a delay time in the middle of service, URLLC data 203, 205, and 207 may be allocated to a portion of the resource to which the eMBB 201 is allocated, and thus may be transmitted. Of course, in a case where URLLCs are additionally allocated and transmitted in the resource to which the eMBB is allocated, the eMBB data may not be transmitted in an overlapping frequency-time resource, and thus the transmission performance of the eMBB data may be lowered. That is, in the above case, eMBB data transmission failure due to URLLC allocation may occur.

In FIG. 3A, the entire system frequency bandwidth 300 may be divided into sub-bands 302, 304, and 306 and used for a transmission of a service and data therein. Information associated with the sub-band configuration may be predetermined, and the information may be transmitted to a terminal by a base station via higher layer signaling. Alternatively, the information associated with the sub-bands may be divided by a base station or a network node in a predetermined manner and provide services to the terminal without transmitting separate sub-band configuration information. FIG. 3A illustrates that the sub-band 302 is used for a transmission of eMBB data, the sub-band 304 is used for a transmission of URLLC data, and the sub-band 306 is used for a transmission of mMTC data.

Throughout the embodiment, the length of a transmission time interval (TTI) used for URLLC transmission may be shorter than the length of TTI used for eMBB or mMTC transmission. In addition, the response of information related to the URLLC may be transmitted faster than that of eMBB or mMTC, and accordingly information transmission or reception with a low delay is possible. The structures of physical layer channels used for a transmission of the three types of services or data may be different from each other. For example, at least one of the length of a transmission time interval (TTI), the allocation unit of frequency resources, a structure of a control channel, and a data mapping method may be different.

In the above, three types of services and three types of data are assumed and described. Alternatively, an even greater number of types of services and data corresponding thereto may exist, and details of the disclosure may be applied thereto.

In order to explain a method and apparatus proposed in the embodiment, the terms "physical channel" and "signal", pertaining to the NR system may be used. However, details of the disclosure may be applied to a wireless communication system other than the NR system.

In the following description of the disclosure, a detailed description of known functions or configurations incorporated herein will be omitted when the same may make the subject matter of the disclosure rather unclear. The terms that will be used below are terms defined in consideration of the functions in the disclosure, and may differ according to users, intentions of the users, or customs. Therefore, the definitions of the terms should be made based on the contents throughout the specification. Hereinafter, the base station is a subject for allocating resources to a terminal, and may be at least one of a gNode B (gNB), an eNode B (eNB), a Node B, a base station (BS), a radio access unit, a base station controller, or a node on a network. The terminal may include a user equipment (UE), a mobile station (MS), a cellular phone, a smart phone, a computer, or a multimedia system capable of performing a communication function. In the disclosure, downlink (DL) refers to a radio transmission path of a signal transmitted to a terminal by a base station, and uplink (UL) refers to a radio transmission path of a signal transmitted to a base station by a terminal. In addition, an embodiment is described below using an NR system as an example, but an embodiment may be applied to other communication systems having a similar technical background or a similar channel form. In addition, embodiments of the disclosure may be modified without departing from the scope of the disclosure, and may be applied to other communication systems based on a determination by those skilled in the art.

In the disclosure, the terms "physical channel" and "signal" in a prior art may be used interchangeably with "data" or "control signal". For example, a PDSCH is a physical channel through which data is transmitted, but in the disclosure, the PDSCH may be referred to as data.

Hereinafter, in the embodiment, higher layer signaling is a method for transmitting, by a base station, a signal to a terminal by using a downlink data channel of a physical layer or a method for transmitting, by a terminal, a signal to a base station by using an uplink data channel of a physical layer. The higher layer signaling may also be referred to as RRC signaling or MAC control element (CE).

The following embodiment provides a method and apparatus for transmitting or receiving data between a base station and a terminal or between terminals. Here, data may be transmitted from one terminal to a plurality of terminals, or data may be transmitted from one terminal to one terminal. Alternatively, data may be transmitted from a base station to a plurality of terminals. However, the disclosure may be applied to various cases without being limited thereto.

Figure 3B:
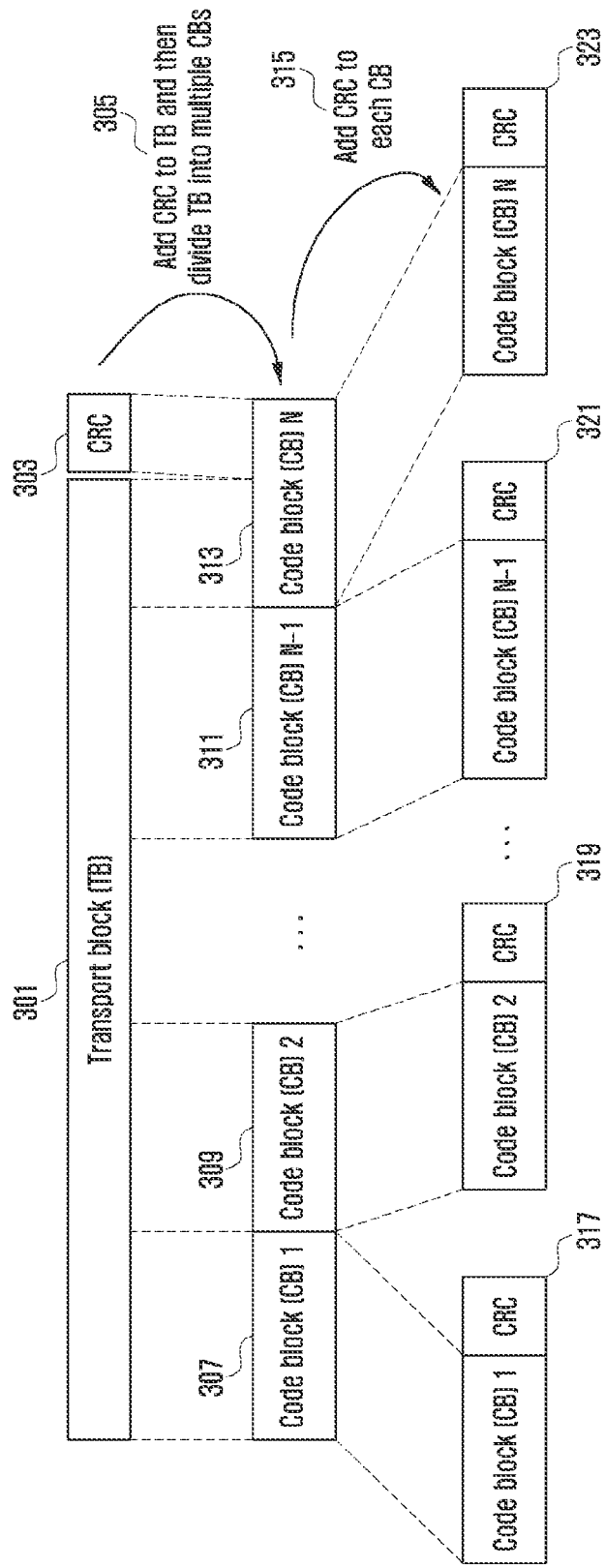
FIG. 3B illustrates a process in which one transport block is divided into a plurality of code blocks and a CRC is added thereto according to an embodiment of the disclosure.

FIG. 3B illustrates a process in which one transport block is divided into multiple code blocks and a CRC is added thereto according to an embodiment of the disclosure.

Referring to FIG. 3B, a CRC 303 may be added to the last part or the first part of one transport block (TB) 301 to be transmitted in an uplink or a downlink. The CRC 303 may have 16 bits, 24 bits, or a pre-fixed number of bits, or may have a variable number of bits depending on channel conditions, and may be used to determine whether channel coding is successful. The TB 301 and a block to which CRC 303 is added may be divided into a plurality of code blocks (CBs) 307, 309, 311, and 313 (indicated by reference numeral 305). Here, the divided code blocks may have a predetermined maximum size, and in this case, the last code block 313 may be smaller in size than those of other code blocks 307, 309, and 311. However, this is only an example, and according to another example, by inserting zeros, random values, or ones to the last code block 313, the length of the last code block 313 may be adjusted to be the same as that of the other code blocks 307, 309, and 311. CRCs 317, 319, 321, and 323 may be added to the divided code blocks, respectively (indicated by reference numeral 315). The CRCs may include 16 bits, 24 bits, or a pre-fixed number of bits, and may be used to determine whether channel coding is successful.

The TB 301 and a cyclic generator polynomial may be used in order to generate the CRC 303, and the cyclic generator polynomial may be defined in various methods. For example, if it is assumed that cyclic generator polynomial gCRC24A (D)=D24+D23+D18+D17+D14+D11+D10+D7+D6+D5+D4+D3+D+1 for a 24-bit CRC and L=24, with respect to TB data $a_0, a_1, a_2, a_3, \ldots a_{A-1}$, CRC $p_0, p_1, p_2, p_3, \ldots, p_{L-1}$ may determine, as $p_0, p_1, p_2, p_3, \ldots, p_{L-1}$, a value in which the remainder becomes zero by dividing $a_0 D^{A+23}+a_1 D^{A+22}+ \ldots +a_{A-1}D^{24}+p_0 D^{23}+p_1 D^{22}+ \ldots +p_{22}D^1+p_{23}$ by the gCRC24A (D). In the above example, the CRC length "L" is assumed to be 24 as an example, but the CRC length "L" may be determined to have different lengths, such as 12, 16, 24, 32, 30, 48, 64, and the like.

Through this process, the CRC is added to the TB, and the TB having CRC added thereto may be divided into N CBs 307, 309, 311, and 313. CRCs 317, 319, 421, and 423 may be added to each of the divided CBs 307, 309, 311, and 313 (indicated by reference numeral 315). The CRCs added to the CBs may have a different length than that of the CRC added to the TB or may use a different cyclic generator polynomial. However, the CRC 303 added to the TB and the CRCs 317, 319, 421, and 423 added to the code blocks may be omitted depending on the type of a channel code to be applied to the code block. For example, if LDPC codes other than turbo codes are applied to code blocks, CRCs 317, 319, 421, and 423 to be inserted for each code block may be omitted.

However, even if the LDPC is applied, the CRCs 317, 319, 321, and 323 may be added to the code block as they are. In addition, CRC may be added or omitted even if a polar code is used.

As described above in FIG. 3B, the maximum length of one code block is determined according to the type of channel coding applied to a TB to be transmitted, and the TB and CRC, which is added to the TB, are divided into code blocks according to the maximum length of the code block.

In the conventional LTE system, CRC for CB is added to the divided CB, data bits and the CRC of the CB are encoded with a channel code, and thus coded bits are determined and a number of bits, which have undergone predetermined rate matching to each of coded bits, may be determined.

The size of TB in the NR system may be calculated through the following operations.

Operation 1: $N'_{RE}$, which is the number of REs assigned to PDSCH mapping in one PRB in the assigned resource, is calculated.

Here, $N'_{RE}$ may be calculated by $N_{sc}^{RB} \cdot N_{symb}^{sh} - N_{DMRS}^{PRB} - N_{oh}^{PRB}$. Here, $N_{sc}^{RB}$ is 12, and $N_{symb}^{sh}$ may represent the number of OFDM symbols allocated to the PDSCH. $N_{DMRS}^{PRB}$ is the number of REs in one PRB occupied by DMRSs of the same CDM group. $N_{oh}^{PRB}$ is the number of REs occupied by the overhead in one PRB, which is configured via higher layer signaling, and may be configured to be one of 0, 6, 12, or 18. Thereafter, $N_{RE}$, which is the total number of REs, allocated to the PDSCH may be calculated. $N_{RE}$ is calculated by $\min(156, N'_{RE}) \cdot n_{PRB}$, and $n_{PRB}$ denotes the number of PRBs allocated to a terminal.

Operation 2: The number of temporary information bits, $N_{info}$, may be calculated by $N_{RE} * R * Q_m * v$. Here, R is a code rate, $Q_m$ is a modulation order, and information of this value may be transferred using an MCS bit field and a table pre-defined in the control information. In addition, v is the number of assigned layers. In a case of $n_{info} \leq 3824$, TBS may be calculated through operation 3 below. Otherwise, TBS may be calculated through operation 4.

Step-3: $N'_{info}$ may be calculated by the equation of $$N'_{info} = \max\left(24, 2^n * \left\lfloor \frac{N_{info}}{2^n} \right\rfloor\right)$$

and $n = \max(3, \lfloor \log_2(N_{info}) - 6 \rfloor)$. TBS may be determined as a value, which is the closest to $N'_{info}$ among values equal to or greater than $N'_{info}$ in Table 4a below.

TABLE 4a

| Index | TBS |
|-------|-----|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |

TABLE 4a-continued

| Index | TBS |
|---|---|
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Operation 4: $N'_{info}$ may be calculated by the equation of $$N'_{info} = \max\left(3840, 2^n \times \text{round}\left(\frac{N_{info} - 24}{2^n}\right)\right)$$

and $n = \lfloor \log_2(N_{info} - 24) \rfloor - 5$. TBS can be determined through a value of $N'_{info}$ and the following [pseudo-code 1].

[Start Pseudo-code 1]
if $R \leq 1/4$ $$TBS = 8 * C * \left\lceil \frac{N'_{info} + 24}{8 * C} \right\rceil - 24, \text{ where } C = \left\lceil \frac{N'_{info} + 24}{3816} \right\rceil$$

else
  if $N_{info}' > 8424$ $$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * \left\lceil \frac{N'_{info} + 24}{8} \right\rceil - 24$$

end if
end if
[End Pseudo-code 1]

In the NR system, if one CB is input to an LDPC encoder, parity bits may be added to the CB and the CB added with the parity bits may be output. The amount of parity bits may differ according to an LDPC base graph. A method of transmitting all parity bits, generated by LDPC coding for a specific input, may be called full buffer rate matching (FBRM), and a method of limiting the number of parity bits that can be transmitted may be called limited buffer rate matching (LBRM). If resources are allocated for data transmission, the output of the LDPC encoder is made using a circular buffer, and bits of the buffer are repeatedly transmitted as many times as the number of the allocated resources, and the length of the circular buffer may be called Neb. If the number of parity bits generated by LDPC coding is N, $N_{cb}$ becomes equal to N in the FBRM method. In the LBRM method, $N_{cb}$ denotes $\min(N, N_{ref})$, $N_{ref}$ is given by $$\frac{TBS_{LBRM}}{C \cdot R_{LBRM}},$$

and $R_{LBRM}$ may be determined to be 2/3. In a method for obtaining the TBS described above, $TBS_{LBRM}$ denotes the maximum number of layers supported by a terminal in the corresponding cell. Further, in order to obtain $TBS_{LBRM}$, regardless of whether the maximum modulation order is configured for the terminal in the corresponding cell, $TBS_{LBRM}$ is assumed to be 64 QAM, and the code rate is assumed to be 948/1024, which is the maximum code rate, $N_{RE}$ is assumed to be $156 \cdot n_{PRB}$, and $n_{PRB}$ may be assumed to be $n_{PRB,LBRM}$, wherein $n_{PRB,LBRM}$ may be given as shown in Table 4b below.

TABLE 4b

| Maximum number of PRBs across all configured BWPs of a carrier | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

The maximum data rate supported by a terminal in the NR system may be determined through Equation 1 below.

[Equation 1]

data rate (in Mbps) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1 - OH^{(j)}) \right)$$

In Equation 1, J may denote the number of carriers bound by carrier aggregation, Rmax=948/1024, $v_{Layers}^{(j)}$ may denote the maximum number of layers, $Q_m^{(j)}$ may denote a maximum modulation order, $f^{(j)}$ may denote a scaling index, and μ may denote a subcarrier spacing. The terminal may report $f^{(j)}$ as one value among 1, 0.8, 0.75, and 0.4, and μ may be given as shown in Table 4c below.

TABLE 4c

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Further, $T_s^{\mu}$ is the average OFDM symbol length, $T_s^{\mu}$ may be calculated to be $$\frac{10^{-2}}{14 \cdot 2^{\mu}},$$

and $N_{PRB}^{BW(j),\mu}$ is the maximum number of RBs in BW (j). $OH^{(j)}$ is an overhead value, and $OH^{(j)}$ may be given as 0.14 in the downlink of FR1 (a band equal to or less than 6 GHZ) and given as 0.18 in the uplink thereof, and may be given as 0.08 in the downlink of FR2 (a band above 6 GHZ) and given as 0.10 in the uplink thereof. Through Equation 1, the maximum data rate in the downlink in a cell having a 100 MHz frequency bandwidth at a 30 kHz subcarrier spacing may be calculated by the following Table 4d.

TABLE 4d

| $f^{(j)}$ | $v_{Layer}^{(j)}$ | $Q_m^{(j)}$ | $R_{max}$ | $N_{PRB}^{BW(j),\mu}$ | $T_s^{\mu}$ | $OH^{(j)}$ | Data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate, measurable by a terminal in the actual data transmission, may be a value obtained by dividing the data amount by a data transmission time. This value may be obtained by dividing TBS by the TTI length in 1 TB transmission or dividing the sum of TBSs by the TTI length in 2 TB transmission. For example, as shown in Table 4d, the maximum actual data rate in downlink in a cell having a 100 MHz frequency bandwidth at a 30 kHz subcarrier spacing may be determined as shown in Table 4e below according to the number of allocated PDSCH symbols.

TABLE 4e

| $N_{symb}^{sh}$ | $N_{DMRS}^{PRB}$ | $N'_{RE}$ | $N_{RE}$ | $N_{info}$ | N | $N'_{info}$ | C | TBS | TTI length (ms) | Data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,408 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the terminal may be identified through Table 4d, and the actual data rate according to the allocated TBS may be identified through Table 4e. Here, the actual data rate may be greater than the maximum data rate depending on scheduling information.

In a wireless communication system, in particular, the new radio (NR) system, data rates supportable by a terminal may be promised between a base station and a terminal. The data rate may be calculated using the maximum frequency band, the maximum modulation order, and the maximum number of layers, which are supported by the terminal. However, the calculated data rate may be different from a value calculated according to a transport block size (TBS) and a TTI length of a transport block (TB) used for actual data transmission.

Accordingly, a case, in which a terminal is allocated with a TBS greater than a value corresponding to a data rate supported by the terminal itself, may occur. In order to prevent this, there may be restrictions on the TBS that may be scheduled according to the data rate supported by the terminal.

In the following, a method associated with channel state information (CSI) reference signal (RS) and reporting (report or reporting) in LTE and LTE-Advanced (LTE-A) systems will be described. In addition to the above signal, in the LTE-A system, muting may be configured to permit terminals within a corresponding cell to receive CSI-RSs, transmitted by another base station, without interference. The muting may be applied in a location in which the CSI-RSs can be transmitted, and in general, a terminal may receive a traffic signal while skipping a radio resource. In the LTE-A system, the muting may be referred to as a zero-power (ZP) CSI-RS. The muting, due to the characteristics thereof, is applied to the location of the CSI-RS and this is because signal transmission occurs with a transmission power of 0 or a power close to 0 at the location.

Figure 4A:
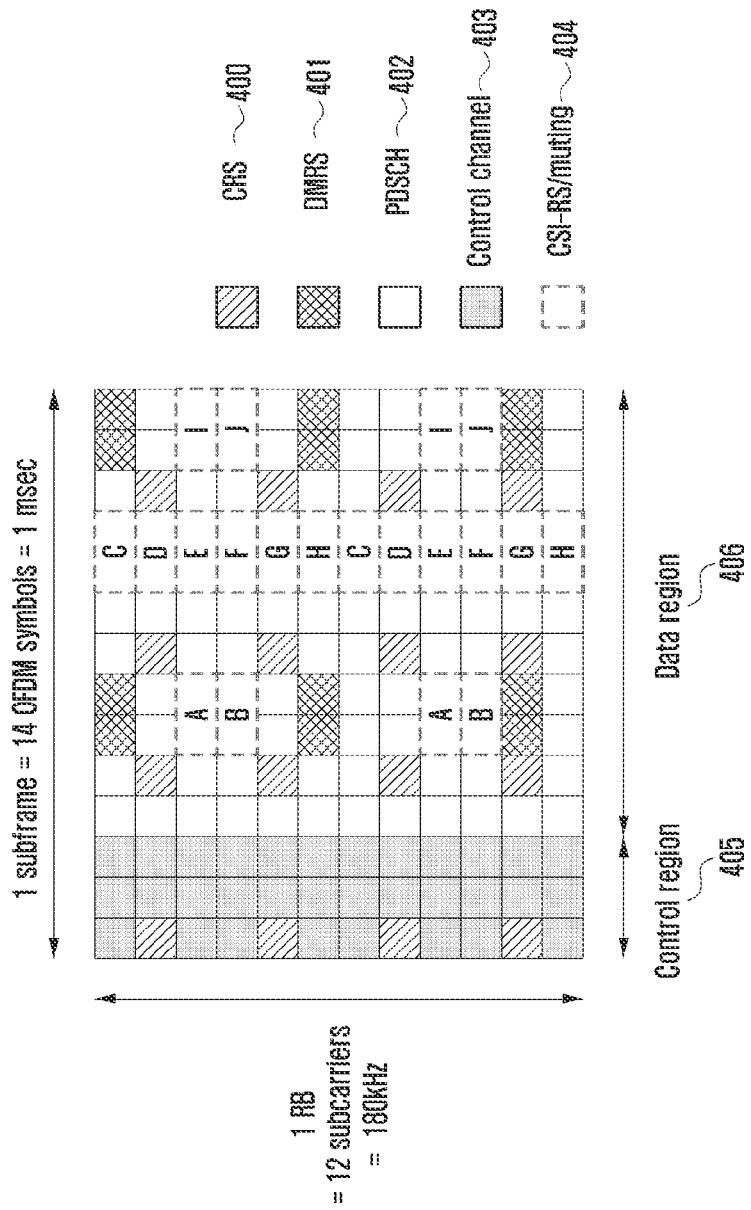
FIG. 4A illustrates a method associated with a channel state information (CSI) reference signal (RS) and reporting in an LTE and LTE-Advanced (LTE-A) system according to an embodiment of the disclosure.

Referring to FIG. 4A, the RB may be divided into a control region 405 and a data region 406. The size of the time axis of the control region 405 may vary, and when the length of the control region 405 is changed, the length of the data region 406 may also change. Reference numeral 400 denotes a resource region to which CRS may be mapped, reference numeral 401 denotes a resource region to which DMRS may be mapped, reference numeral 402 denotes a resource region to which PDSCH may be mapped, and reference numeral 403 denotes a resource region to which a control channel may be mapped. The CSI-RS may be transmitted using parts of locations 404 indicated as A, B, C, D, E, F, G, H, I and J according to the number of antenna ports used for a transmission of the CSI-RS. In addition, the muting may be applied to the parts of locations indicated as A, B, C, D, E, F, G, H, I, J. In particular, the CSI-RS may be transmitted using 2, 4, or 8 REs according to the configured number of antenna ports. In a case of two antenna ports, in FIG. 4A, half of a specific pattern is used for CSI-RS transmission; in a case of four antenna ports, the whole of the specific pattern is used for CSI-RS transmission; and in a case of eight antenna ports, two patterns are used for CSI-RS transmission.

Meanwhile, the muting is always performed in the unit of one pattern. That is, although the muting is applied to multiple patterns, if the location of the muting does not overlap the location of the CSI-RS, the muting cannot be applied to only a part of one pattern. However, only in a case where the location of the CSI-RS overlaps the location of the muting, the muting can be applied to only a part of one pattern. In a case of transmitting the CSI-RS for two antenna ports, signals of respective antenna ports are transmitted through two REs connected on the time axis, and the signals of the respective antenna ports are separated by orthogonal codes. Further, in a case of transmitting the CSI-RS for four antenna ports, in addition to the CSI-RS for two antenna ports, signals for the remaining two antenna ports are transmitted in the same manner using additional two REs. In a case of transmitting the CSI-RS for eight antenna ports, transmission may be performed in the same manner. In a case of CSI-RSs supporting 12 and 16 antenna ports, transmission is performed through combination of three CSI-RS transmission locations for the four existing antenna ports or through a combination of two CSI-RS transmission locations for eight antenna ports.

Further, a terminal can be allocated with CSI-IMs (or interference measurement resources (IMRs)) together with the CSI-RSs, and the CSI-IM resources have the same resource structure and location as those of the CSI-RSs supporting 4 ports. The CSI-IM is a resource for a terminal that receives data from one or more base stations to accurately measure interference with an adjacent base station. For example, if it is desired to measure the amount of interference when the adjacent base station transmits data and the amount of interference when the adjacent base station does not transmit the data, the base station configures a CSI-RS and two CSI-IM resources. The base station can effectively measure the amount of interference due to the adjacent base station by allowing the adjacent base station to always transmit a signal on one CSI-IM while allowing the adjacent base station to always not transmit the signal on the other CSI-IM.

Table 5a below shows a radio resource control (RRC) field forming the CSI-RS setting. This is to support periodic CSI-RS in the CSI process.

TABLE 5a

| CSI-RS config | CSI-IM config | CQI report config | Etc |
|---|---|---|---|
| No. antenna ports | Resource config | Periodic | $P_C$ |
| Resource config | Time and frequency | Mode, resource, | Codebook subset |
| Time and frequency | position in a subframe | periodicity, offset . . . | restriction |
| position in a subframe | Subframe config | Aperiodic | |
| Subframe config | Periodicity and | Mode . . . | |
| Periodicity and subframe | subframe offset | PMI/RI report | |
| offset | | RI reference CSI | |
| Qcl-CRS-info (QCL | | process | |
| Type B) | | SubframePattern | |
| CRS information for CoMP | | | |

Four types of configurations of channel state reports based on the periodic CSI-RS in the CSI process are shown in Table 5a. First, "CSI-RS config" is to configure frequency and time locations of the CSI-RS REs. Here, through configuration of the number of antennas, the number of ports of the corresponding CSI-RS may be configured. "Resource config" configures the RE location in the RB, and "Subframe config" configures a subframe period and an offset. Table 5b below is for configuration of Resource config and Subframe config supported in LTE.

TABLE 5b

| | CSI Reference signal configuration | Number of CSI reference signals on configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

| CSI-RS Subframe config $I_{CSI-RS}$ | CSI-RS periodicity $T_{CSI-RS}$ (subframes) | CS-RS subframe offset $\Delta_{CSI-RS\ (subframes)}$ |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

Through Table 5b above, a terminal can identify the frequency and time location, period, and offset. "Qcl-CRS-info" configures quasi co-location information for coordinate multi pint (COMP).

Second, "CSI-IM config" is to configure the frequency and time location of the CSI-IM for measuring interference. Since "CSI-IM" is always configured based on four ports, it is not necessary to configure the number of antenna ports, and "Resource config" and "Subframe config" are configured in the same manner as the CSI-RS.

Third, "CQI report config" exists in order to configure the channel state report to be performed using the corresponding CSI process. The corresponding configuration may include periodic and aperiodic channel state report configuration, precoding matrix indicator (PMI)/rank indicator (RI) report configuration, RI reference CSI process configuration, subframe pattern configuration, and the like.

The subframe pattern is to configure a measurement subframe subset for supporting the channel and interference measurement having temporally different characteristics in measuring the channel and interference that the terminal receives. The measurement subframe subset has been first introduced for estimation by reflecting different interference characteristics between the almost blank subframe (ABS) and the non-ABS subframe in the enhanced inter-cell interference coordination (eICIC). The measurement subframe subset has evolved to be capable of measurement by setting two IMRs to measure different channel characteristics between the subframe that always operates on DL and the subframe that dynamically switch between DL and UL in the enhanced interference mitigation and traffic adaption (eIMTA).

Tables 5c and 5d below represent the measurement subframe subset for supporting the eICIC and the eIMTA, respectively.

TABLE 5c

| | |
|---|---|
| CQI-ReportConfig-r10 ::= | SEQUENCE { |
| cqi-ReportAperiodic-r10 | CQI-ReportAperiodic-r10   OPTIONAL, -- Need ON |
| nomPDSCH-RS-EPRE-Offset | INTEGER (−1..6), |
| cqi-ReportPeriodic-r10 | CQI-ReportPeriodic-r10   OPTIONAL, -- Need ON |
| pmi-RI-Report-r9 | ENUMERATED {setup}   OPTIONAL, -- Cond PMIRIPCell |
| csi-SubframePatternConfig-r10 | CHOICE { |
| release | NULL, |
| setup | SEQUENCE { |
| csi-MeasSubframeSet1-r10 | MeasSubframePattern-r10, |
| csi-MeasSubframeSet2-r10 | MeasSubframePattern-r10 |
| } | |
| } | OPTIONAL -- Need ON |
| } | |

TABLE 5d

| | |
|---|---|
| CQI-ReportConfig-v1250 ::= | SEQUENCE { |
| csi-SubframePatternConfig-r12 | CHOICE { |
| release | NULL, |
| setup | SEQUENCE { |
| csi-MeasSubframeSets-r12 | BIT STRING (SIZE (10)) |
| } | |
| } | OPTIONAL, -- Need ON |
| cqi-ReportBoth-v1250 | CQI-ReportBoth-v1250   OPTIONAL, -- Need ON |
| cqi-ReportAperiodic-v1250CQI-ReportAperiodic-v1250 | OPTIONAL, -- Need ON |
| altCQI-Table-r12 | ENUMERATED { |
| all Subframes, csi-SubframeSet1 | |
| csi-SubframeSet2, spare1} | OPTIONAL   -- Need OP |
| } | |

The measurement subframe subset for the eICIC supported in LTE is configured using csi-MeasSubframeSet1-r10 and csi-MeasSubframeSet2-r10. MeasSubframePattern-10 referenced by the corresponding fields of csi-MeasSubframeSet1-r10 and csi-MeasSubframeSet2-r10 is as shown in Table 5e below.

TABLE 5e

```
ASN1START
MeasSubframePattern-r10 ::=    CHOICE {
subframePatternFDD-r10             BIT STRING (SIZE (40)),
subframePatternTDD-r10             CHOICE {
subframeConfig1-5r10                   BIT STRING (SIZE (20)),
subframeConfig0-r10                    BIT STRING (SIZE (70)),
subframeConfig6-r10                    BIT STRING (SIZE (60)),
...
},
...
}
```

In the field, the left most significant bit (MSB) denotes subframe #0, and the bit value being 1 indicates that it is included in the corresponding measurement subframe subset. Unlike an eICIC measurement subframe subset configuring each subframe set via each field, the eIMTA measurement subframe subset indicates 0 with the first subframe set and 1 with the subframe set using one field. Accordingly, in a case of eICIC, the corresponding subframe may not be included in two subframe sets, but in a case of an eIMTA subframe set, it should always be included in one of the two subframe sets.

In addition thereto, fourth, there is Pc, which denotes a power ratio between a PDSCH and a CSI-RS RE, required for a terminal to generate a channel state report, and a codebook subset restriction configuring a codebook to be used. The Pc and the codebook subset restrictions are configured by the p-C-AndCBSRList field (Table 5f) including two P-C-AndCBSR fields in the form of a list of Table 5g below, and each field denotes configuration for each subframe subset.

TABLE 5f

```
CSI-Process-r11 ::=         SEQUENCE {
...
p-C-AndCBSRList-r11         P-C-A.ndCBSR-Pair-r13a,
...
}
```

TABLE 5g

```
P-C-AndCBSR-11 ::=              SEQUENCE {
p-C-r11                             INTEGER (-8., 1 5),
codebookSubsetRestriction-r11       BIT STRING
}
```

The Pc may be defined as shown in Equation 2 and may be designated with a value ranging from −8 dB to 15 dB.

$$P_c = \frac{PDSCH\ EPRE}{CSI-RS\ EPRE} \qquad \text{[Equation 2]}$$

The base station may variably adjust CSI-RS transmission power for enhancing channel estimation accuracy and the like, and the terminal may be aware of how low or high the transmission power to be used for data transmission through the notified Pc is relative to the transmission power used for channel estimation. Therefore, the terminal may calculate and report exact CQI to the base station even when the base station varies the CSI-RS transmission power.

The codebook subset restriction is a function that causes the base station not to report, to the terminal, the codepoints of the codebook supported by the standard according to the number of CRS or CSI-RS ports of the base station. This codebook subset restriction may be configured by the codebookSubsetRestriction field included in AntennaInfoDedicated of Table 5h below.

TABLE 5h

```
AntennaInfoDedicated ::=                    SEQUENCE {
transmissionMode                            ENUMERATED {
tm1, tm2, tm3, tm4, tm5, tm6,
tm7, tm8-v920},
codebookSubsetRestriction                   CHOICE {
n2TxAntenna-tm3                                 BIT STRING (SIZE (2)),
n4TxAntenna-tm3                                 BIT STRING (SIZE (4)),
n2TxAntenna-tm4                                 BIT STRING (SIZE (6)),
n4TxAntenna-tm4                                 BIT STRING (SIZE (64)),
n2TxAntenna-tm5                                 BIT STRING (SIZE (4)),
n4TxAntenna-tm5                                 BIT STRING (SIZE (16)),
n2TxAntenna-tm6                                 BIT STRING (SIZE (4)),
n4TxAntenna-tm6                                 BIT STRING (SIZE (16))
} OPTIONAL,                                 -- Cond TM
ue-TransmitAntennaSelection                 CHOICE {
release                                         NULL,
setup                                           ENUMERATED {closedLoop, openLoop}
}
}
AntennaInfoDedicated-v920 ::=               SEQUENCE {
codebookSubsetRestriction-v920              CHOICE {
n2TxAntenna-tm8-r9                              BIT STRING (SIZE (6)),
n4TxAntenna-tm8-r9                              BIT STRING (SIZE (32))
} OPTIONAL                                  -- Cond TM8
}
AntennaInfoDedicated-r10::=                 SEQUENCE {
transmissionMode-r10                        ENUMERATED {
tm1, tm2, tm3, tm4, tm5, tm6, tm7, tm8-v920,
tm9-v1020, tm10-v1130, spare6, spare5, spare4,
spare3, spare2, spare 1},
```

TABLE 5h-continued

```
codebookSubsetRestriction-r10         BIT STRING   OPTIONAL,  -- Cond
TMX
ue-TransmitAntennaSelection           CHOICE{
  release                               NULL,
  setup                                 ENUMERATED {closedLoop, openLoop}
}
}
```

The codebookSubsetRestriction field is configured in a bitmap, and the size of the bitmap is the same as the number of codepoints of the corresponding codebook. Therefore, each bitmap represents each codepoint. If a corresponding value is 1, a terminal may report a corresponding codepoint to a base station through a PMI. If the corresponding value is 0, a terminal may not report a corresponding codepoint to a base station through a PMI. For reference, the MSB indicates a high precoder index, and the least significant bit (LSB) indicates a low precoder index (e.g., 0).

In the cellular system, a base station needs to transmit a reference signal to a terminal in order to measure a downlink channel state. In a case of the LTE-A system, a terminal measures a channel state between the terminal and a base station by using a CRS or CSI-RS transmitted by the base station. In the channel state, some factors need to be basically considered, and the amount of interference in a downlink is included therein. The amount of interference in a downlink includes an interference signal and thermal noise occurring due to an antenna belonging to an adjacent base station, and is important for a terminal to determine a channel situation in a downlink. For example, if a base station having one transmission antenna transmits a signal to a terminal having one reception antenna, the terminal has to determine energy per symbol that may be received in a downlink and the amount of interference to be received at the same time in the period in which a corresponding symbol is received using a reference signal received from the base station, and to determine Es/Io (the energy ratio of symbols to the amount of interference). The determined Es/Io is converted into a data transmission speed or a corresponding value, and the base station is notified of the data transmission speed or a corresponding value in the form of channel quality indicator (CQI). Accordingly, the base station may determine a transmission speed at which the base station performs transmission to the terminal.

In a case of the LTE-A system, a terminal feeds back information about a channel state of the downlink to a base station so that the base station can use the information for DL scheduling. That is, the terminal measures a reference signal transmitted by the base station via DL, and feeds back information extracted from the reference signal to the base station in a form defined in the LTE and LTE-A standard. In LTE and LTE-A systems, information fed back by a terminal basically includes the following three types.

A rank indicator (RI): the number of spatial layers that may be received by a terminal in a current channel state.

A precoding matrix indicator (PMI): an indicator associated with a precoding matrix desired by a terminal in a current channel state.

A channel quality indicator (CQI): a maximum data rate at which a terminal may perform reception in a current channel state. The CQI may be replaced by a SINR, a maximum error correction code rate and modulation scheme, or data efficiency per frequency, which may be similarly used with a maximum data rate.

The RI, PMI and CQI have meanings in relation to each other. For example, a precoding matrix supported in LTE and LTE-A systems are differently defined for each rank. Accordingly, a PMI value if the RI has a value of 1 and a PMI value if the RI has a value of 2 are differently interpreted although the PMI values are the same. Furthermore, when a terminal determines a CQI, the terminal determines the CQI on the assumption that a rank value and PMI value of which a base station has been notified by the terminal have been applied in the base station. That is, if the terminal has notified the base station of RI_X, PMI_Y, and CQI_Z, when a rank is RI_X and an applied precoding matrix is PMI_Y, this denotes that the terminal can receive data at a data rate corresponding to CQI_Z. As described above, at the time of calculation of a CQI, the terminal assumes a transmission scheme to be performed for a base station so that optimized performance can be obtained when actual transmission is performed using the corresponding transmission scheme.

In LTE and LTE-A, the periodic feedback of the terminal is configured as one feedback mode or reporting mode among the following.

Reporting mode 1-0 (wideband CQI with no PMI): RI, broadband (wideband, which is interchangeably used by full band) CQI (wCQI)

Reporting mode 1-1 (wideband CQI with single PMI): RI, wCQI, PMI

Reporting mode 2-0 (subband CQI with no PMI): RI, wCQI, narrowband (which is interchangeably used by subband) CQI (sCQI)

Reporting mode 2-1 (subband CQI with single PMI): RI, wCQI, sCQI, PMI

A feedback timing of each piece of information for the four feedback modes is determined by values of $N_{pd}$, $N_{OFFSET,CQI}$, $M_{RI}$, $N_{OFFSET,RI}$, etc., which are transmitted via higher layer signals. In feedback mode 1-0, the transmission period of wCQI is $N_{pd}$, and the feedback timing is determined by a subframe offset value of $N_{OFFSET,CQI}$. In addition, the transmission period of RI is $N_{pd}*M_{RI}$ and the offset is $N_{OFFSET,CQI}+N_{OFFSET,RI}$.

Feedback mode 1-1 has the same feedback timing as feedback mode 1-0, but is different in that wCQI and PMI are transmitted together at the wCQI transmission timings.

In feedback mode 2-0, the feedback period for sCQI is $N_{pd}$ and the offset value is $N_{OFFSET,CQI}$. The feedback period for wCQI is $H·N_{pd}$ and the offset value is $N_{OFFSET,CQI}$ as the offset values of sCQI. Here, H=J*K+1, where K is transmitted via a higher layer signal and J is a value determined by a system bandwidth.

For example, the value of J for a 10 MHz system is defined as "3". As a result, the wCQI is transmitted by replacing the value of J once every H sCCI transmissions. The period of RI is $M_{RI}*H*N_{pd}$, and the offset thereof is $N_{OFFSET,CQI}+N_{OFFSET,RI}$.

Feedback mode 2-1 has the same feedback timing as feedback mode 2-0, but is different in that PMI is transmitted together at the wCQI transmission timings.

The above-described feedback timing corresponds to the number of CSI-RS antenna ports being 4 or less. When a terminal is allocated with a CSI-RS for 8 antenna ports, two pieces of PMI information should be fed back, unlike in the above-described feedback timing. For 8 CSI-RS antenna ports, feedback mode 1-1 is again divided into two submodes. In a first submode, an RI is transmitted together with first PMI information, and second PMI information is transmitted together with wCQI.

Here, the feedback period and offset for wCQI and the second PMI are defined as $N_{pd}$ and $N_{OFFSET,CQI}$, and the feedback period and offset value for the RI and the first PMI information are defined as $M_{RI}*N_{pd}$, and $N_{OFFSET,CQI}+N_{OFFSET,RI}$, respectively. If a precoding matrix corresponding to the first PMI is W1 and a precoding matrix corresponding to the second PMI is W2, a terminal and a base station share information that the precoding matrix desired by the terminal is determined to be W1W2.

In case of feedback mode 2-1 for 8 CSI-RS antenna ports, feedback of precoding type indicator (PTI) information is added. The PTI is fed back with the RI, the period of the PTI is $M_{RI}*H*N_{pd}$, and the offset thereof are defined as $N_{OFFSET,CQI}+N_{OFFSET,RI}$. If the PTI is 0, the first PMI, the second PMI, and the wCQI are all fed back, the wCQI and the second PMI are transmitted at the same timing, the period of the PTI is $N_{pd}$ and the offset thereof is given as $N_{OFFSET,CQI}$.

In addition, the period of the first PMI is $H'*N_{pd}$ and the offset thereof is $N_{OFFSET,CQI}$. Here, H' is transmitted via a higher layer signal. However, when the PTI is "1", the PTI is transmitted with the RI, the wCQI and the second PMI are transmitted together, and the sCQI is fed back at a separate timing. Here, the first PMI is not transmitted. The periods and offsets of the PTI and RI are the same as those when the PTI is "0", the period of sCQI is defined as $N_{pd}$, and the offset thereof is defined as $N_{OFFSET,CQI}$. The wCQI and the second PMI are fed back while having the period of $H*N_{pd}$ and the offset of $N_{OFFSET,CQI}$, and H is defined as the case in which the number of CSI-RS antenna ports is "4".

LTE and LTE-A systems support periodic feedback of the terminal and aperiodic feedback of the terminal. When a base station desires to acquire aperiodic feedback information of a specific terminal, the base station configures an aperiodic feedback indicator included in downlink control information (DCI) for uplink data scheduling of a corresponding terminal in order to instruct specific aperiodic feedback, thereby performing uplink data scheduling of the corresponding terminal. When the corresponding terminal receives the indicator configured to perform aperiodic feedback in an n-th subframe, the corresponding terminal performs uplink transmission by including aperiodic feedback information in uplink data transmission in an (n+k)-th subframe, where k is a parameter defined in the 3GPP LTE Release 11 standard, which is "4" in frequency division duplexing (FDD) and is defined as shown in Table 5i below in time division duplexing (TDD).

TABLE 5i

| TDD UUDL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |

TABLE 5i-continued

| TDD UUDL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 5 | — | — | 4 | — | — | — | — | — | — | — |
| 6 | — | — | 7 | 7 | 5 | — | — | 7 | 7 | — |

When the aperiodic feedback is set, the feedback information includes RI, PMI, and CQI, like when the periodic feedback is set, and RI and PMI may not be fed back according to the feedback setting. The CQI may include both wCQI and sCQI or may include only wCQI information.

In addition, LTE and LTE-A systems provide a codebook subsampling function for periodic CSI reporting. In LTE and LTE-A systems, the periodic feedback of the terminal is transmitted to the base station via the PUCCH, and an amount of information that can be transmitted at one time through the PUCCH is limited. Therefore, various feedback objects, such as RI, wCQI, sCQI, PMI1, wPMI2, and sPMI2 may be transmitted on the PUCCH through subsampling, or two or more pieces of feedback information may be joint-encoded together and transmitted on the PUCCH.

For example, when 8 CSI-RS ports are configured by the base station, an RI and PMI1 reported in submode 1 of PUCCH mode 1-1 may be joint-encoded as shown in Table 5j below. Based on Table 5j, RI including 3 bits and PMI1 including 4 bits are joint-encoded as 5 bits in total. In submode 2 of PUCCH mode 1-1, PMI1 including 4 bits and PMI2 including other 4 bits are joint-encoded as 4 bits in total as shown in Table 5k below. Since the subsampling level is higher compared with submode 1 (submode 1 undergoes subsampling from 4 cases to 3 cases, and submode 2 undergoes subsampling from 8 cases to −4 cases), more precoding indexes cannot be reported.

As another example, when 8 CSI-RS ports are configured by the base station, PMI2 reported in PUCCH mode 2-1 may be subsampled as shown in Table 5l below. Referring to Table 5l, PMI2 is reported as 4 bits when the number of the associated RIs is "1". However, if the number of associated RIs is "2" or greater, differential CQI for a second codeword should be reported together, and thus PMI2 is subsampled and reported as 2 bits. In LTE and LTE-A, it is possible to apply subsampling or joint encoding for 6 types of periodic feedbacks in total including those in Table 5i, Table 5k, and Table 5l.

TABLE 5j

| value of joint encoding of RI and the fist PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1} - 8)$ |
| 16-17 | 3 | $2(I_{RI/PMI1} - 16)$ |
| 18-19 | 4 | $2(I_{RI/PMI1} - 18)$ |
| 20-21 | 5 | $2(I_{RI/PMI1} - 20)$ |
| 22-23 | 6 | $2(I_{RI/PMI1} - 22)$ |
| 24-25 | 7 | $2(I_{RI/PMI1} - 24)$ |
| 26 | 8 | 0 |
| 27-31 | reserved | NA |

TABLE 5k

| | Relationship between the first PMI value and codebook index $i_1$ | | Relationship between the first PMI value and codebook index $i_2$ | | |
|---|---|---|---|---|---|
| RI | Value of the first PMI $I_{PMI1}$ | Codebook index $i_1$ | Value of the first PMI $I_{PMI2}$ | Codebook index $i_2$ | Total #bits |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4[I_{PMI2}/4] + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

TABLE 5l

| | Relationship between the second PMI value and codebook index $i_2$ | |
|---|---|---|
| RI | value of the second PMI $I_{PMI2}$ | Codebook index $i_2$ |
| 1 | 0-15 | $I_{PMI2}$ |
| 2 | 0-3 | $2I_{PMI2}$ |
| 3 | 0-3 | $8 \cdot [I_{PMI2}/2] + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

Figure 4B:
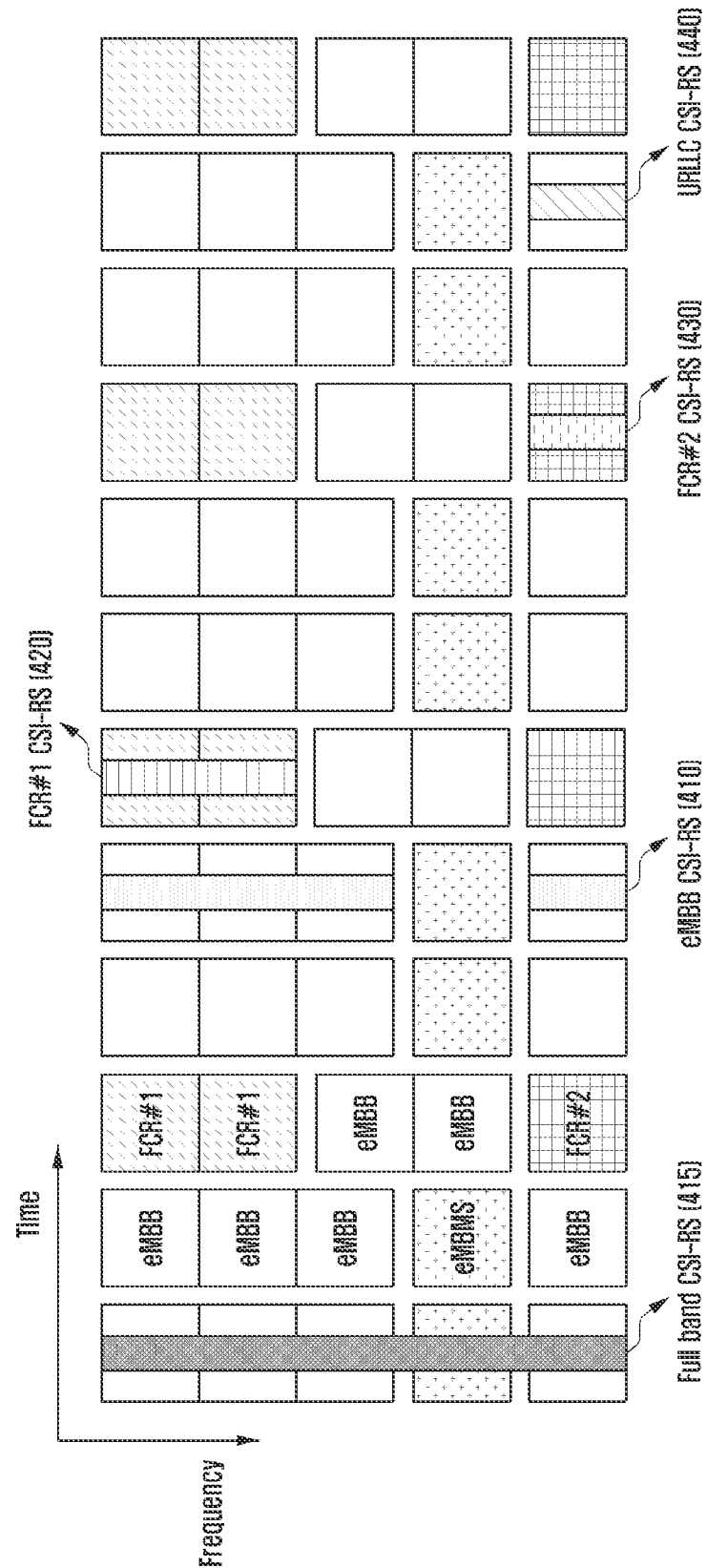
FIG. 4B illustrates a case in which respective services are multiplexed in time and frequency resources in an NR system.

FIG. 4B illustrates a case in which respective services are multiplexed in time and frequency resources in an NR system. A base station may allocate a CSI-RS to a full band or a multi-band in order to secure initial channel state information as shown in reference numeral 415 to a terminal. The full-band or multi-band CSI-RS uses a large amount of reference signal overhead, which can be disadvantageous for optimizing the system performance. However, if there is no pre-obtained information, CSI-RS transmission in the full band or multi-band may be essential. After the CSI-RS transmission in the full-band or the multi-band, each service may be provided with different requirements for each service, and thus, accuracy and update need of channel state information can also be changed. Accordingly, after securing the initial channel state information, the base station may trigger a transmission of subband CSI-RSs 410, 420, 430, and 440 for each service in the corresponding band according to the need for each service. Although FIG. 4B illustrates a transmission of a CSI-RS for each service at one time point, a CSI-RS transmission for multiple services is possible as needed.

As described in Tables 5a and 5b, the LTE system supports periodic CSI-RS transmission. The periodic CSI-RS enables a terminal to periodically measure resources and to perform periodic CSI reporting by using the measured resource. However, such periodic CSI-RS transmission is not advantageous in supporting terminals of existing LTE and future systems. For example, when a CSI-RS pattern of the LTE system described above is different from a CSI-RS pattern of the NR system, a ZP CSI-RS resource may be additionally required in order to perform rate matching of the corresponding resource. In addition, if a CSI-RS pattern supported later in the NR system is different from the existing CSI-RS, the existing NR terminal and the future NR terminal need to support and use different CSI-RS patterns, respectively. Here, periodic CSI-RS RS may further increase the overhead. In consideration of the above, the following aperiodic CSI-RS transmission methods may be considered.

Aperiodic CSI-RS resource configuration and trigger method 1: Method 1 is a method of pre-configuring a plurality of aperiodic CSI-RS resources and triggering some of the configured resources.

Aperiodic CSI-RS resource configuration and trigger method 2: Method 2 is a method of pre-configuring a plurality of aperiodic CSI-RS resources, activating some of the configured resources, and triggering some of the activated resources.

Aperiodic CSI-RS resource configuration and trigger method 3: Method 3 is a method of pre-configuring a plurality of aperiodic CSI-RS resources and periodically transmitting a CSI-RS via a corresponding CSI-RS resource according to activation until the resource is deactivated.

Aperiodic CSI-RS resource configuration and trigger method 1 is a method of pre-configuring a plurality of aperiodic CSI-RS resources and triggering some of the configured resources. According to the method, since the plurality of resources needs to always be configured dynamically and the number of all configurations needs to be supported, the complexity of a terminal may be relatively high. Method 2 is a method of supporting dynamic a transmission of only some of the configured resources. Here, since the number of CSI-RS resources that can be transmitted is relatively small, the complexity of a terminal is less than that in method 1, and dynamic CSI-RS transmission is also possible. According to method 3, a plurality of resources are configured, and all or some of the resources are periodically transmitted using the concept of semi-persistent scheduling (SPS). According to method 3, the hardware change and complexity increase of the terminal may be significantly less than those of methods 1 and 2.

In supporting aperiodic CSI-RS transmission, a corresponding activation or deactivation operation and a triggering operation may be transmitted and configured using a DCI or MAC control element (CE) signal. In supporting the above methods, it is also considered to support a plurality of CSI-RS transmission methods. Here, CSI-RS transmission in aperiodic CSIRS resource configuration and trigger method 3 may be referred to as a semi-persistent (periodic) CSI-RS transmission rather than an aperiodic CSI-RS transmission.

In addition to the CSI-RS transmission mentioned above, the NR system supports aperiodic, periodic, and semipersistent channel state information. Here, the periodic channel state information of the NR system may not support subband reporting among the above-mentioned feedback modes. Reporting used in periodic channel state reporting may transmit a limited amount of reports. Therefore, as described above, in the LTE system, a terminal may select some subbands of a bandwidth part to report channel state information. However, since reporting through a selective subband carries very limited information, the utility of the information is not great. Thus, such reporting is not supported, thereby reducing the complexity of a terminal and increasing the efficiency of the reporting. In addition, since subband reporting is not supported, no PMI can be reported or only one PMI corresponding to a broadband or a partial band can be transmitted through periodic channel state information reporting of the NR system.

Aperiodic channel state information reporting of the NR system supports the following reporting modes.

Reporting mode 1-2 (wideband CQI with multiple PMIs): RI, wideband CQI (wCQI), multiple wideband and subband PMIs Reporting mode 2-0 (subband CQI with no PMI): RI, wCQI, subband CQI (sCQI) of band selected by terminal Reporting mode 2-2 (subband CQI with multiple PMIs): RI, wCQI, sCQI, multiple wideband and subband PMIs Reporting mode 3-0 (subband CQI with no PMI): RI, wCQI, subband CQI (sCQI) of full band Reporting mode 3-2 (subband CQI with multiple PMIs): RI, wCQI, subband CQI (sCQI) of full band, and multiple wideband and subband PMIs Similar to the periodic channel state reporting described above, reporting modes 2-0 and 2-2 are types in which one of subbands in a bandwidth part for a terminal is selected for reporting, and may not be supported in the NR system due to low efficiency of thereof. In the periodic channel state reporting in the LTE system, a reporting mode is determined using a PMI/RI report configuration and a CQI configuration of a corresponding channel state reporting mode configuration. However, in the aperiodic channel state reporting, a channel state reporting mode is directly configured. In the NR system, a channel state report configuration may be provided via a PMI/RI report configuration, a CQI report configuration, and the like.

Figure 4C:
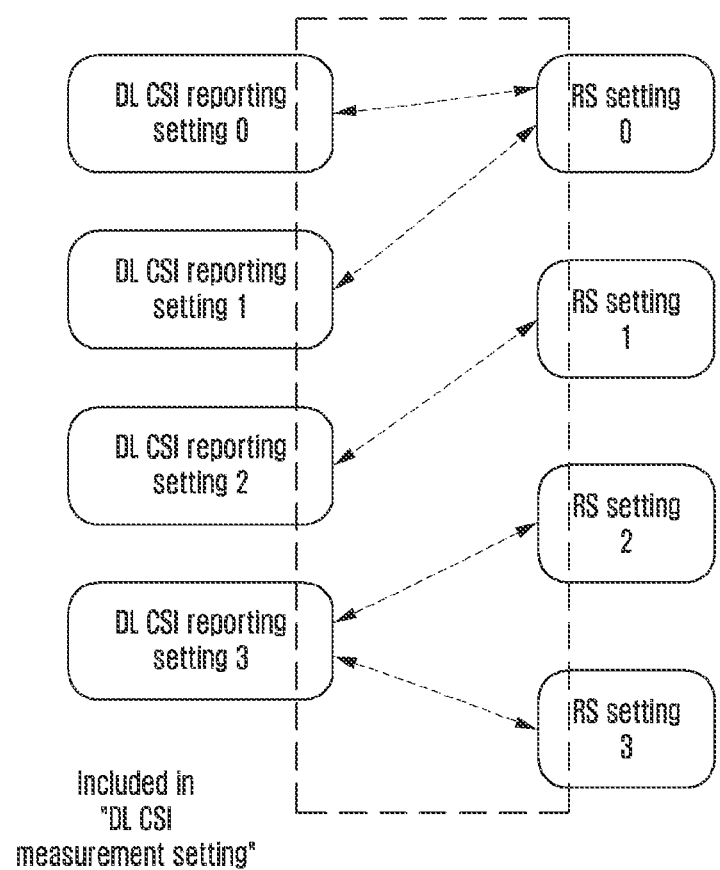
FIG. 4C illustrates a relationship between a CSI report setting, a reference signal setting, and a CSI measurement setting.

Table 5m below illustrates a CSI reporting setting, a reference signal (RS) setting, and a CSI measurement setting for channel state reporting. FIG. 4c illustrates a relationship between a CSI reporting setting, an RS setting, and a CSI measurement setting.

TABLE 5m

The CSI-related settings consisting of:
CSI reporting settings.
CSI parameter can be individually configured, e.g., time and/or frequency granularity RS (at least for CSI measurement) settings, e.g., CSI-RS (CSI-IM as a special case).
CSI measurement settings

* To configure which RS setting is used for a particular CSI reporting setting

The reference signal setting, the CSI reporting setting, and the CSI measurement setting in Table 5m may include the following settings.

Reference signal setting: Transmission type of a reference signal (periodic, aperiodic, semi-persistent), transmission period and offset of a reference signal CSI reporting setting: Whether reporting of an RI, a PMI, a CQI, a beam index (BI), or a CSI-RS resource index (CRI) are performed (which may be configured individually or in combination), reporting method (periodic, aperiodic, semi-persistent, or aperiodic and semi-persistent reporting may be configured as one parameter), codebook configuration information, PMI form (full band (wideband) or/and partial band (subband)), channel state reporting type (implicit or/and explicit, or Type I/Type II), channel quality reporting type (CQI or/and RSRP), and resource configuration for channel state reporting Channel measurement setting (CSI measurement setting): Setting about reference signal setting and channel state reporting setting which are used for reporting, and associated setting between reference signal setting and a reporting timepoint (e.g., when a reference signal is transmitted in an nth subframe or slot, the reporting timepoint may be configured using parameters, such as $D_{0-0}$, $D_{1-0}$, $D_{2-1}$, $D_{3-2}$, and $D_{3-3}$ and may thus be defined as $n+D_{0-0}$).

In each of the settings described above, a plurality of settings may be configured for a terminal as illustrated in FIG. 4C, in which CSI reporting settings and RS settings may be freely and flexibly connected through CSI measurement settings and may be indicated to a terminal.

In the NR system, two types of channel state reporting having low spatial resolution and high spatial resolution are supported as below. Table 5n below illustrates these two types of channel state reporting.

TABLE 5n

NR supports CSI reporting with two types of spatial information feedback.

Type I feedback: Normal

Codebook-based PMI feedback with normal spatial resolution

Type II feedback: Enhanced

"Explicit" feedback and/or codebook-based feedback with higher spatial resolution For Type I and II, CSI feedback per subband as well as wideband feedback is supported For Type I and II, beam-related feedback can be included (beam-related feedback may be included for types 1 and 2).

For Type I feedback, NR supports at least the following (DL) CSI reporting parameters.

Resource selection indicator (Examples for further study are a reference signal resource, a port, a reference signal sequence, and a beam)

Rank indicator (RI)

Precoding matrix indicator (PMI)

Channel quality feedback

For Type I CSI, PIM codebook has at least two stages W = W1W2

W1 codebook includes beam groups/vectors

Note multi-panel support may be captured in W1, W2, and/or W3.

For Type II CSI,

Analog CSI feedback

* Linear combination-based CSI feedback

As described above, Type I channel state reporting reports a channel state to a base station through an RI, a PMI, a CQI, and a CRI based on a codebook as in the existing LTE system. On the other hand, Type II reporting may provide a higher level of resolution through greater PMI reporting overhead for implicit CSI similar to that for Type I reporting, and this PMI reporting may be performed by a linear combination of a precoder, a beam, a co-phase, and the like used for Type I reporting. In addition, CSI may be reported in an explicit CSI form different from the existing form in order to report a direct channel state, and a representative example thereof is a method of reporting a covariance matrix of a channel. In addition, a combination of implicit information and explicit information may be possible. For example, a covariance matrix of a channel is reported via a PMI, and a CQI or an RI may be reported in addition thereto.

As mentioned above, Type II channel state reporting requires high reporting overhead. Therefore, such reporting may not be suitable for periodic channel state reporting that does not have a large number of bits for reporting. However, since aperiodic channel state reporting is supported through a PUSCH that can support great overhead, Type II reporting requiring high reporting overhead can be supported only in aperiodic channel state reporting.

In addition, Type II reporting can be supported in semi-persistent channel state reporting. In the NR system, semi-persistent channel state reporting supports dynamic activation and deactivation as compared to periodic channel state reporting, thereby requiring relatively high terminal complexity. Therefore, periodic channel state reporting may be performed using transmission methods, such as PUCCH formats 1, 2, and 3, which have relatively low complexity and high coverage as compared to the existing LTE system. Table 50 illustrates a resource configuration for PUCCH format 3 in the LTE system.

TABLE 5o

```
CQI-ReportPeriodic-r10 ::=      CHOICE {
release                         NULL,
setup                           SEQUENCE {
cqi-PUCCH-ResourceIndex-r10     INTEGER (0..1184),
cqi-PUCCH-ResourceIndexP1r-10       INTEGER (0..1184)   OPTIONAL, --
Need OR
cqi-pmi-ConfigIndex             INTEGER (0..1023),
cqi-FormatIndicatorPeriodic-r10    CHOICE {
widebandCQI-r10                 SEQUENCE {
csi-ReportMode-r10              ENUMERATED {submode1, submode2}   OPTIONAL --
Need OR
},
subbandCQI-r10                  SEQUENCE {
k                               INTEGER (1..4),
perodictyFactor-r10                 ENUMERATED {n2, n4}
}
},
ri-ConfigIndex                  INTEGER (0..1023)   OPTIONAL,    -- Need
OR
simultaneousAckNackAndCQI       BOOLEAN,
cqi-Mask-r9                     ENUMERATED {setup}  OPTIONAL,   --
Need OR
csi-ConfigIndex-r10             CHOICE {
release                         NULL,
setup                           SEQUENCE {
cqi-pmi-ConfigIndex2r-10        INTEGER (0..1023),
ri-ConfigIndex2-r10                 INTEGER (0..1023)   OPTIONAL   -- Need OR
}
}    OPTIONAL                           -- Need ON
}
}
```

On the other hand, semi-persistent channel state reporting can be supported by a terminal having high terminal complexity, and the terminal may support a transmission of a large amount of data through transmission based on existing PUCCH format 4 or 5. PUCCH formats 4 and 5 use tail-biting convolutional coding (TBCC) and QPSK modulation. In a case of format 5, data is divided and transmitted to two terminals through an orthogonal sequence. Therefore, in one RB transmission, transmission is performed using 144 REs and a coding rate of 1/3, and thus up to 96 bits (based on the configuration of one RB) and up to 48 bits can be transmitted according to PUCCH formats 4 and 5, respectively. In addition, in format 4, a plurality of RBs can be configured, and accordingly as many bits as the number of RBs multiplied by 96 bits can be transmitted. Table 5p below illustrates resource configurations for PUCCH formats 4 and 5.

TABLE 5p

```
Format4-resource-r13 ::=        SEQUENCE {
 startingPRB-format4r-13           INTEGER (0..109),
 numberOfPRB-format4-r13           INTEGER (0..7)
}
Format5-resource-r13 ::=        SEQUENCE {
 startingPRB-format5r-13           INTEGER (0..109),
 cdm-index-format5-r13             INTEGER (0..1)
}
```

Therefore, semi-persistent channel state reporting is capable of supporting channel state reporting having a relatively larger amount than periodic channel state reporting. Accordingly, Type II channel state reporting requiring a large amount of reporting is not supported periodically in periodic channel state reporting but may be supported in aperiodic channel state reporting and semi-persistent channel state reporting.

In addition, PMI and CQI reporting per subband, which is not supported in periodic channel state reporting, may be supported in semi-persistent channel state reporting and aperiodic channel state reporting. As described above, since semi-persistent channel state reporting and aperiodic channel state reporting can support a relatively large amount of channel state reporting, it is possible to improve the efficiency of channel state reporting by transmitting as much channel state reporting as possible to a base station, and it is possible to improve overall system performance by providing information required for scheduling and precoding per subband of the base station.

As mentioned above, in a case of periodic channel state reporting, it is necessary to minimize reporting complexity and overhead in order to minimize complexity and resource usage in supporting the reporting. Semi-persistent channel state reporting can support more complex operations based on a flexible operation of the reporting. To this end, a short duration PUCCH (hereinafter, short PUCCH) may be used in periodic channel state reporting, while a long-duration PUCCH (hereinafter, long PUCCH) may be used in semi-persistent channel state reporting.

A long PUCCH can be transmitted through at least three OFDM symbols and at most 14 OFDM symbols in one slot and can also be transmitted via an aggregation of a plurality of slots. The first objective of a long PUCCH is to transmit a large amount of information at once. In order to transmit a large amount of information, a long PUCCH may be transmitted through up to 14 OFDM symbols in a slot, thereby securing a large number of resources in the time axis. In addition, it is possible to aggregate an additional slot. Further, a long PUCCH may be transmitted using a large number of PRBs in the frequency axis, and it is possible to add a large number of frequency resources to the transmission of the long PUCCH. A long PUCCH enables a terminal to transmit a large amount of information to a base station at one time through a relatively large number of time and frequency resources.

Another objective of a long PUCCH is to enable a terminal to secure coverage required to transmit uplink control information (UCI). Unlike a base station, a terminal performs transmission with lower power than the base station due to an implementation space, a battery, or the like. In addition, unlike in a downlink which is planned in advance through cell planning in advance, an interference terminal may dynamically vary according to the distribution and usage of users in an uplink. In the worst case, a terminal may suffer severe interference by an adjacent terminal at the time of a transmission of a signal. Therefore, the terminal experiences a low signal-to-interference-plus-noise ratio (SINR). Here, additional allocation of frequency resources reduces the energy per bit of a signal transmitted by the terminal. Accordingly, in order to secure the coverage of the signal transmitted by the terminal, the same information is transmitted via a plurality of time resources, thereby maintaining the energy per bit and improving overall transmission power for the signal. Therefore, the same signal is repeatedly transmitted via a plurality of allocated time resources, thereby enabling the terminal to secure the coverage of the uplink signal. In addition, a long PUCCH supports transmission based on a DFT-S OFDM waveform showing a low peak-to-average power ratio (PAPR) characteristic, thereby enhancing the uplink transmission efficiency of a terminal.

Compared to a long PUCCH, a short PUCCH enables efficient transmission of a small amount of information by using a small number of resources. To this end, a short PUCCH enables a transmission of UCI via a small number of OFDM symbols (e.g., one or two OFDM symbols) and is based on a CP-OFDM waveform for efficient data transmission. Short PUCCH transmission may be efficiently performed using a CP-OFDM and a small number of OFDM symbols and may be possible for terminals with a relatively good uplink channel state. However, when the quality of an uplink channel is not sufficiently good because a terminal is located at a cell boundary or there is an adjacent terminal simultaneously supporting uplink transmission, short PUCCH transmission may not be supported.

Even in a short PUCCH structure, different methods may be supported for multiplexing of a reference signal and transmission data depending on the number of OFDM symbols used for transmission. For example, in one symbol-based transmission, multiplexing using frequency resources may be configured for data and a reference signal. In two symbol-based transmission, multiplexing using time resources in addition to frequency resources may be considered for data and a reference signal by using the characteristics of the corresponding resource. Tables 5q and 5r below illustrate resource multiplexing options according to the number of short PUCCH transmission OFDM symbols. Table 5q illustrates a resource multiplexing option based on one OFDM symbol, and Table 5r illustrates a resource multiplexing option based on two OFDM symbols.

TABLE 5q

RS and UCI of one UE are multiplexed by FDM in each symbol.
Sequence-based design without reference signal is used only for small (1 to 2) payload size case.
Information about a sequence/code to be transmitted is delivered.
Sequence is mapped over contiguous or non-contiguous REs.
UCI sequence can be CDMed with DMRS sequence of other UEs.
Sequence-based design is used with reference signal only for small (1 to 2) payload size case.
Information about a sequence/code to be transmitted is delivered.—RS and UCI are multiplexed by CDM
manner
Pre-DFT multiplexing of RS and UCI
Consider for both small and large UCI payload size cases
Possibility I: {CP + Pilot} + {CP + Data} to avoid inulti-path interference (MPI) between pilot and data.
- Possibility 2: CP + {Pilot + Data} as current DFT-s-OFDM

TABLE 5r

RS and UCI are multiplexed by FDM manner in each symbol.
RS and UCI are multiplexed by TDM manner.
RS and UCI are multiplexed by FDM manner in one symbol, and only UCI is carried on another symbol without RS.
Sequence-based design without RS only for small payload size case
Sequence-based design with RS only for small payload size case

* Pre-DFT multiplexing in one or both symbol(s)

In channel state reporting in the LTE system, as mentioned in Table 5a, a base station sets reference signal and report-related configurations for a terminal based on a CSI process through a higher-layer configuration. Based on this, in periodic channel state reporting, channel state information is reported using preset resources at a preset reporting timepoint. In aperiodic channel state reporting, preset configuration information is reported through a trigger in DCI transmitted by the base station through a downlink control signal.

As mentioned above, in semi-persistent channel state reporting, when supporting activation through DCI, activation and deactivation with low latency may be supported. However, the terminal may not receive the DCI or may receive wrong DCI, and thus channel state information reporting according to a wrong timepoint and wrong configurations may be performed. Further, in a case of activation through an MAC CE, erroneous reception is less likely to occur due to the support of an ARQ, but latency is not favorable compared to higher-layer signaling, such as RRC signaling. Therefore, in order to overcome the disadvantages of DCI-based activation and deactivation and MAC CE-based activation and deactivation, the MAC CE-based activation and deactivation and the DCI-based activation and deactivation may be used in combination. For example, the channel reporting settings, the RS settings, and the channel measurement settings in Table 5m are set for a terminal through K (K≥1) higher-layers, and N (N≥1) settings of the set K reporting settings are set through an MAC CE as candidate resources that the base station can activate for the terminal.

Figure 5A:
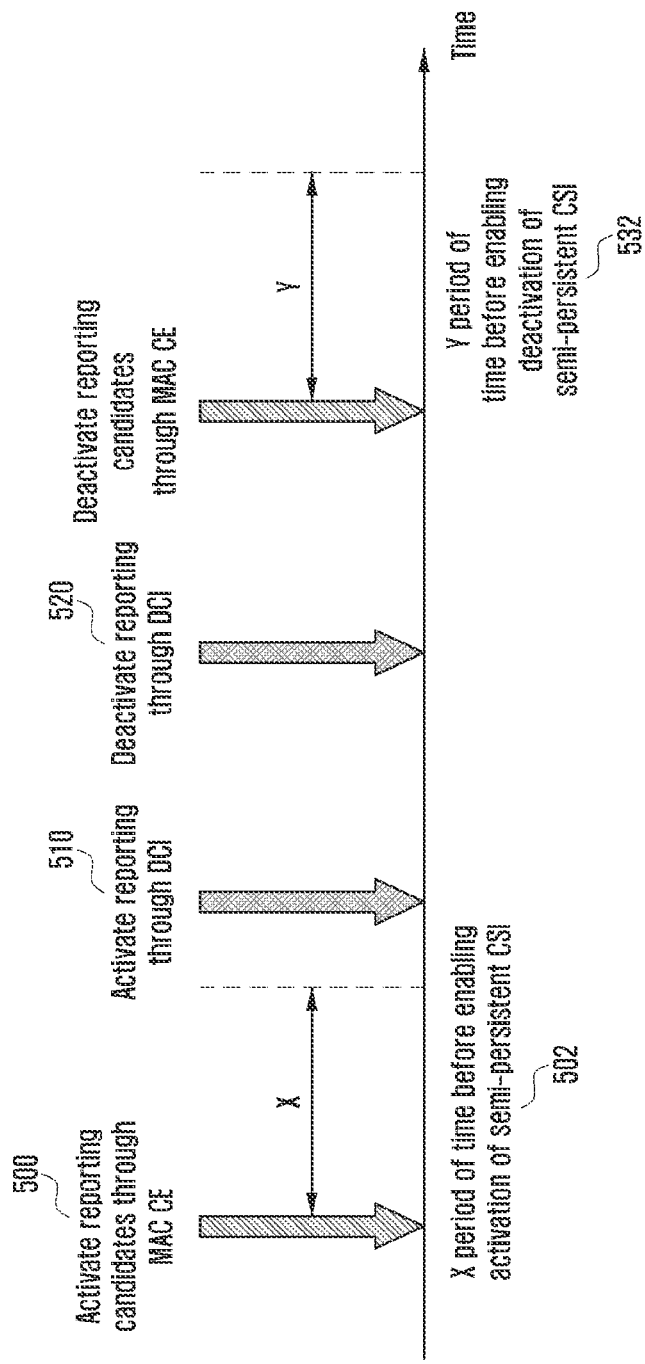
FIG. 5A illustrates an example of candidate activation through an MAC CE and subsequent activation of a substantial semi-persistent channel state report through DCI according to an embodiment of the disclosure.

FIG. 5A illustrates an example of candidate activation through an MAC CE and subsequent activation of substantial semi-persistent channel state reporting via DCI.

As illustrated in FIG. 5A, a base station sets some (N) of reporting settings as activation candidate resources through an MAC CE (indicated by reference numeral 500). Then, the base station may activate M (M≥1) resources among the N semi-persistent reporting candidate resources through DCI transmitted by the base station so as to enable a terminal to perform reporting (indicated by reference numeral 510). Here, X or Y slots, subframes, or mini-slots may be required (indicated by reference numerals 502 and 532) until the base station is allowed to activate (indicated by reference numeral 510) and deactivate (indicated by reference numeral 520) the reporting candidate resources for the terminal through the DCI after the resources are activated via the MAC CE. Here, although different activation and deactivation signals of candidate setting are shown, activation and deactivation signals of the candidate setting may be configured using the same bitmap. For example, 0 may indicate deactivation of a corresponding candidate, and 1 may indicate activation. In addition, candidate resources for semi-persistent reporting may be used together with candidate resources for aperiodic channel status reporting.

In addition, the activation and deactivation of candidate setting based on the MAC CE may be equally applied to a semi-persistent CSI-RS.

When semi-persistent channel status reporting setting and activation is performed using the RS setting, the channel state reporting setting, and the channel measurement setting in Table 5n, information configured by the base station via a higher layer may be used in a case of the reference signal setting and the channel state reporting setting, and the channel measurement setting may be transmitted by the base station to the terminal through the DCI. Here, the base station can flexibly change the measurement setting in the semi-persistent channel state reporting settings that support flexible activation and deactivation of channel state reporting, thereby efficiently operating reporting resources.

As mentioned above, aperiodic channel state reporting and semi-persistent channel state reporting share a large amount of characteristics, such as Type II channel state reporting and channel state reporting for subbands. Accordingly, when a trigger for aperiodic channel state reporting and a downlink control signal for activating semi-persistent channel state reporting are separately provided, various overheads for support of different DCI formats, information quantity for triggering and activation, time and frequency resources for uplink transmission, or the like is required for reporting. Accordingly, a trigger for aperiodic channel state reporting and bits for activating semi-persistent channel state reporting may be shared (i.e., triggering of aperiodic channel state reporting and activation of semi-persistent channel state reporting are performed using the same information), thereby minimizing DCI formats, information quantity, and the use of frequency and time resources and achieving efficient operation. For example, in the LTE system, with respect to a CSI process or cells, a bit of 1 or 0 is used to indicate whether a corresponding CSI process or cell is triggered for aperiodic channel state reporting. The above information may also be used in the NR system to support triggering or activation of aperiodic or semi-persistent channel state reporting for the above mentioned CSI measurement settings or a CSI process supported by the NR system. Further, X and Y may be the same period.

In the resource allocation, a reporting type indication using DCI may be supported. For example, 0 may indicate aperiodic channel state reporting, and 1 may indicate semi-persistent channel state reporting. Here, when the base station indicates "0" together with channel state measurement information, the terminal may determine that aperiodic channel state reporting is triggered and report channel state information via only one time resource. When the base station indicates "1", the terminal may determine that semi-persistent channel state reporting is activated or deactivated and report channel state information via a plurality of time resources.

As a resource allocation method for semi-persistent channel state reporting described above, the following methods may be used.

Resource allocation method 1 for semi-persistent channel state reporting: A method of configuring a resource for semi-persistent channel state reporting via a higher layer Resource allocation method 2 for semi-persistent channel state reporting: A method of dynamically configuring a resource for semi-persistent channel state reporting through DCI or an MAC CE Resource allocation method 1 for semi-persistent channel state reporting is a method of configuring a resource via a higher layer. For semi-persistent channel state reporting, channel reporting settings via a higher layer may be pre-configured as in the PUCCH resource setting (0 to 1184) in Table 50. When aperiodic channel state reporting and semi-persistent channel state reporting are triggered, activated, and deactivated based on one piece of DCI, if semi-persistent channel state reporting uses resource allocation method 1 and resource allocation for aperiodic channel state reporting is transmitted through the DCI or an MAC CE, the terminal may not need resource allocation information transmitted using the DCI or the MAC CE. Therefore, in this case, a corresponding resource allocation bit may be used as a method for distinguishing aperiodic channel state reporting from semi-persistent channel state reporting. For example, when there is no resource allocated through the corresponding resource allocation information, aperiodic channel state reporting may not be supported. Therefore, when a resource is not allocated (e.g., all bits of the resource allocation information are "0") and an indication of this information is transmitted to the terminal, the terminal determines that the indication is a trigger for semi-persistent channel state reporting and uses the same.

Figure 5B:
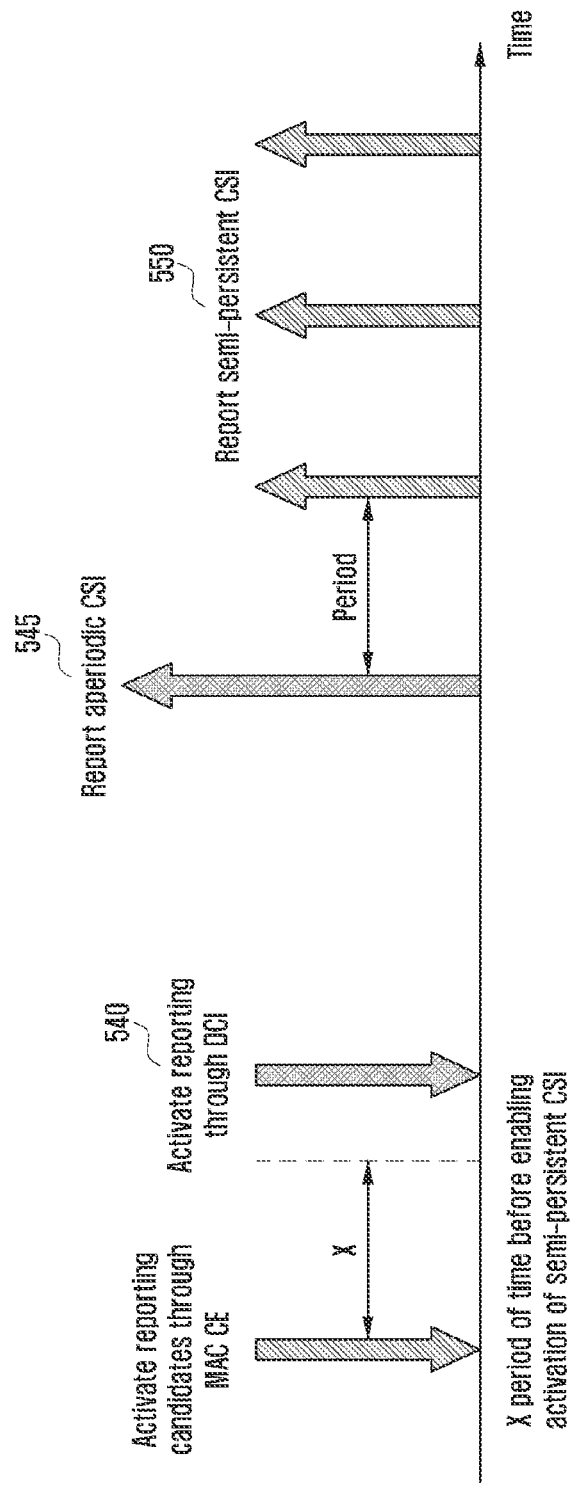
FIG. 5B illustrates an example of a terminal operation of reporting an aperiodic channel state in initial reporting of semi-persistent channel state reporting according to an embodiment of the disclosure.

In another method according to FIG. 5B, when the base station indicates a semi-persistent channel state reporting triggering by using an independent indication bit through DCI in the above situation (indicated by reference numeral 540), the terminal may perform aperiodic channel state reporting based on a resource allocation information bit at the initial transmission timepoint of an initial semi-persistent channel state reporting or the time of aperiodic channel state reporting timepoint by the DCI (indicated by reference numeral 545), and may perform semi-persistent channel state reporting via a resource configured in advance via a higher layer at the reporting timepoint of a remaining semi-persistent channel state report (indicated by reference numeral 550).

FIG. 5B illustrates an example of the operation of a terminal that reports an aperiodic channel state in initial reporting of semi-persistent channel state reporting. This aperiodic channel state reporting enables a base station to identify whether the terminal properly receives a corresponding semi-persistent channel state reporting activation or deactivation signal, so as to secure the reliability of an indication through DCI.

Here, resource allocation for aperiodic channel state reporting by the base station may use a method mentioned in resource allocation method 2 below.

Resource allocation method 2 is a method of configuring a resource through DCI or an MAC CE, which transmits a corresponding reporting configuring resource to a terminal. Here, a resource transmission unit definition method may include the following methods.

Resource allocation unit definition method 1 for semi-persistent channel state reporting: A method of allocating a reporting resource to a particular RBG and transmitting channel state information via the particular RBG Resource allocation unit definition method 2 for semi-persistent channel state reporting: A method of allocating a reporting resource to particular noncontiguous RBs and transmitting channel state information via the particular RBG Resource allocation unit definition method 3 for semi-persistent channel state reporting: A method of allocating a reporting resource to particular contiguous RBs and transmitting channel state information via the particular RBG Resource allocation unit definition method 1 is a method of allocating a semi-persistent channel state reporting to a particular RBG and transmitting the reporting via the RBG. In the channel state report, the size of the RBG may change depending on the system bandwidth supported by a system.

When the semi-persistent channel state reporting resource is allocated through the resource allocation method, an indication for the resource allocation may be commonly used in the semi-persistent channel state reporting and the aperiodic channel state reporting. Therefore, as mentioned above, the terminal may identify whether the indication is to trigger aperiodic channel state reporting or to activate or deactivate semi-persistent channel state reporting, and may identify whether the resource allocation is used for aperiodic channel state reporting or for semi-persistent channel state reporting according to the indication.

In addition, when the indication for the resource allocation is used for semi-persistent CSI-RS transmission and aperiodic CSI-RS transmission, the gist of the disclosure may be applied equally. That is, a semi-persistent CSI-RS and an aperiodic CSI-RS may be activated/deactivated or transmitted via the same DCI and it may be indicated via DCI whether a corresponding trigger is for the semi-persistent CSI-RS or for the aperiodic CSI-RS.

As still another method, a method of combining allocation using a higher layer and dynamic allocation, which are described above, may be used. For example, in this method, a plurality of resources for semi-persistent channel state reporting is allocated using a higher layer by resource allocation method 1 and is dynamically selected through DCI or an MAC CE. This method may be supported using independent DCI or MAC CE field. Alternatively, when the base station indicates to the terminal that semi-persistent channel state reporting is supported using one bit, the terminal may interpret a resource allocation field for aperiodic channel state reporting differently as a field for resource selection for semi-persistent channel state reporting.

As mentioned above, both aperiodic channel state reporting and semi-persistent channel state reporting may support a plurality of subband reports. As mentioned above, periodic channel state reporting of the existing LTE system has dependency between reporting timepoints (inter-subframe dependency). In this case, however, if one piece of information is not properly decoded, all of other pieces of information cannot be properly decoded. For example, if an RI is not properly decoded, all PMI and CQI information associated with this RI reporting cannot be correctly decoded. Therefore, the NR system is required to reduce such dependency. However, subband reporting has an increase in reporting amount. To this end, if reporting is performed at separate reporting times, the number of reporting timepoints increases, and thus dependency between reporting timepoints also increases. In this case, if reporting at an earlier time is not properly performed, subsequent reports lose validity. In addition, assuming that the timepoint for periodic channel state reporting cannot always be guaranteed in an unlicensed band, this risk increases. In order to reduce the information transmission amount of a corresponding report, unlike aperiodic channel state reporting, semi-persistent channel state reporting may consider the following methods.

- Subband information amount reduction method 1 for semi-persistent channel state reporting: A method of using relatively large subbands.
- Subband information amount reduction method 2 for semi-persistent channel state reporting: A method of using subbands having different sizes according to a size allowed in resource allocation and a reporting information amount to be reported at a reporting timepoint.

Subband information amount reduction method 1 for semi-persistent channel state reporting is using a relatively large subband. For example, the LTE system uses a subband with a size of one, two, three, or four PRBs depending on the system bandwidth. In this case, when a subband with a size of two, four, six, or eight PRBs is supported for semipersistent channel state reporting, a channel state information reporting amount for the subband may be halved.

Subband information amount reduction method 2 for semi-persistent channel state reporting is a method of using subbands having different sizes according to a size allowed in resource allocation and a reporting information amount to be reported at a reporting timepoint. Table 5a illustrates resource configurations for PUCCH formats 4 and 5 of the LTE system.

TABLE 5s

| Format4-resource-r13 ::= | SEQUENCE { |
|---|---|
| startingPRB-format4-r13 | INTEGER (0..109), |
| numberOfPRB-format4-r13 | INTEGER (0..7) |
| } | |

TABLE 5s-continued

| Format5-resource-r13 ::= | SEQUENCE { |
|---|---|
| startingPRB-format5-r13 | INTEGER (0..109), |
| cdm-index-format5-r13 | INTEGER (0..1) |
| } | |

According to PUCCH formats 4 and 5, up to 96 bits (in one RB configuration) and up to 48 bits can be transmitted, respectively. In a case of format 4, a plurality of RBs may be configured, and accordingly as many bits as the number of RBs multiplied by 96 bits may be transmitted. Therefore, the terminal may calculate transmittable subband information by calculating the maximum transmission amount. Here, the calculation may be performed in consideration of various aspects, such as a multi-cell, multiple CSI processes, a multi-CSI measurement set trigger, and Type II CSI simultaneous transmission or not. For example, when 20 bits are required for one subband channel state reporting and there is a remaining space of 40 bits allowed for entire semi-persistent channel state reporting, the terminal may generate two pieces of subband information by configuring a subband size to be half of the entire system band or a total band allocated for the terminal and may report the subband channel state information to the base station.

Figure 5C:
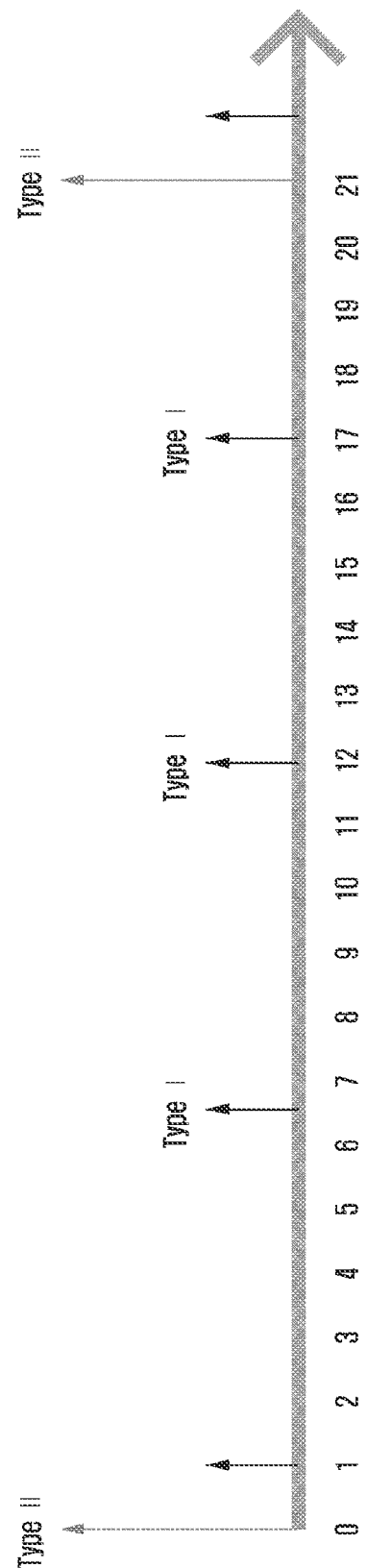
FIG. 5C illustrates an example in which Type I and Type II channel reporting are simultaneously supported according to an embodiment of the disclosure.

As mentioned above, semi-persistent channel state reporting may support both Type I channel state information and Type II channel state information. Here, one measurement setting or CSI process may be configured to support both Type I channel state information and Type II channel state information at different reporting timepoints. FIG. 5C below illustrates an example in which Type I and Type II channel reporting are simultaneously supported.

As mentioned above, Type II channel state reporting requires a large amount of information. Therefore, it may be difficult to report Type II information together with Type I information. Here, the channel state information may be reported using the following methods.

- Reporting method 1 in the occurrence of a collision between Type I channel state reporting and Type II channel state reporting: Type II information may be first transmitted.
- Reporting method 2 in the occurrence of a collision between Type I channel state reporting and Type II channel state reporting: Information configured by a base station via a higher layer may be selected and transmitted.

In reporting method 1 in the occurrence of a collision between Type I channel state reporting and Type II channel state reporting, Type II information is first transmitted. As mentioned above, since Type II information provides a large amount of information and includes high reference signal overhead, high UE complexity, and high reporting overhead required in generating the information, Type II information is generated or triggered over a long period. On the other hand, Type I information requires relatively low reference signal overhead, low UE complexity, and low reporting overhead and thus is relatively frequently generated and reported. Therefore, since Type II information is more important information, it is advantageous for the base station that the terminal first transmits Type II channel state information. This method may be equally applied to the LTE system. The LTE system supports advanced channel state reporting through the following linear combination compared to an existing codebook.

A precoder is normalized by the following equation:

$$W_1 = \begin{bmatrix} B & 0 \\ 0 & B \end{bmatrix},$$

$$B = \begin{bmatrix} p_0 b_{k_1^{(0)}, k_2^{(0)}}, \ldots, p_{L-1} b_{k_1^{(L-1)}, k_2^{(L-1)}} \end{bmatrix}$$

– for rank 1: $W = \begin{bmatrix} \tilde{w}_{0,0} \\ \tilde{w}_{1,1} \end{bmatrix} = W_1 W_2$, and $W_2 = \begin{bmatrix} c_{0,0} \\ c_{1,0} \end{bmatrix}$ – for rank 2: $W = \begin{bmatrix} \tilde{w}_{0,0} & \tilde{w}_{0,1} \\ \tilde{w}_{1,0} & \tilde{w}_{1,1} \end{bmatrix} = W_1 W_2$, and $W_2 = \begin{bmatrix} c_{0,0} & cw_{0,1} \\ c_{1,0} & c_{1,1} \end{bmatrix}$ – $c_{r,l} = [c_{r,l,0}, \ldots, c_{r,l,L-1}]^T, r = 0, 1, l = 0, 1$ $$\tilde{w}_{r,l} = \sum_{i=0}^{L-1} b_{k_1^{(i)}, k_2^{(i)}} \cdot p_i \cdot c_{r,l,i}; r = 0, 1, l = 0, 1$$

L=2 indicates the number of beams
$b_{k_1, k_2}$ is a 2D DFT beam from oversampled grid
$k_1 = 0, 1, \ldots, N_1 O_1 - 1$
$k_2 = 0, 1, \ldots, N_2 O_2 - 1$
$0 \leq P_i \leq 1$ is a beam power scaling factor for beam i
$c_{r,l,i}$ is the beam combining coefficient for beam i, polarization r, and layer l
Here, beam selection of W1 is represented as follows.

$O_1 = O_2 = 4$ (if $N_2 = 1, O_2 = 1$)

$2N_1 N_2 \in \{4, 8, 12, 16, 20, 24, 28, 32\}$

The leading (stronger) beam index:
$k_1^{(0)} = 0, 1, \ldots, N_1 O_1 - 1$
$k_2^{(0)} = 0, 1, \ldots, N_2 O_2 - 1$
The second (weaker) beam index:
$k_1^{(1)} = k_1^{(0)} + O_1 d_1$
$k_2^{(1)} = k_2^{(0)} + O_2 d_2$
  $d_1 \in \{0, \ldots, \min(N_1, L_1) - 1\}$
  $d_2 \in \{0, \ldots, \min(N_2, L_2) - 1\}$
  $(d_1, d_2) \neq (0, 0)$
  Where $L_1, L_2$ are defined as:
    If $N_1 \geq N_2$ and $N_2 \neq 1 \rightarrow L_1 = 4, L_2 = 2$
    If $N_1 < N_2$ and $N_2 \neq 1 \rightarrow L_1 = 4, L_2 = 2$
    If $N_2 = 1 \rightarrow L_1 = 8, L_2 = 1$ In addition, here, beam power of W1 is determined as follows.

Second beam power is quantized by 2 bits.

$p_0 = 1, p_1 = \in \{1, \sqrt{0.5}, \sqrt{0.25}, 0\}$

In addition, here, W2 is determined as follows.

$c_{0,0,0} = c_{0,1,0} = 1$ always $c_{r,l,i} \in \{1, j, -1, -j\}, \forall i, r, l$ When $N_1 = N_2 = 4$, overhead of W1 is as follows.
indicate leading beam: $\lceil \log_2(N_1 N_2 O_1 O_2) \rceil = \lceil \log_2(16 N_1 N_2) \rceil = 8$ bits
indicate second beam:

$\left\lceil \binom{7}{1} \right\rceil = 3$ bits

Relative power of weaker beam: 2 bits
In addition, the bit numbers of W1 and W2 according to each rank are illustrated below.

TABLE 5t

| Rank | W1(bits) | W2(bits) |
|------|----------|----------|
| 1    | 13       | 6        |
| 2    | 13       | 12       |

In reporting method 2 in the occurrence of a collision between Type I channel state reporting and Type II channel state reporting, information configured by a base station via a higher layer is selected and transmitted. The base station may directly configure reporting priorities for a terminal through a higher layer. Therefore, the terminal determines reporting priorities in the occurrence of a collision according to priorities configured in a measurement setting. This method may be used for the same channel state reporting (Type I and Type I).

Although the proposed methods of the disclosure have been described as being used for downlink channel state reporting, the proposed methods of the disclosure may also be equally applied to uplink channel state reporting and sidelink channel state reporting.

Although the proposed methods of the disclosure have been described as being used for semi-persistent, channel state reporting and aperiodic channel state reporting, the proposed methods of the disclosure may also be equally applied to a semi-persistent CSI-RS and an aperiodic CSI-RS.

A reference signal that a terminal needs for channel estimation in receiving data is transmitted at regular frequency and time intervals.

FIG. 5D illustrates an example of time and frequency intervals between reference signals.

The time and frequency intervals between the reference signals illustrated in FIG. 5D may vary according to sub-carrier spacing. The intervals change depending on the maximum delay spread and the maximum Doppler spread that occur in a channel according to the subcarrier spacing. Equations 3 and 4 represent time and frequency intervals between reference signals considering the maximum delay spread and the maximum Doppler spread.

$$n \leq \frac{1}{2 T_{symbol} v_{max}} \qquad \text{[Equation 3]}$$

$$m \leq \frac{1}{2 \Delta f \tau_{max}} \qquad \text{[Equation 4]}$$

Here, $v_{max}$ denotes the maximum Doppler spread, T symbol denotes OFDM symbol duration, $\Delta f$ denotes the subcarrier spacing, and $\tau_{max}$ denotes the maximum delay spread. In the NR system, not only $\Delta f$ but also $T_{symbol}$ changes are inversely proportional to a change in subcarrier spacing. Therefore, efficiency with which a base station transmits data to a terminal changes depending on the subcarrier spacing or numerology.

Even when data is transmitted in the same band, system performance changes according to subcarrier spacing. Therefore, in order to deal with a change in the system performance, a terminal may transmit a channel state reporting to a base station by reflecting the subcarrier spacing or numerology thereto. When the terminal transmits a channel state reporting to the base station by reflecting the subcarrier spacing or numerology, the terminal can report an accurate channel state, a CQI, and the like to the base station, and the base station can minimize data loss and maximize system performance based thereon. In order to perform reporting that reflects the subcarrier spacing or numerology, the base station may configure subcarrier spacing for the terminal by using the following methods.

- Subcarrier spacing configuration method 1 for channel state reporting: Subcarrier spacing for channel state reporting is configured using a direct method.
- Subcarrier spacing configuration method 2 for channel state reporting: Subcarrier spacing for channel state reporting is configured using an indirect method.

Subcarrier spacing configuration method 1 for channel state reporting is a method of configuring subcarrier spacing for channel state reporting by using a direct method. In this method, the base station directly sets, for the terminal, subcarrier spacing necessary for channel state reporting, so that the terminal can identify the subcarrier spacing for data transmission and can receive data. To this end, the base station may configure or transmit the subcarrier spacing by using RRC signaling, an MAC CE, or the DCI to the terminal. When using an MAC CE or DCI, the base station may designate some of subcarrier spacing candidates pre-configured via RRC signaling through the MAC CE or DCI, may reselect some of the subcarrier spacing candidates configured via RRC signaling as candidates for DCI indication through the MAC CE, and may finally select subcarrier spacing via DCI.

Subcarrier spacing configuration method 2 for channel state reporting is a method of configuring subcarrier spacing for channel state reporting by using an indirect method. The base station may indirectly configure subcarrier spacing in order to configure subcarrier spacing for channel state reporting. For example, the terminal may identify subcarrier spacing for channel state reporting through reference numerology configured by the base station. For example, when the reference numerology is 15 kHz, the terminal may recognize that numerology for channel state reporting is also 15 kHz. In another example, it is also possible to follow the subcarrier spacing or numerology of a CSI-RS. The terminal may identify subcarrier spacing or numerology for channel state reporting according to numerology configured for CSI-RS transmission performed or configured for channel state reporting to the terminal. In still another example, numerology of data transmission performed most recently to the terminal may be used. In the NR system, general data and data transmitted for high mobility and URLLC transmission may have different numerologies. Here, channel state reporting may be performed according to the numerology of data transmission most recently performed.

Figure 5E:
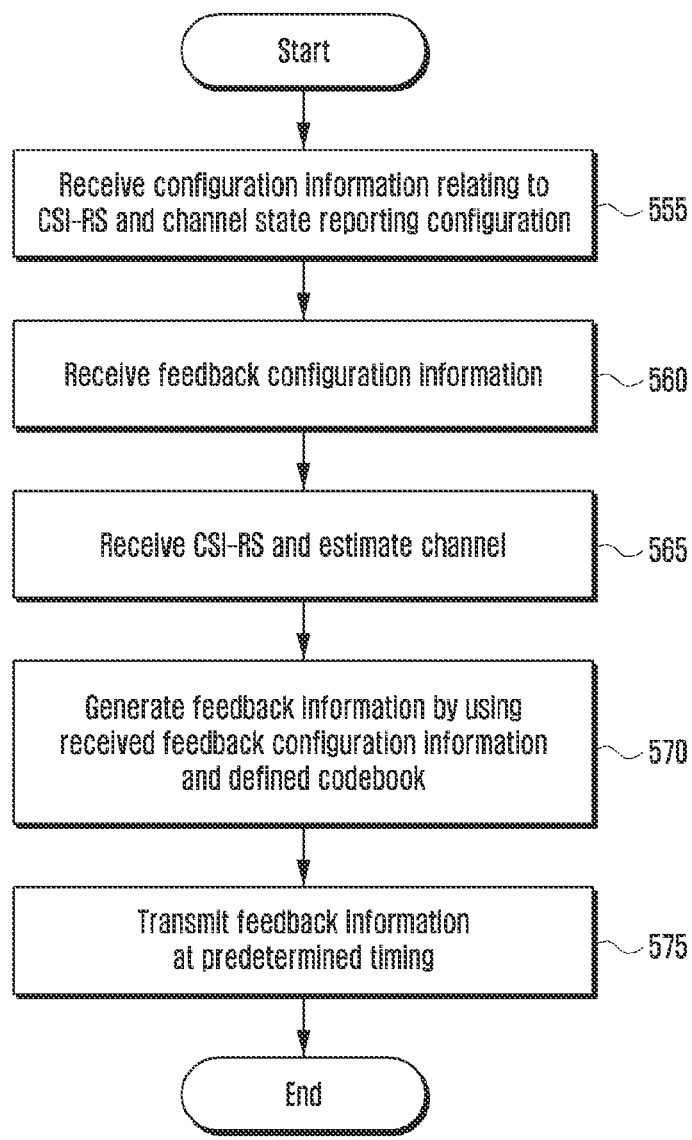
FIG. 5E is a flowchart illustrating an operation sequence of a terminal according to an embodiment of the disclosure.

FIG. 5E is a flowchart illustrating an operation sequence of a terminal according to an embodiment of the disclosure.

Referring to FIG. 5E, in operation 555, a terminal receives configuration information associated with a CSI-RS and a channel state reporting configuration. In addition, the terminal may identify, based on the received configuration information, at least one of the number of ports for respective non-precoded (NP) CSI-RSs, the number of antennas by dimension, that is N1 and N2, an oversampling factor by dimension, that is O1 and O2, one subframe configuration for transmission of a plurality of CSI-RSs and a plurality of resource configurations for configuration of a position, codebook subset restriction-related information, CSI report-related information, a CSI process index, and transmission power information (Pc). Next, in operation 560, the terminal receives one piece of feedback configuration information based on the location of the CSI-RS. The feedback configuration information may include a period and an offset of a PMI and/or a CQI, a period and an offset of an RI, a period and an offset of a CRI, and whether it is a wideband or subband, or a submode. In operation 565, the terminal receives a CSI-RS based on the information and estimates a channel between a base station antenna and a reception antenna of the terminal based on the received CSI-RS. In operation 570, the terminal generates a feedback information rank, a PMI, and a CQI by using the received feedback configuration based on the estimated channel, and may select an optimal CRI based on the feedback information rank, the PMI, and the CQI. Next, in operation 575, the terminal transmits the pieces of feedback information to the base station at a predetermined feedback timing according to the feedback configuration or an aperiodic channel state reporting triggering of the base station, thereby completing generating and reporting channel feedback.

Figure 6A:
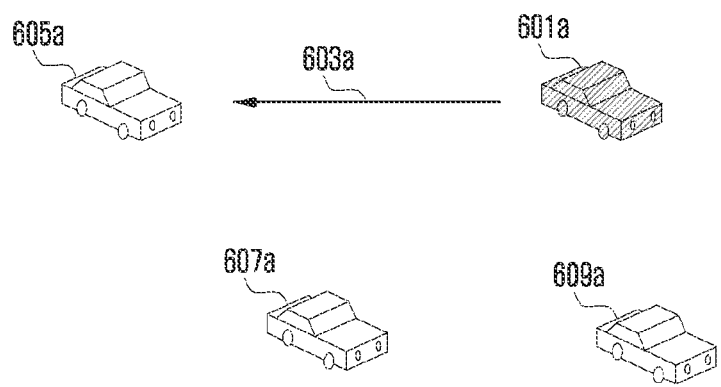
FIG. 6A illustrates an example in which one-to-one communication, i.e., unicast communication, is performed between two terminals through a sidelink according to an embodiment of the disclosure.

FIG. 6A illustrates an example in which one-to-one communication, i.e., unicast communication, is performed between two terminals 601a and 605a through a sidelink.

FIG. 6A illustrates an example in which a signal is transmitted from a first terminal 601a to a second terminal 605a, and the direction of signal transmission may be reversed. That is, a signal may be transmitted from the second terminal 605a to the first terminal 601a. Terminals 607a and 609a other than the first terminal 601a and the second terminal 605a may not receive signals exchanged through unicast communication between the first terminal 601a and the second terminal 605a. The exchange of signals through the unicast communication between the first terminal 601a and the second terminal 605a may be performed through mapping in a promised resource between the first terminal 601a and the second terminal 605a, or may be performed through a process of scrambling using a value promised therebetween, mapping of control information, data transmission using mutually configured values, and identifying unique ID values with each other. The terminal may be a mobile terminal such as a vehicle. For the unicast communication, separate control information, physical control channels, and data may be transmitted.

Figure 6B:
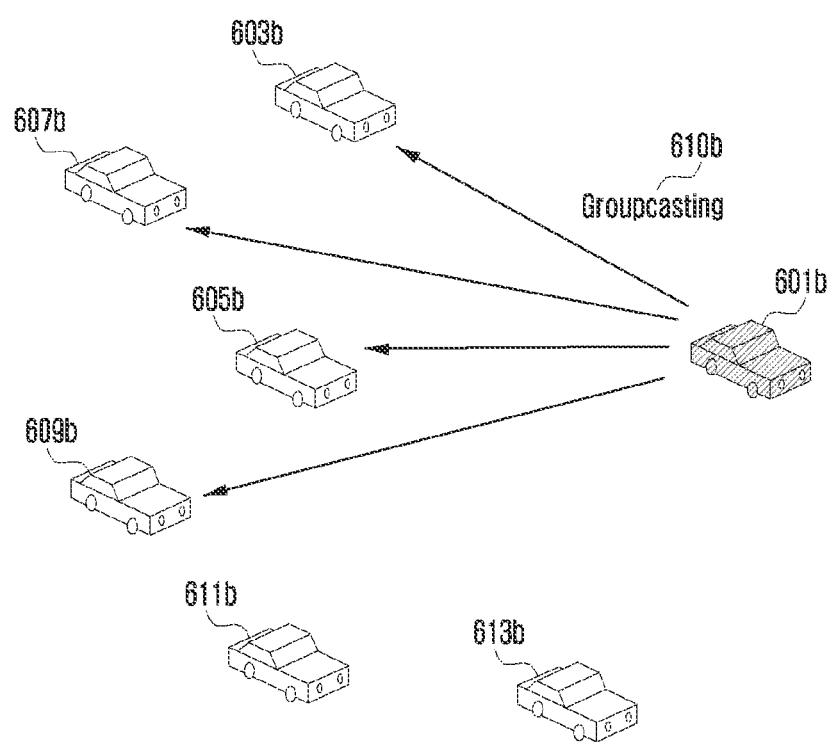
FIG. 6B illustrates an example of groupcast communication in which one terminal transmits common data to a plurality of terminals through a sidelink according to an embodiment of the disclosure.

FIG. 6B illustrates an example of groupcast communication 610b in which one terminal 601b transmits common data to a plurality of terminals 603b, 605b, 607b, and 609b through a sidelink.

In FIG. 6B, an example, in which a first terminal 601b transmits a signal to other terminals 603b, 605b, 607b, and 609b in a group, is illustrated and other terminals 611b and 613b that are not included in the group may not receive signals transmitted for groupcast communication.

A terminal for transmitting a signal for the groupcast communication may correspond to another terminal in the group, and resource allocation for signal transmission may be provided by a base station or a terminal serving as a leader in the group, or may be selected by the terminal itself which has transmitted the signal. The terminal may be a mobile terminal such as a vehicle. Separate control information, physical control channels, and data may be transmitted for the groupcasting.

Figure 6C:
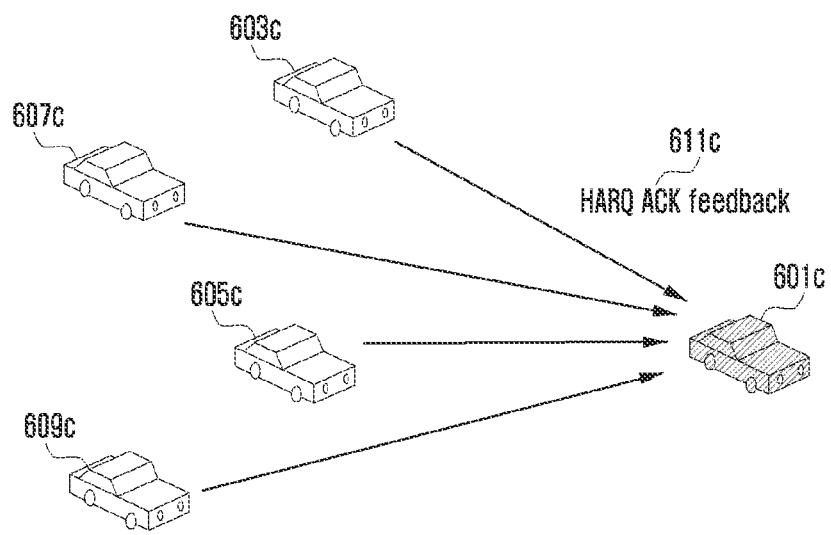
FIG. 6C illustrates a process in which terminals that have received common data through group casting transmit information related to success or failure of data reception to a terminal that has transmitted data according to an embodiment of the disclosure.

FIG. 6C illustrates a process in which terminals 603c, 605c, 607c, and 609c, which have received common data through groupcasting, transmit information associated with success or failure of reception of data to a terminal 601c which has transmitted data. The information may be information such as HARQ-ACK feedback 611c. In addition, the terminals may be terminals having an LTE-based sidelink function or an NR-based sidelink function. If a terminal has only an LTE-based sidelink function, it may be impossible for the terminal to transmit or receive an NR-based sidelink signal and an NR-based physical channel. In the disclosure, the sidelink may be interchangeably used with PC5, V2X, or D2D. FIGS. 5 and 6 illustrate an example of transmission or reception according to groupcasting, but the descriptions may also be applied to a unicast signal transmission or reception between terminals.

Figure 7:
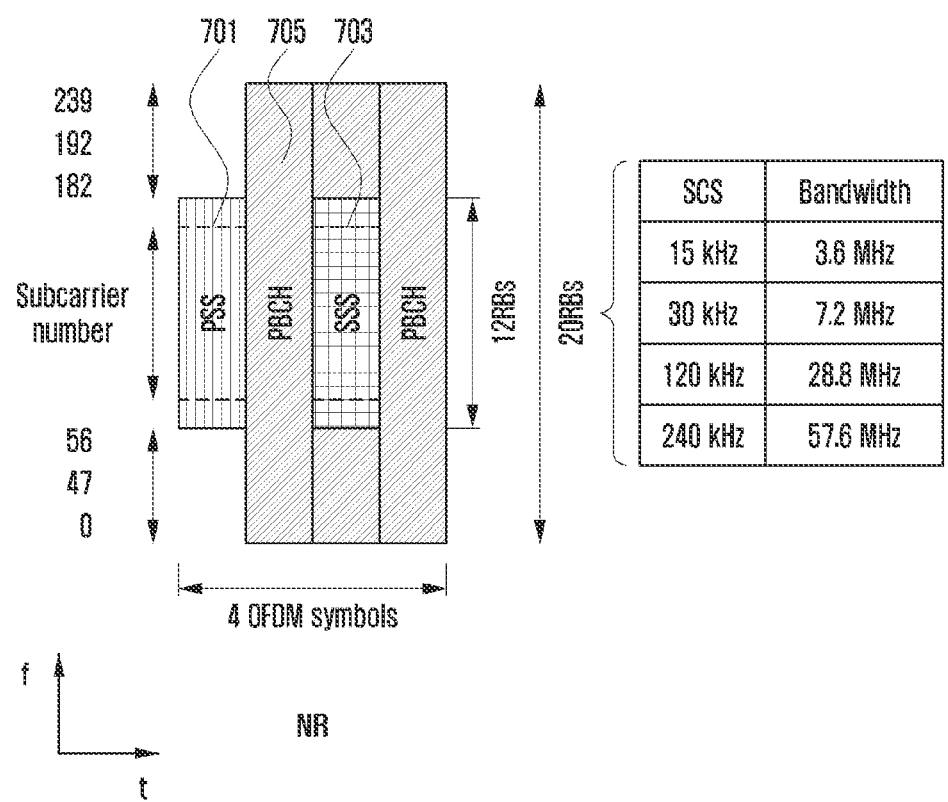
FIG. 7 illustrates a state in which a synchronization signal and a physical broadcast channel (PBCH) of an NR system are mapped in the frequency and time domains according to an embodiment of the disclosure.

FIG. 7 illustrates an aspect in which a synchronization signal and a physical broadcast channel (PBCH) of an NR system are mapped in a frequency and a time domain.

A primary synchronization signal (PSS) 701, a secondary synchronization signal (SSS) 703, and the PBCH are mapped over 4 OFDM symbols, the PSS 701 and the SSS 703 are mapped to 12 RBs, and the PBCH 705 is mapped to 20 RBs. The table in FIG. 7 shows that frequency bands of 20 RBs change according to a subcarrier spacing (SCS). A resource domain in which the PSS 701, the SSS 703, and the PBCH 705 are transmitted may be called a SS/PBCH block. In addition, the SS/PBCH block may be referred to as an SSB block.

Figure 8:
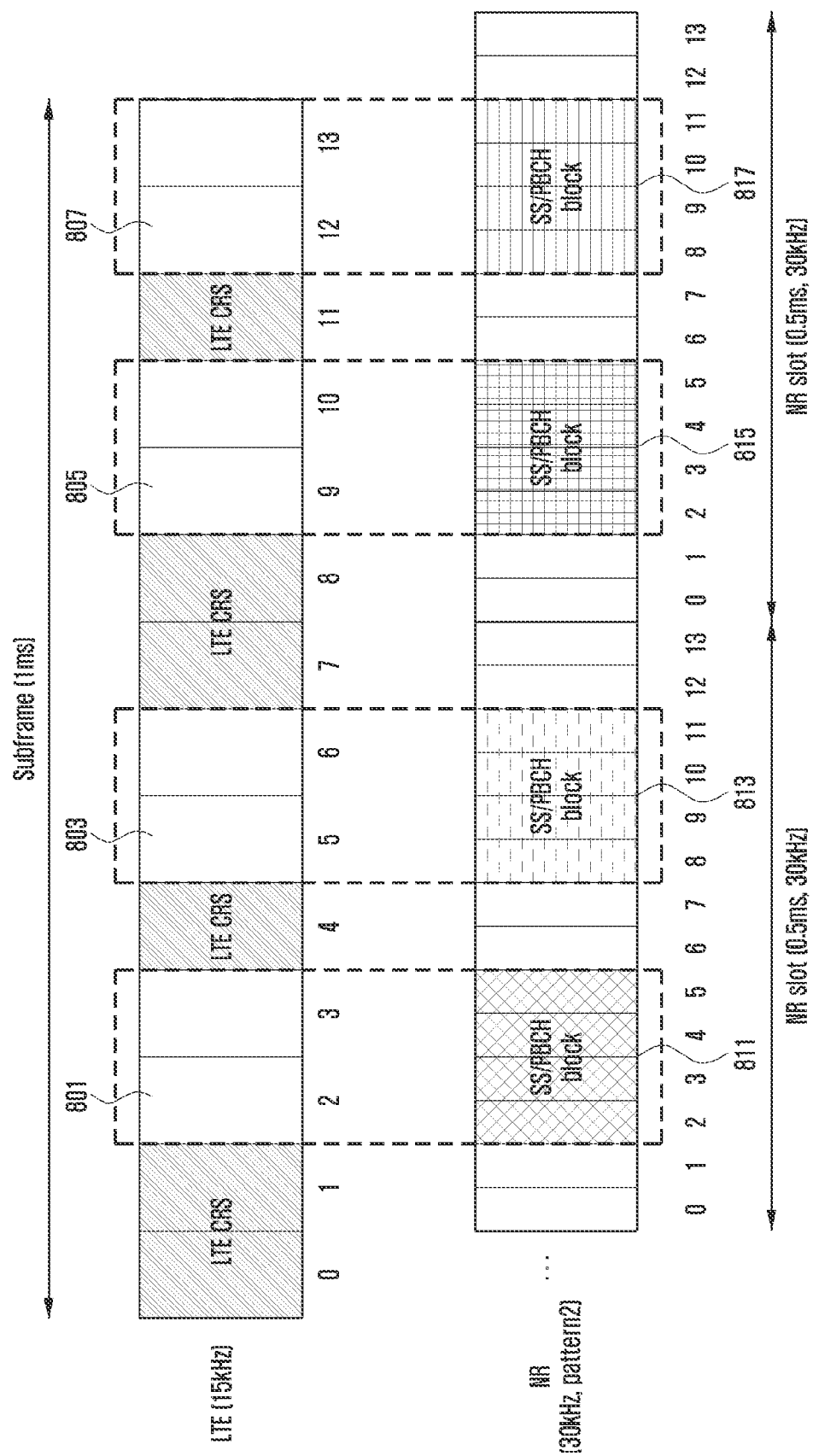
FIG. 8 illustrates symbols, in a slot, to which one SS/PBCH block is mapped according to an embodiment of the disclosure.

FIG. 8 illustrates symbols, in a slot, to which one SS/PBCH block is mapped.

Referring to FIG. 8, an example of a conventional LTE system using subcarrier spacing of 15 kHz and an NR system using subcarrier spacing of 30 kHz is illustrated, and SS/PBCH blocks 811, 813, 815, and 817 of the NR system are designed to be transmitted at positions 801, 803, 805, and 807 at which cell-specific reference signals (CRS) always transmitted in the LTE system can be avoided. The design is to allow an LTE system and an NR system to coexist in a single frequency band.

Figure 9:
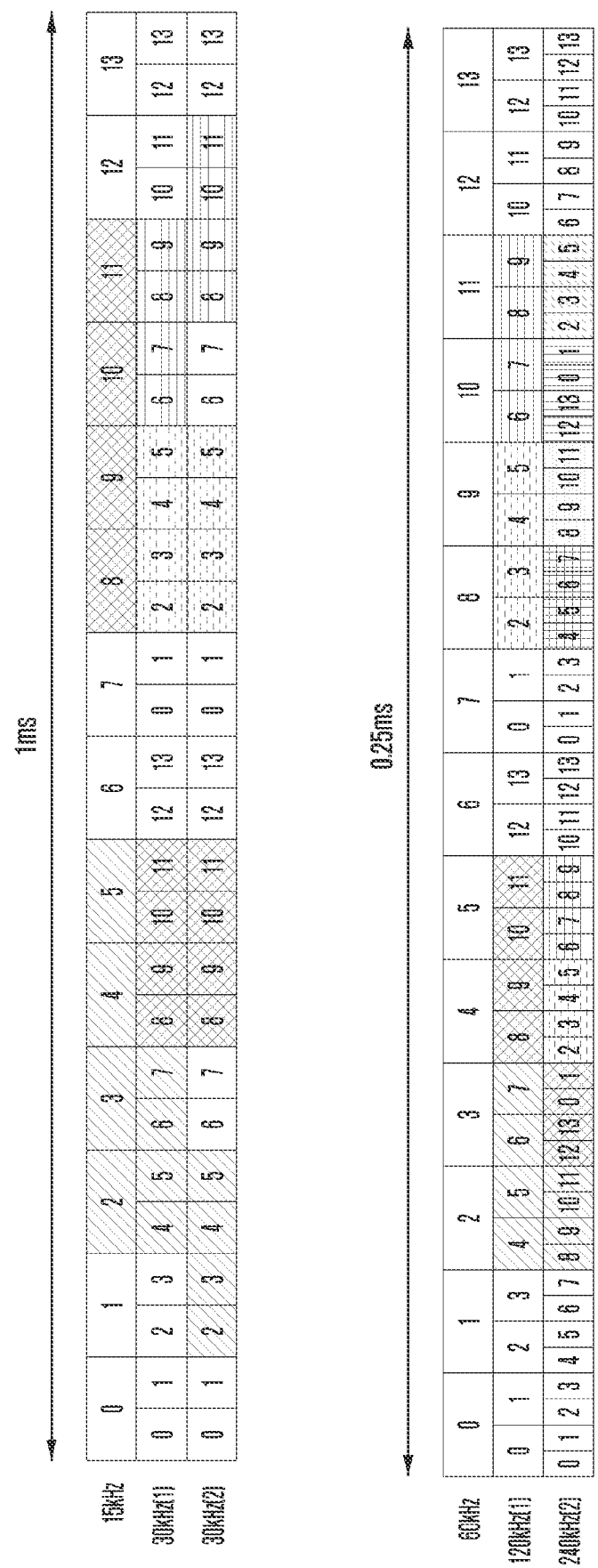
FIG. 9 illustrates symbols to which an SS/PBCH block can be transmitted according to a subcarrier spacing according to an embodiment of the disclosure.

FIG. 9 illustrates symbols to which an SS/PBCH block can be transmitted according to a subcarrier spacing.

Referring to FIG. 9, the subcarrier spacing may be configured as 15 kHz, 30 kHz, 120 kHz, 240 kHz, and the like, and the position of a symbol, in which the SS/PBCH block (or SSB block) may be positioned, may be determined according to each subcarrier spacing. FIG. 9 illustrates the position of a symbol through which an SSB block can be transmitted according to a subcarrier spacing in symbols within 1 ms, and the SSB block in the region shown in FIG. 9 is not always required to be transmitted. Accordingly, the position where the SSB block is transmitted may be configured for a terminal through system information or dedicated signaling.

Figure 10:
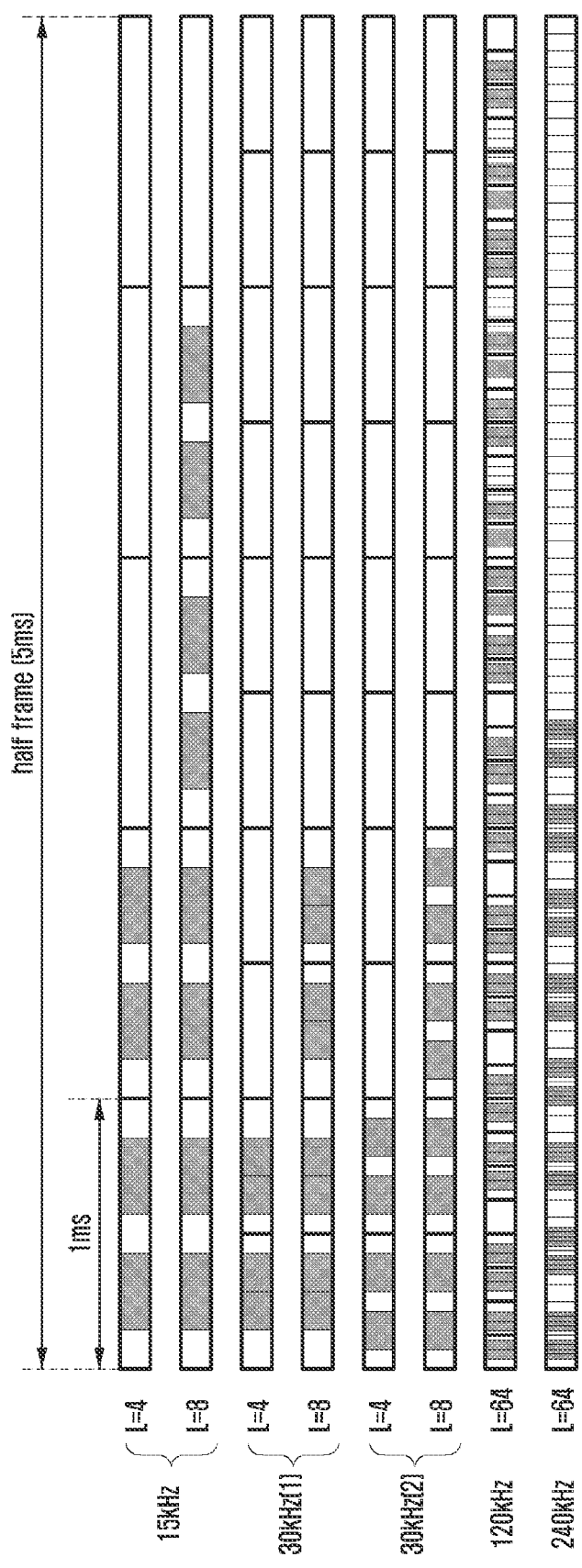
FIG. 10 illustrates symbols to which an SS/PBCH block can be transmitted according to a subcarrier spacing according to an embodiment of the disclosure.

FIG. 10 illustrates symbols to which an SS/PBCH block can be transmitted according to a subcarrier spacing.

Referring to FIG. 10, the subcarrier spacing may be configured as 15 kHz, 30 kHz, 120 kHz, 240 kHz, and the like, and the position of a symbol, in which the SS/PBCH block (or SSB block) may be positioned, may be determined according to each subcarrier spacing. FIG. 10 illustrates the position of a symbol through which an SSB block can be transmitted according to a subcarrier spacing in symbols within 5 ms, and the position where the SSB block is transmitted may be configured for a terminal through system information or dedicated signaling. In a region where the SS/PBCH block can be transmitted, the SS/PBCH block is not always required to be transmitted, and may or may not be transmitted depending on the selection of the base station. Accordingly, the position where the SSB block is transmitted may be configured for a terminal through system information or dedicated signaling.

In the disclosure, a sidelink control channel may be called a physical sidelink control channel (PSCCH), and a sidelink shared channel or a sidelink data channel may be called a physical sidelink shared channel (PSSCH). In addition, a broadcast channel which is broadcasted together with a synchronization signal may be called a physical sidelink broadcast channel (PSBCH), and a channel for feedback transmission may be called a physical sidelink feedback channel (PSFCH). In order to perform feedback transmission, a PSCCH or a PSSCH may be used. The channels may be referred to as an LTE-PSCCH, an LTE-PSSCH, an NR-PSCCH, an NR-PSSCH, and the like according to communication systems for channel transmission. In the disclosure, a sidelink may indicate a link between terminals, and a Uu link may indicate a link between a base station and a terminal.

Figure 11:
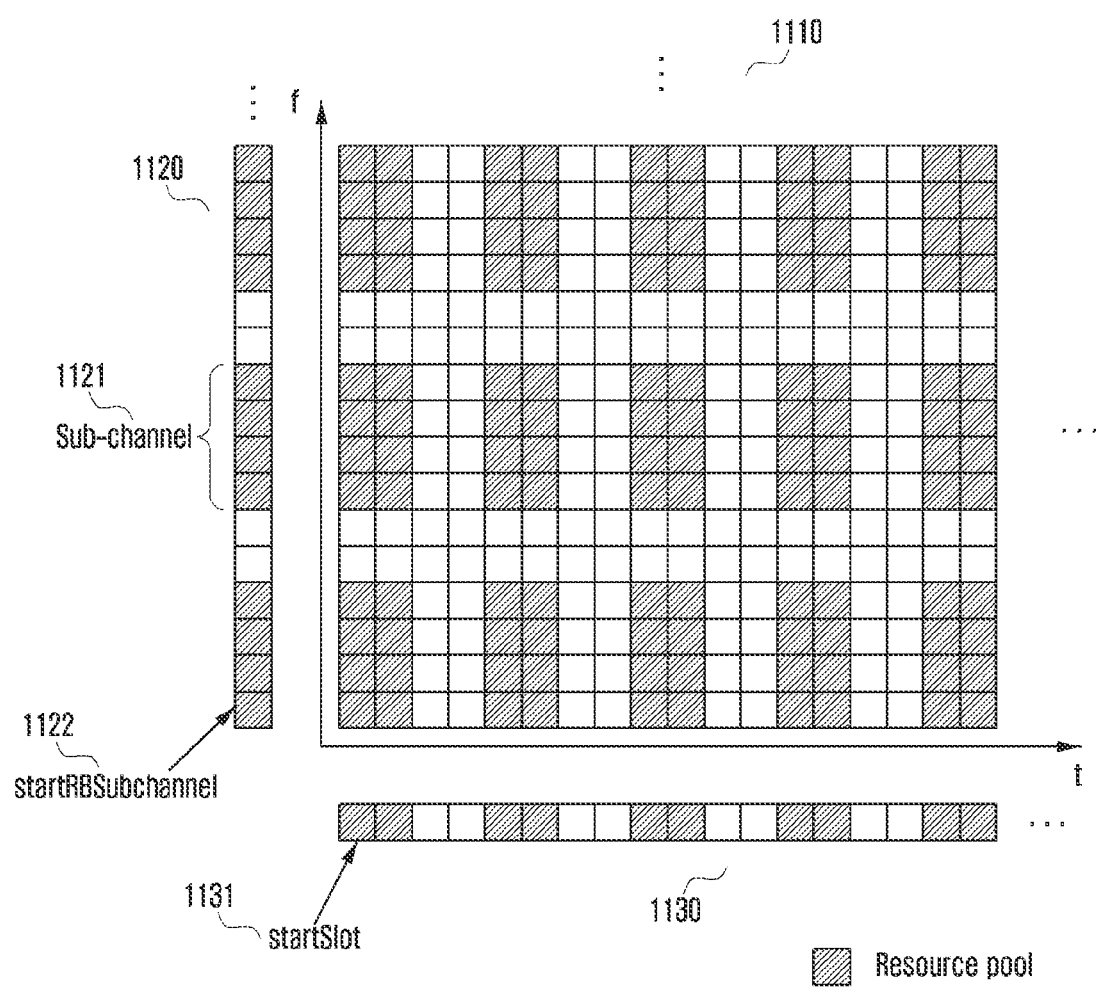
FIG. 11 illustrates an example of a resource pool, defined as a set of resources in a time and a frequency domain used for transmission or reception through a sidelink according to an embodiment of the disclosure.

FIG. 11 illustrates an example of a resource pool, defined as a set of resources in a time and a frequency domain used for transmission or reception through a sidelink.

Reference numeral 1110 is an example of illustrating a case where a resource pool is non-contiguously allocated in a time and a frequency domain. In the disclosure, a case in which the resource pool is non-contiguously allocated in the frequency domain is mainly discussed. However, it is noted that the resource pool may be contiguously allocated in the frequency domain.

Reference numeral 1120 is an example of illustrating a case in which non-contiguous resource allocation is performed in a frequency domain. A unit (granularity) of resource allocation in the frequency domain may be a physical resource block (PRB).

Reference numeral 1121 is an example of illustrating a case in which resource allocation in a frequency domain is made based on a sub-channel. A sub-channel may be defined by a unit of frequency, including multiple RBs. In other words, the sub-channel may be defined as an integer multiple of RB. Reference numeral 1121 of FIG. 11 shows a case in which the size of a sub-channel is configured by four consecutive PRBs. Sub-channels may be configured to have different sizes, and one sub-channel is generally configured by consecutive PRBs. However, there is no restriction to be configured by consecutive PRBs necessarily. A sub-channel may be a basic unit for resource allocation for a physical sidelink shared channel (PSSCH) or a physical sidelink control channel (PSCCH). Therefore, the size of a sub-channel may be differently configured according to whether a corresponding channel is a PSSCH or a PSCCH. It is noted that a sub-channel, as a term, may be replaced with a resource block group (RBG). The following embodiments describe methods for non-contiguously allocating resource pools in a frequency domain and classifying the resource pools into a plurality of sub-channels.

A startRBSubchannel, indicated by reference numeral 1122, indicates a start position of a sub-channel in a frequency domain in a resource pool.

A resource block, which is a frequency resource belonging to a resource pool for a PSSCH in an LTE V2X system, may be determined by the following method:

The resource block pool consists of $N_{subCH}$ sub-channels where $N_{subCH}$ is given by higher layer parameter numSubchannel.

The sub-channel m for m=0, 1, . . . , $N_{subCH}$−1 consists of a set of $n_{subCHsize}$ contiguous resource blocks with the physical resource block number $n_{PRB}=n_{subCHRBstar}+m*n_{subCHsize}+j$ for j=0, 1, . . . , $N_{subCHsize}$−1 where $n_{subCHRBstar}$ and $n_{subCHsize}$ are given by higher layer parameters startRBSubchannel and sizeSubchannel, respectively.

Reference numeral 1130 illustrates an example of a case in which non-contiguous resource allocation is performed in a time domain. A unit (granularity) of resource allocation in the time domain may be a slot. In the disclosure, a case in which a resource pool is non-contiguously allocated in the time domain is mainly discussed. However, it is noted that a resource pool may be contiguously allocated in the time domain.

A startSlot, indicated by reference numeral 1131, indicates a start position of a slot in the time domain in a resource pool.

Subframes ($t_0^{SL}$, $t_1^{SL}$, ..., $t_{max}^{SL}$), which are time resources belonging to a resource pool for a PSSCH in an LTE V2X system, may be determined by the following method.

$0 \leq t_i^{SL} < 10240$ the subframe index is relative to subframe #0 of the radio frame corresponding to SFN 0 of the serving cell of DFN 0 (described in [11]), the set includes all the subframes except the following subframes, subframes in which SLSS resource is configured downlink subframes and special subframes if the sidelink transmission occurs in a TDD cell, reserved subframes which are determined by the following steps:

1) the remaining subframes excluding $N_{siss}$ and $N_{dssf}$ subframes from the set of all the subframes are denoted by ($l_0, l_1, \ldots, l_{10240-N_{siss}-N_{dssf}-1}$) arranged in increasing order of subframe index, where $N_{siss}$ is the number of subframes in which SLSS resource is configured within 10240 subframes and $N_{dssf}$ is the number of downlink subframes and special subframes within 10240 subframes if the sidelink transmission occurs in a TDD cell.

2) a subframe $l_r$ ($0 \leq r < (1-240-N_{siss}-N_{dssf})$) belongs to the reserved subframes if $$r = \left\lfloor \frac{m \cdot (10240 - N_{slss} - N_{dssf})}{N_{reserved}} \right\rfloor \text{ where } m = 0, \ldots, N_{reserved} - 1$$

and $N_{reserved} = (10240-N_{siss}-N_{dssf}) \mod L_{bitmap}$. Here, $L_{bitmap}$ the length of the bitmap is configured by higher layers.

the subframes are arranged in increasing order of subframe index.

A bitmap (b0, b1, ..., $b_{L_{bitmap}-1}$) associated with the resource pool is used where $L_{bitmap}$ the length of the bitmap is configured by higher layers.

A subframe $t_k^{SL}$ ($0 \leq k < (10240-N_{siss}-N_{dssf}-N_{reserved})$) belongs to the subframe if $b_k = 1$ where k'=k mod $L_{bitmap}$.

Figure 12:
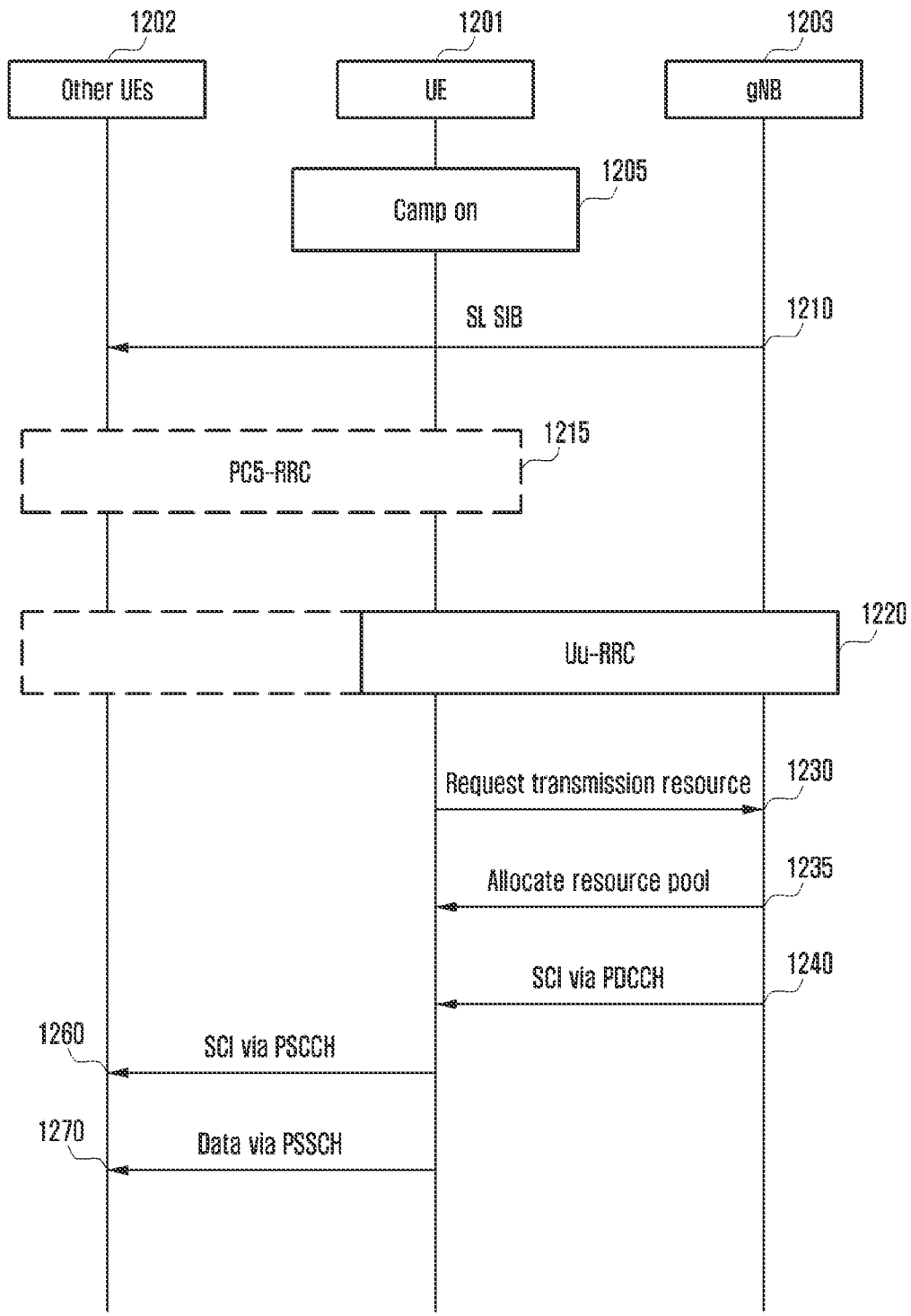
FIG. 12 illustrates an example of a method for scheduled resource allocation (mode 1) through a sidelink according to an embodiment of the disclosure.

FIG. 12 illustrates an example of a method for scheduled resource allocation (mode 1) through a sidelink. Scheduled resource allocation (mode 1) is a method in which a base station allocates resources, used for sidelink transmission, to RRC-connected UEs in a dedicated scheduling manner. The scheduled resource allocation method may be effective for interference management and resource pool management because the base station may manage resources of a sidelink.

In FIG. 12, a UE 1201, which is camping on (indicated by reference numeral 1205), receives a sidelink system information bit (SL SIB) from a base station 1203 (indicated by reference numeral 1210). The system information may include resource pool information for transmission or reception, configuration information for sensing operation, information for configuring synchronization, information for inter-frequency transmission or reception, and the like. If data traffic for V2X is generated in the UE 1201, an RRC connection with the base station 1203 is established (indicated by reference numeral 1220). Here, the RRC connection between the UE and the base station may be referred to as Uu-RRC. A process of the Uu-RRC connection may be performed before the data traffic is generated. The UE 1201 requests a transmission resource capable of V2X communication with other UEs 1202 from the base station 1203 (indicated by reference numeral 1230). At this time, the UE 1201 may request a transmission resource from the base station 1203 by using an RRC message or MAC CE. Here, as the RRC message, a SidelinkUEInformation, UEAssistanceInformation message may be used. Meanwhile, the MAC CE may be, for example, a buffer status report MAC CE having a new format (including at least an indicator notifying of a buffer status report for V2X communication and information on an amount of data that is buffered for D2D communication). Detailed format and contents of the buffer status report used in 3GPP can be understood by referring to 3GPP standard TS36.321 "E-UTRA MAC Protocol Specification". The base station 1203 allocates a V2X transmission resource to the UE 1201 through a dedicated Uu-RRC message. The message may be included in an RRCConnectionReconfiguration message. The resource allocation may be performed using a V2X resource through Uu or a resource for PC5 according to the type of traffic requested by the UE 1201 or according to whether the corresponding link is congested. In order to determine the resource allocation, the UE 1201 may add logical channel ID (LCID) information or prose per packet priority (PPPP) of V2X traffic to UEAssistanceInformation or MAC CE and transmit the same. Since the base station 1203 knows information about resources used by other UEs 1202, the base station allocates a remaining resource pool among the resources requested by the UE 1201 (indicated by reference numeral 1235). The base station 1203 may instruct the UE 1201 to perform final scheduling via DCI transmission through the PDCCH (indicated by reference numeral 1240).

Next, in a case of broadcast transmission, the UE 1201 broadcasts sidelink control information (SCI) to other UEs 1202 via the PSCCH using broadcast transmission without an additional RRC configuration of the sidelink (indicated by reference numeral 1260). In addition, the UE 1201 broadcasts data to other UEs 1220 through the PSSCH (indicated by reference numeral 1270).

Alternatively, in a case of unicast and groupcast transmission, the UE 1201 may establish an RRC connection with other UEs on a one-to-one basis. Here, in order to be distinguished from the Uu-RRC, the RRC connection between UEs may be referred to as PC5-RRC. Even in a case of groupcast communication, PC5-RRCs are individually connected between UEs belonging to a group. In FIG. 12, PC5-RRC connection 1215 is illustrated as being performed after operation 1210, but the PC5-RRC connection may be performed at any time before operation 1210 or before operation 1260. If an RRC connection between UEs is required, PC5-RRC connection of the sidelink is established and sidelink control information (SCI) is transmitted to other UEs 1202 through the PSCCH via unicast and groupcast transmission (indicated by reference numeral 1260). Here, the groupcast transmission of the SCI may be interpreted as group SCI. In addition, the UE transmits data to other UEs 1202 through the PSSCH via unicast and groupcast transmission (indicated by reference numeral 1270).

Figure 13:
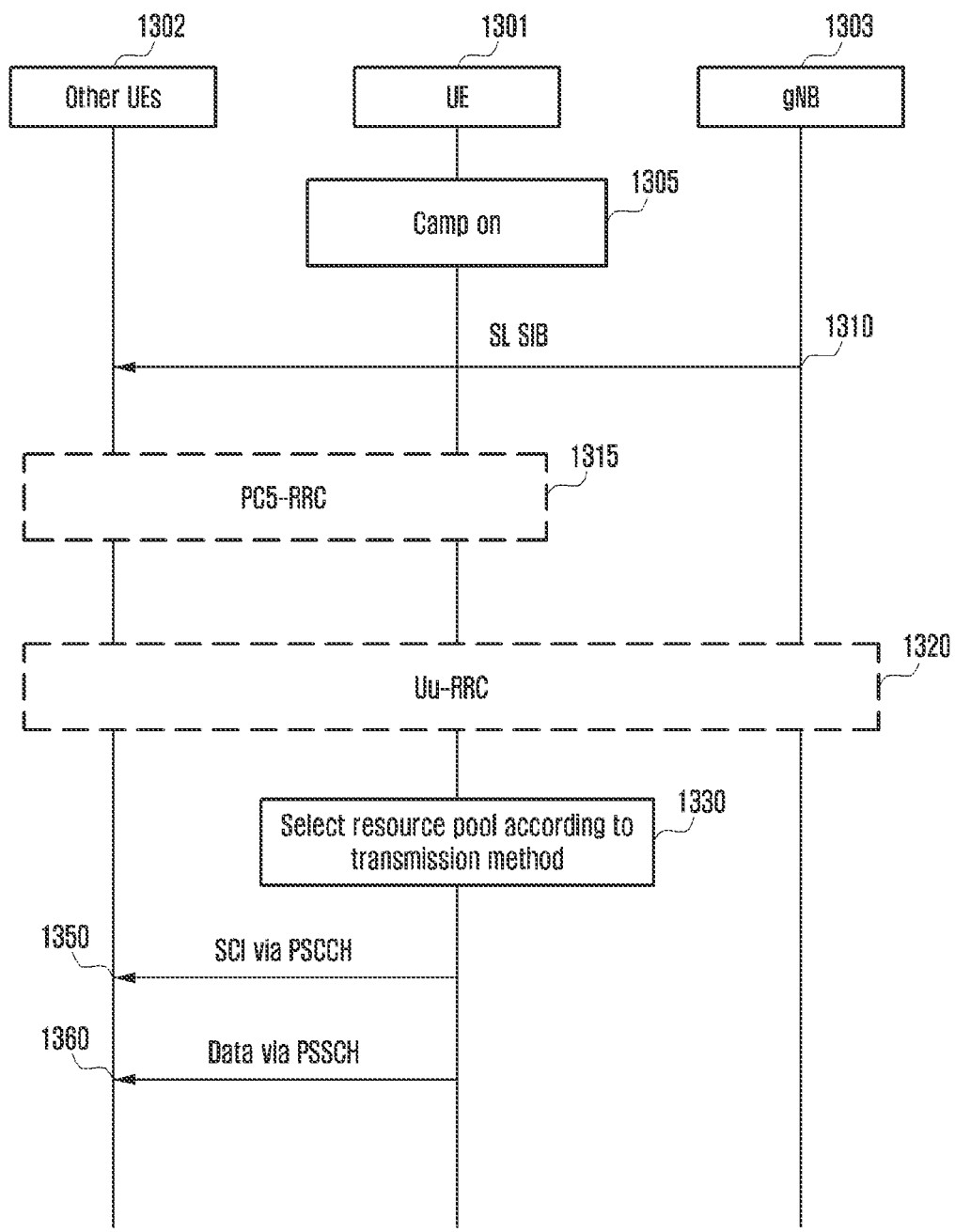
FIG. 13 illustrates an example of a method for UE autonomous resource allocation (mode 2) through a sidelink according to an embodiment of the disclosure.

FIG. 13 illustrates an example of a method for UE autonomous resource allocation (mode 2) through a sidelink.

According to UE autonomous resource allocation (mode 2), a base station provides a sidelink transmission/reception resource pool for V2X through system information, and a UE selects transmission resources according to a predetermined rule. Resource selection methods may include zone mapping, sensing-based resource selection, random selection, and the like. There is a difference in that, unlike the method for scheduled resource allocation (mode 1) in which the base station itself participates in resource allocation, in FIG. 13, a UE 1301 autonomously selects a resource based on a resource pool previously received through system information and transmits data. In V2X communication, a base station 1303 may allocate various types of resource pools (a V2V resource pool and a V2P resource pool) for the UE 1301. The resource pool may include a resource pool in which a UE autonomously selects an available resource pool after sensing resources used by other neighboring UEs, and a resource pool in which a UE randomly selects a resource from a preconfigured resource pool.

The UE 1301, which is camping on (indicated by reference numeral 1305), receives a sidelink system information bit (SL SIB) from a base station 1303 (indicated by reference numeral 1310). The system information may include resource pool information for transmission or reception, configuration information for sensing operation, information for configuring synchronization, information for inter-frequency transmission or reception, and the like. The major difference between operations of FIGS. 12 and 13 is that, in FIG. 12, the base station 1203 and the UE 1201 operate in a state in which the RRC is connected, whereas, in FIG. 13, the base station and the UE may operate even in an idle mode in which the RRC is not connected (indicated by reference numeral 1320). Further, even in a state where the RRC is connected (indicated by reference numeral 1320), the base station 1303 itself may not participate in resource allocation and the UE 1301 may operate to autonomously select a transmission resource. Here, the RRC connection between the UE 1301 and the base station 1303 may be referred to as Uu-RRC. If data traffic for V2X is generated in the UE 1301, the UE 1301 selects a resource pool in a time/frequency domain according to a configured transmission operation, among resource pools received through system information from the base station 1303 (indicated by reference numeral 1330).

Next, in a case of broadcast transmission, the UE 1301 may broadcast sidelink control information (SCI) to other UEs 1302 through the PSCCH via broadcast transmission (indicated by reference numeral 1350) without additional RRC configuration of the sidelink. In addition, the UE broadcasts data to other UEs 1302 through the PSSCH (indicated by reference numeral 1360).

Alternatively, in a case of unicast and groupcast transmission, the UE 1301 may establish an RRC connection with other UEs 1302 on a one-to-one basis. Here, in order to be distinguished from the Uu-RRC, the RRC connection between a UE and a UE may be referred to as PC5-RRC. Even in a case of groupcast communication, PC5-RRCs are individually connected between UEs belonging to a group. The connection may be similar to the connection of the RRC layer in a connection between a base station and a UE in a conventional NR uplink and downlink, and the connection in the RRC layer phase through the sidelink may be called PC5-RRC. UE capability information for sidelink may be exchanged through the PC5-RRC connection, or configuration information required for signal transmission or reception may be exchanged. In FIG. 13, the PC5-RRC connection 1315 is illustrated as being performed after operation 1310, but may be performed at any time before operation 1310 or before operation 1350. If an RRC connection between UEs is required, PC5-RRC connection of the sidelink is established (indicated by reference numeral 1315) and sidelink control information (SCI) is transmitted to other UEs 1302 through the PSCCH via unicast and groupcast transmission (indicated by reference numeral 1350). Here, the groupcast transmission of the SCI may be interpreted as group SCI. In addition, the UE transmits data to other UEs 1302 through the PSSCH via unicast and groupcast transmission (indicated by reference numeral 1360).

In the disclosure, a sensing window A and a sensing window B are defined in order to effectively perform sensing in a situation where periodic and aperiodic traffic coexist.

FIG. 14 illustrates an example of a method for configuring sensing window A and sensing window B for UE autonomous resource allocation (mode 2) through a sidelink.

Figure 14A:
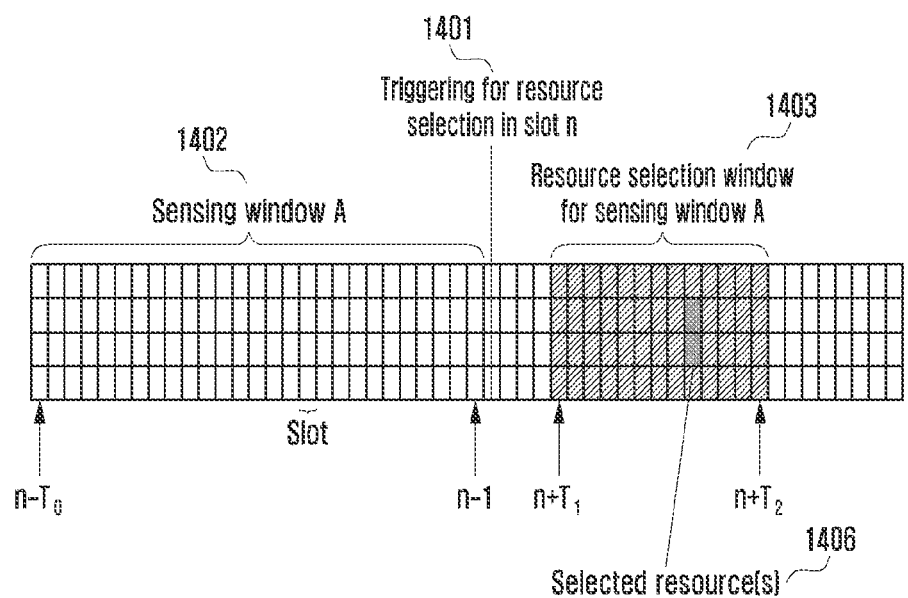
FIG. 14 illustrates an example of a method for setting a sensing window A and a sensing window B for UE autonomous resource allocation (mode 2) through a sidelink according to an embodiment of the disclosure.

As shown in FIG. 14A, in a case where triggering for selection of a transmission resource occurs in slot n (indicated by reference numeral 1401), the sensing window A 1402 may be defined as follows.

Sensing window A may be defined as a slot interval of $[n-T_0, n-1]$. Here, $T_0$ may be determined as a fixed value or may be determined to be a configurable value.

As an example of a case where $T_0$ is determined as a fixed value, $T_0$ may be represented by $1000*2\mu$ for periodic traffic. Alternatively, $T_0$ may be configured as a fixed value of $100*2\mu$ for aperiodic traffic. The fixed $T_0$ value of the above example may be changed to another value according to considered traffic characteristics, and may be fixed as the same value for periodic and aperiodic traffic. Here, $\mu$ is an index corresponding to numerology and is configured to be the following values according to subcarrier spacing (SCS).

SCS=15 kHz, $\mu$0

SCS=30 kHz, $\mu$=1

SCS=60 kHz, $\mu$2

SCS=120 kHz, $\mu$=3

For a case where $T_0$ is determined to be configurable, the configuration for the determination may be indicated through sidelink system information bit (SL SIB) or UE specific higher level signaling. If the determination is indicated through SL SIB, a corresponding value may be configured in resource pool information among corresponding system information. The case where $T_0$ is configured in the resource pool information denotes that a predetermined $T_0$ is always used in the resource pool.

In the sensing window A, SCI decoding and sidelink measurement for other UEs may be performed.

From the SCI received in the sensing window A, resource allocation information for other UEs and QoS information for packets may be obtained. Here, the resource allocation information may include a reservation interval for the resource. In addition, the QoS information may include latency, reliability, a minimum required communication range for transmitted traffic, and priority information according to data rate requirements. Position information for other UEs may be obtained from the received SCI. TX-RX distance may be calculated from position information of another terminal and position information of the terminal itself.

Sidelink reference signal received power (SL RSRP) may be measured from the SCI received in the sensing window A.

Sidelink received signal strength indicator (SL RSSI) may be measured in the sensing window A.

Sensing window A may be mainly used in order to determine a resource for UE autonomous resource allocation (mode 2) through sensing of periodic traffic. If it is determined that it is not effective to identify periodic resource allocation information of another terminal through the SCI decoding and to allocate a transmission resource to a resource, which is used by the other terminal, using results of sidelink measurement such as SL RSRP or SL RSSI, the corresponding resource may be excluded in a resource selection window 1403. As illustrated in FIG. 14A, if triggering for selection of a transmission resource occurs in slot n (indicated by reference numeral 1401), the resource selection window 1403 may be defined as follows.

Resource selection window may be defined as a slot interval of [n+$T_1$, n+$T_2$]. Here, $T_1$ and $T_2$ may be determined as fixed values or may be determined to be configurable values. Alternatively, $T_1$ and $T_2$ are determined to be in a fixed range, and the terminal may configure appropriate values thereof within a fixed range in consideration of implementation.

As an example in which $T_1$ and $T_2$ are determined to be in a fixed range and the terminal configures appropriate values thereof within a fixed range in consideration of implementation, the values may be configured by a UE implementation in a range of $T_1 \leq 4$ and $20 \leq T_2 \leq 100$.

A final transmission resource may be selected in the resource selection window by using the result of sensing performed in the sensing window A.

In a case where sensing is performed using only the sensing window A, as shown in FIG. 14A, and transmission resource selection is performed through the sensing, the following transmission resource selection method may be used.

Transmission Resource Selection Method-1

Step-1: The number of resource candidates $M_{total}$ that can allocate resources is determined, based on resource pool information, in the resource selection window 1403. Details thereof can be understood by referring to Embodiment 1.

Step-2: By using the result of sensing in the sensing window A 1402, resources that are determined to be unavailable for occupation and used by another UE, in the resource selection window 1403, are excluded, and X ($<M_{total}$) number of resource candidates that can allocate resources are left. A method for excluding resources may be used by performing SCI decoding and sidelink measurement of another terminal.

Step-3: The resource candidate list X is reported to a higher layer of a UE, and the final transmission resource is randomly selected from among the X candidates via the higher layer of the UE (indicated by reference numeral 1406).

Figure 14B:
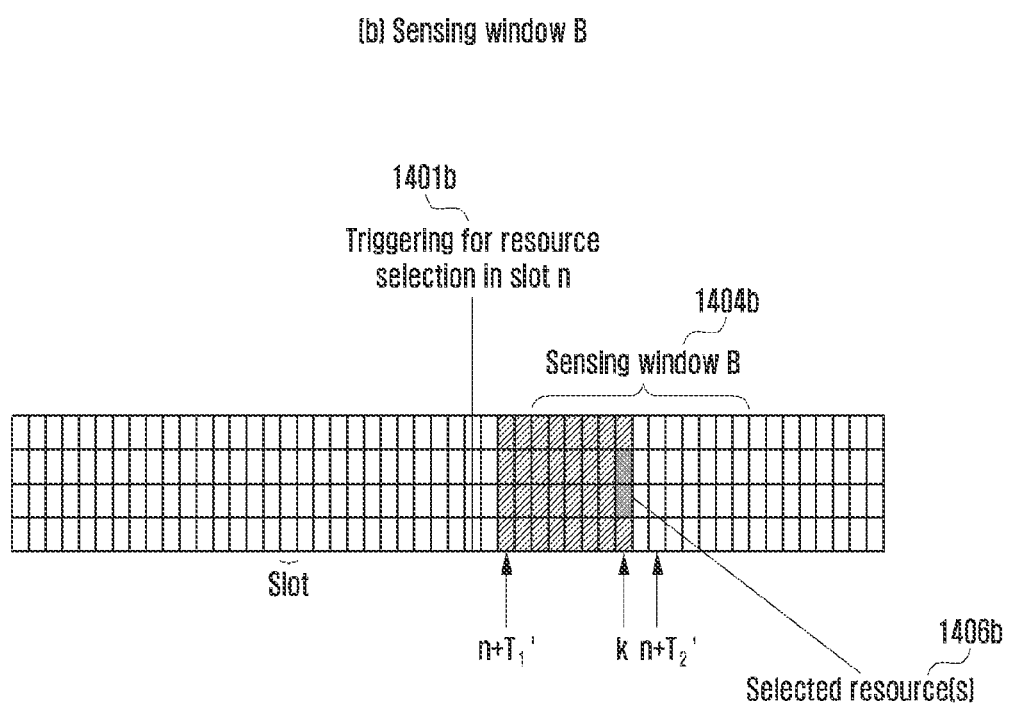

As illustrated in FIG. 14B, in a case where triggering for selection of a transmission resource occurs in slot n (indicated by reference numeral 1401b), the sensing window B 1404b may be defined as follows.

Sensing window B may be defined as a slot interval of [n+$T_1'$, n+$T_2'$]. Here, $T_1'$ and $T_2'$ may be determined as fixed values or may be determined to be configurable. Alternatively, $T_1'$ and $T_2'$ are determined to be in a fixed range, and the UE may configure an appropriate value within a fixed range in consideration of implementation. Further, in a case where k indicates a slot in which a resource is finally selected, the sensing window B is stopped in the slot k, and the sensing window B at this time becomes [n+$T_1'$, k].

$T_1'$ and $T_2'$ may be configured to be the same values as those of $T_1$ and $T_2$ in the resource selection window 1403 in FIG. 14A, respectively, or may be configured to be different values.

For example, if $T_1'$ is configured to be 0, $T_1'$ denotes that sensing is performed from a triggering slot n for selection of a transmission resource.

Sensing window B may be configured as one slot or one or more slots according to the configured values of $T_1'$ and $T_2'$.

In the sensing window B, SCI decoding and sidelink measurement for other UEs may be performed.

Details of the sensing operation in the sensing window B can be understood by referring to embodiments 2 and 3.

Sensing window B may be used in order to determine resources for UE autonomous resource allocation (mode 2) through additional sensing of periodic and aperiodic traffic to the sensing window A. The sensing window B, which is configured after triggering slot n for selecting a transmission resource, enables sensing of aperiodic traffic that cannot be predicted in the sensing window A, by using a sidelink measurement for a slot to which an actual transmission resource can be allocated. Sensing through the sensing window B may be understood as an operation of performing sensing of traffic, which is sensed in each slot regardless of whether the traffic is periodic or aperiodic. If sensing is performed using the sensing window B as shown in FIG. 14B and accordingly transmission resource selection is performed, the following transmission resource selection method may be used.

Transmission Resource Selection Method-2

Step-1: Sensing is performed in the corresponding slot in the sensing window B 1404b so as to determine whether the corresponding resource is in an idle state.

The allocation unit of resources in the frequency domain may be A ($\geq 1$) sub-channels or may be defined as all sub-channels. The number of resource candidates $N_{total}$ that can allocate resources in a corresponding slot is determined according to the units of resource allocation in the frequency domain.

Sensing may be performed through SCI decoding and sidelink measurement.

Step-2-1: If the corresponding resource is determined to be in an idle state through sensing in step-1, the final transmission resource 1406b is determined among the number of resource candidates $N_{total}$ that can allocate resources in the corresponding slot.

Step-2-2: If the corresponding resource is determined to be in a busy state through sensing in step-1, the following operation may be selected.

If the next slot is also configured via the sensing window B 1404b, step-1 is performed after going to the next slot.

If the next slot is not configured via the sensing window B 1404b, the following operation can be considered.

The final transmission resource 1406b is determined using QoS information or the result of energy detection in a current slot. QoS information includes priority, latency, reliability, proximity service (ProSe) per-packet priority (PPPP), prose per-packet reliability (PPPR), a minimum required communication range for transmitted traffic, and priority information according to data rate requirements. The priority may denote PPPP and PPPR, and may be a value selected from a range within a predetermined value, and data that needs to be transmitted on the sidelink may include one priority value.

The transmission in the current slot may be canceled and a backoff operation may be performed.

As defined through FIGS. 14A and 14B, the sensing window A and the sensing window B may be classified based on a timepoint at which triggering for selection of a transmission resource occurs. Specifically, a sensing interval, which is configured before triggering slot n for selection of a transmission resource, may be defined as the sensing window A and a sensing interval, which is configured after triggering slot n, may be defined as the sensing window B.

Figure 14C:
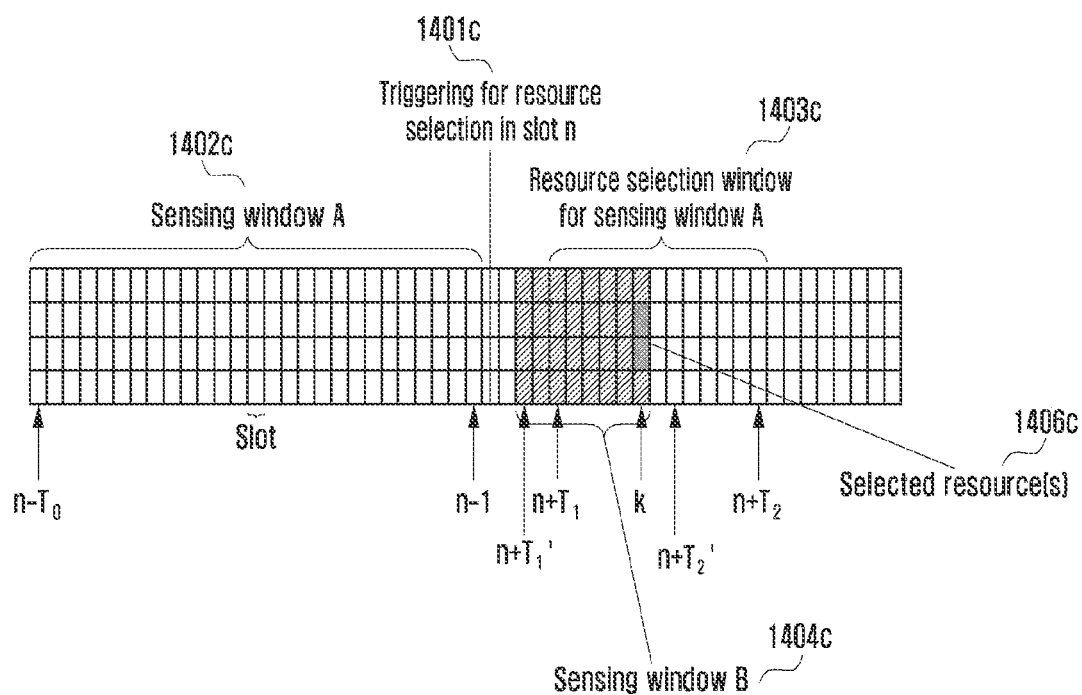

FIG. 14C is an example of a case where the sensing window A and the sensing window B are configured at the same time. If triggering for selection of a transmission resource occurs in slot n (indicated by reference numeral 1401c), the sensing window A 1402c and the sensing window B 1404c can be understood by referring to the definition described above. If sensing is performed using both the sensing window A and the sensing window B, as shown in FIG. 14c, and accordingly selection of the transmission resource is performed, the following transmission resource selection method may be used.

Transmission Resource Selection Method-3

Step-1: The number of resource candidates $M_{total}$ that can allocate resources is determined, based on resource pool information, in the resource selection window 1403c.

Step-2: By using the result of sensing in the sensing window A 1402c, resources that are determined to be unavailable for occupation and used by another UE, in the resource selection window 1403c, are excluded, and X ($\leq M_{total}$) number of resource candidates that can allocate resources are left. A method for excluding resources may be used by performing SCI decoding and sidelink measurement of another UE.

Step-3: The resource candidate list X is reported to a higher layer of a UE, and Y candidates are randomly down-selected from among X candidates in the higher layer.

Step-4-1: If the sensing window B 1404c is included in the resource selection window 1403c, the UE selects the final transmission resource 1406c, based on the transmission resource selection method-2, among the Y candidates determined in the higher layer, by using the sensing result of the sensing window B 1404c in the physical layer.

The case where the sensing window B 1404c is included in the resource selection window 1403c corresponds to an interval of [n+$T_1$, k] in FIG. 14C. The condition may be determined by the configuration of $T_1$ and $T_2$ and $T_1'$ and $T_2'$.

Step-4-2: In a case where the sensing window B is not included in the resource selection window 1403c, the final transmission resource 1406c is selected, based on the transmission resource selection method-2, using the sensing result in the sensing window B in the physical layer.

The case where the sensing window B 1404c is not included in the resource selection window 1403c corresponds to an interval of [n+$T_1'$, n+$T_1$-1] in FIG. 14C. The condition may be determined by the configuration of $T_1$ and $T_2$ and $T_1'$ and $T_2'$.

In the transmission resource selection method-3, a step (step-3) of selecting Y candidates from the higher layer may be omitted and the following method may be used.

Transmission Resource Selection Method-4

Step-1: The number of resource candidates $M_{total}$ that can allocate resources is determined, based on resource pool information, in the resource selection window 1403c.

Step-2: By using the result of sensing in the sensing window A 1402c, resources that are determined to be unavailable for occupation and used by another UE, in the resource selection window 1403c, are excluded, and X ($\leq M_{total}$) number of resource candidates that can allocate resources are left. A method for excluding resources may be performed using SCI decoding and sidelink measurement of another UE may be performed.

Step-3-1: If the sensing window B 1404c is included in the resource selection window 1403c, the UE selects the final transmission resource 1406c, based on the transmission resource selection method-2, among the X candidates, by using the sensing result of the sensing window B 1404c in the physical layer.

The case where the sensing window B 1404c is included in the resource selection window 1403c corresponds to an interval of [n+$T_1$, k] in FIG. 14C. The condition may be determined by the configuration of $T_1$ and $T_2$ and $T_1'$ and $T_2'$.

Step-3-2: In a case where the sensing window B 1404c is not included in the resource selection window 1403c, the final transmission resource 1406c is selected, based on the transmission resource selection method-2, using the sensing result in the sensing window B in the physical layer.

The case where the sensing window B 1404c is not included in the resource selection window 1403c corresponds to an interval of [n+T', n+$T_1$-1] in FIG. 14C. The condition may be determined by the configuration of $T_1$ and $T_2$ and $T_1'$ and $T_2'$.

In a case where the sensing window A and the sensing window B are configured at the same time, the final resource selection may be determined by the resource selection window 1403c and the sensing window B 1404c. The transmission resource selection method-3 or the transmission resource selection method-4 proposed above simultaneously configures the sensing window A and the sensing window B to perform sensing in a situation where periodic and aperiodic traffic coexist and accordingly optimize the transmission resource selection.

Implementation of the operation of sensing and transmission resource selection in the UE autonomous resource allocation (mode 2) of the sidelink described above may be performed in various methods. For example, in a case where the sensing window A and the sensing window B are configured at the same time, a UE may be implemented such that the UE always performs sensing of the sensing window A, and if triggering for selection of a transmission resource occurs in slot n, the UE performs sensing of the sensing window B and accordingly selects the final transmission resource. However, since the operation in which the UE always performing sensing of the sensing window A may use the sensing result of the sensing window A at any time, there may be an advantage in terms of latency in selection of transmission resources, but may be a disadvantage in terms of UE energy consumption. Therefore, according to another method, the UE may be implemented such that, in a case where traffic that needs to be transmitted occurs, the UE immediately performs sensing of the sensing window A, and if triggering for selection of a transmission resource occurs in slot n, the UE performs sensing of the sensing window B and accordingly selects a final transmission resource. According to another method, there may be an advantage of minimizing the energy consumption of the UE by performing sensing only as needed, but there may be a disadvantage in terms of latency in selection of transmission resources.

In the above, an example of the operation of finding an empty frequency-time resource for device to device communication through a sidelink and transmitting a signal in the found resource has been described, but the method and apparatus provided in the disclosure are not limited thereto, and may be applied to various channel occupancy and channel reservation methods.

Figure 15:
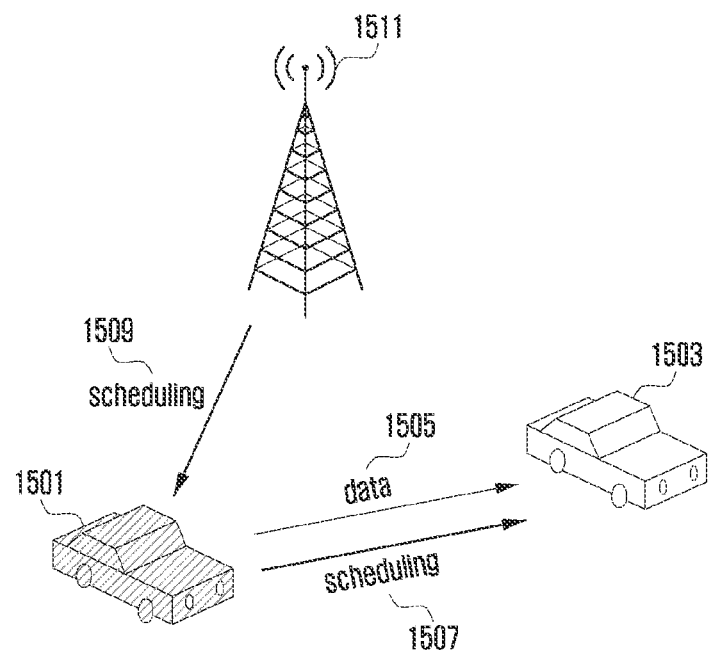
FIG. 15 illustrates a "Mode 1" method, which is a method of receiving scheduling information from a base station and performing sidelink data transmission according to an embodiment of the disclosure.

FIG. 15 illustrates a "Mode 1" method, which is a method for receiving scheduling information from a base station and performing sidelink data transmission, as shown in FIG. 12 above. In the disclosure, a method for receiving scheduling information from a base station and performing sidelink communication based on the scheduling information is called "Mode 1", but may be called differently therefrom. A UE 1501 for performing transmission through a sidelink receives scheduling information 1509 for sidelink communication from a base station 1511. In the disclosure, the UE 1501 for performing data transmission through the sidelink may be called a transmission UE, and a UE 1503 for performing data reception through the sidelink may be called a reception UE. However, each of the transmission UE 1501 and the reception UE 1503 may perform data transmission or reception through the sidelink. Scheduling information 1509 for sidelink communication may be obtained by receiving downlink control information (DCI), and the DCI may include the following pieces of information.

Carrier indicator: which may be used for scheduling sidelink for another carrier in a situation where carrier aggregation (CA) has been applied;

Lowest index at the allocation of sub-channels for initial transmission: which may be used to allocate a frequency resource at initial transmission;

Information to be included in sidelink control information
Frequency resource allocation information. The information may include resource allocation information or resource reservation information for initial transmission, retransmission, and N number of subsequent transmissions.
Information on time interval between initial transmission and retransmission
Information associated with a sidelink slot structure. The information may include information associated with slots and symbols that can be used for a sidelink.
HARQ-ACK or/and CSI feedback timing information. The information may include timing information for transmitting a HARQ-ACK feedback or a CSI feedback to a base station through a sidelink.
Recipient ID: ID information associated with UEs which are to perform reception.
QoS information such as priority, which is information associated with a priority by which data is to be transmitted.

The scheduling may be used for scheduling for one-time transmission of a sidelink, or may be used for periodic transmission, semi-persistent scheduling (SPS), or a configured grant transmission method (configured grant). Scheduling methods may be distinguished by an indicator included in DCI, an RNTI scrambled to a CRC added to the DCI, or an ID value. 0 bits, etc. may be added to the DCI in order to allow the size of the DCI to be identical to that of another DCI format of the DCI for downlink scheduling or uplink scheduling.

The transmission UE 1501 receives DCI for sidelink scheduling from the base station 1511, transmits a PSCCH including sidelink scheduling information 1507, and transmits a PSSCH which is data corresponding to the information (indicated by reference numeral 1505). The sidelink scheduling information 1507 may be sidelink control information (SCI), and the SCI may include the following pieces of information.

HARQ process number: a HARQ process ID for an operation associated with a HARQ of transmitted data
New data indicator (NDI): information associated with whether data which is currently being transmitted is new data
Redundancy Version: information associated with a parity bit to be transmitted at the time of mapping after channel coding of data
Layer-1 source ID: ID information in a physical layer of a UE that performs transmission
Layer-1 destination ID: ID information in a physical layer of a UE that performs reception
Frequency-domain resource assignment for scheduling PSSCH: frequency domain resource configuration information of transmitted data
MCS: information on modulation order and coding rate
QoS indication: which may include priority, target latency/delay, target distance, target error rate, etc.
Antenna port(s): information on an antenna port for data transmission
DMRS sequence initialization: which may include information such as an ID value for initializing a DMRS sequence
PTRS-DMRS association: which may include information associated with PTRS mapping
CBGTI: which may be used as an indicator for retransmission by the units of CBGs
Resource reservation: information for resource reservation
Time gap between initial transmission and retransmission: information on a time interval between initial transmission and retransmission
Retransmission index: an indicator of identifying retransmission
Transmission format/cast type indicator: an indicator of identifying a transmission format or distinguishing between unicast/groupcast/broadcast
Zone ID: location information of a transmission UE
NACK distance: a reference indicator of determining whether a reception UE is required to transmit a HARQ-ACK/NACK
HARQ feedback indication: which may include whether a HARQ feedback is required to be transmitted, or whether a HARQ feedback is being transmitted
Time-domain resource assignment for scheduling PSSCH: time domain resource information of transmitted sidelink data
Second SCI indication: an indicator including mapping information of second SCI in a case of two-stage control information
DMRS pattern: information on a DMRS pattern (for example, the position of a symbol to which a DMRS is mapped)

The control information may be transmitted to the reception UE after being included in a single piece of SCI, or may be transmitted after being included in two pieces of SCI. The transmission through two pieces of SCI may be called a 2-stage SCI method.

In the disclosure, a downlink (DL) may indicate a link through which a signal is transmitted from a base station to a UE. In the disclosure, an uplink (UL) may indicate a link transmitted from a UE to a base station.

The disclosure provides a method and apparatus for transmitting or receiving channel state information (CSI) through a sidelink.

First Embodiment

The first embodiment provides a method and apparatus for transmitting sidelink control information including whether or not CSI-RS is transmitted, whether or not CSI information is reported, and whether or not SL-SCH is included.

A UE which transmits the PSCCH and the PSSCH through the sidelink may include at least one piece of the following information in SCI and transmit the same to a reception UE.

Information on whether to transmit the CSI-RS: This is for allowing the reception UE to receive the CSI-RS and identify channel state information Information on whether to report the CSI feedback information: When the CSI information is mapped to a PSSCH resource and transmitted, the reception UE needs to identify whether the CSI feedback information is mapped to the PSSCH resource in order to successfully decode the PSSCH remaining after excluding the CSI information Information on whether a sidelink shared channel (SL-SCH) is included in the PSSCH (indicating whether the SL-SCH is included): This indicates whether the SL-SCH is included in the PSSCH, or only the CSI is separately mapped to the PSSCH.

For a transmission of the information, 1 bit of each piece of the information may be included in the SCI. For example, indication of whether SL-SCH is included in the PSSCH (SL-SCH indicator) may be defined by 1 bit as follows.

A value of "1" indicates that SL-SCH shall be transmitted on the PSSCH and a value of "0" indicates that SL-SCH shall not be transmitted on the PSSCH.

If the CSI is transmitted via the MAC CE or PC5-RRC, the SL-SCH indicator may not be included in the SCI.

Alternatively, a method of indicating two or more pieces of information together by using more bits than 1 bit may be used.

In the above description, information on whether the SL-SCH is included may be information indicating whether the PSSCH includes only the sidelink CSI feedback information, or also includes other data. When the PSSCH includes only the CSI feedback information and is transmitted, the transmission UE may no need to transmit, to the reception UE, information on PSSCH retransmission after the corresponding PSSCH transmission, or initial transmission before the corresponding PSSCH transmission. This is because no data other than the CSI feedback is included in the PSSCH. Accordingly, the SCI for scheduling the PSSCH including only the sidelink CSI feedback may notify of the reception UE of information indicating that at least one of the following bit fields may be fixed to a particular value, and the corresponding PSSCH includes the CSI feedback only.

Resource reservation: A bit field indicating information on a particular frequency-time domain resource to be occupied Frequency resource location of initial transmission and retransmission: A bit field indicating a frequency-domain location of the PSSCH, corresponding to an initial transmission or a retransmission of the PSSCH to be scheduled Time gap between initial transmission and retransmission: A bit field indicating a time-domain location of the PSSCH, corresponding to an initial transmission or a retransmission of the PSSCH to be scheduled, that is, a transmission time gap For example, when the PSSCH including only the sidelink CSI feedback is scheduled, the transmission UE may set, as "0000" (all zero), a time gap between an initial transmission and a retransmission of the SCI for performing the scheduling, and transmit the same. When the SCI is decoded, and the bit field of the time gap between initial transmission and retransmission has a value of "0000", the reception UE may understand that the PSSCH scheduled by the SCI includes only the CSI feedback without the SL-SCH.

Second Embodiment

The second embodiment provides a method and an apparatus for determining the size of CSI feedback when transmitting CSI feedback through a sidelink.

When the CSI is mapped to a PSSCH and transmitted, the following method may be applied.

Method 1: A case in which CSI feedback is mapped to a PSSCH resource and transmitted may be the same as a case where uplink control information (UCI) is mapped to a PUSCH and transmitted via uplink in the NR system. In the conventional NR system, when UCI is mapped to the PUSCH, a channel coding method to be applied is different according to the number of bits of UCI. For example, iterative coding is applied to up to 2 bits, Reed-Muller (RM) codes are applied to up to 11 bits, and polar codes are applied to 12 bits or more. In the NR system, in order to decode UCI information, a base station needs a decoder for iterative codes, a decoder for a Reed-Muller code, and a decoder for an uplink polar code. However, if the CSI feedback in the sidelink signal transmission and reception is applied as in the case of method 1, a UE needs a decoder for iterative codes, a decoder for a Reed-Muller code, and a decoder for an uplink polar code. It may be understood that an additional UE complexity is demanded in the NR system. Accordingly, in order to minimize the UE complexity, the length of the CSI information may be adjusted to at least 12 bits so as to enable a polar code to be always applied when CSI is mapped to the PSSCH and transmitted. For example, when the CSI feedback bits are $a\_0, a\_1, \ldots, a\_\{N-1\}$ and the number of bits is N, if N<12, $a\_N, a\_\{N+1\}, \ldots, a\_11$ bits may be defined as a value of "0". Alternatively, when the number of bits is N, if N<12, $a\_N, a\_\{N+1\}, \ldots, a\_11$ bits may be defined as a value of "1". When CSI is transmitted through the PSSCH based on Method 1, a resource region to which the CSI is mapped and the number of bits after being subject to coding will be described in detail in the fourth embodiment below. Although Method 1 has been described using a case in which CSI feedback information is mapped to a PSSCH and transmitted, the same may be applied to a case in which CSI feedback information is transmitted through a physical sidelink feedback channel (PSFCH).

Method 2: A case in which CSI feedback is mapped to MAC CE or PC5-RRC and transmitted to a PSSCH. In this case, since the CSI feedback is SL-SCH, it may be viewed as normal data in the physical layer. In this case, the LDPC code may be applied to the CSI, as with general data.

Third Embodiment

The third embodiment provides a method and apparatus for configuring scheduling information of the PSSCH when CSI information is transmitted through the PSSCH and reported.

Figure 16:
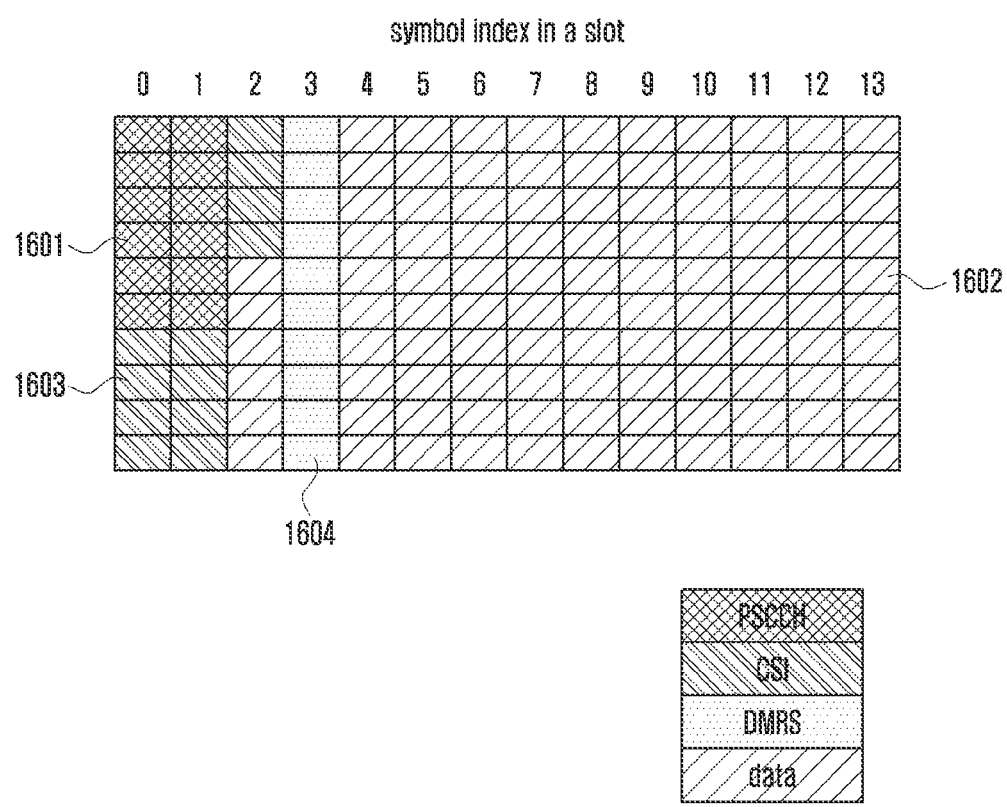
FIG. 16 illustrates an example in which CSI information is transmitted through a PSSCH while also transmitting data, i.e., transport block information, transmitted from a higher layer to the PSSCH according to an embodiment of the disclosure.

FIG. 16 illustrates an example in which CSI information is transmitted through a PSSCH while transmitting data, i.e., transport block information, transmitted from a higher layer to the PSSCH. A transmission UE maps and transmits the PSCCH (indicated by reference numeral 1601), and SCI, which is included in the PSCCH and transmitted, may include mapping information between CSI information 1603 and data (PSSCH) 1602. Accordingly, the transmission UE maps the CSI information 1603 and the data (PSSCH) 1602 and transmits the same. In addition, DMRS, which is a reference signal for PSSCH reception, is transmitted together with the mapped information and data (indicated by reference numeral 1604). Information included in the SCI transmitted through the PSCCH may be determined by the following method. In the disclosure including the above embodiments and the following embodiments, the QoS value may be information indicating a priority value, a target latency value, a target arrival distance, etc., and the data transmitted from the higher layer may be a sidelink shared channel (SL-SCH).

Method x-1: The QoS value included in the SCI may be determined based on the QoS value corresponding to the transport block 1602. In this method, since the transport block is mapped to the PSSCH and transmitted regardless of whether CSI information is transmitted or not, the SCI may include the QoS value or priority value, which is included in the transport block and is regard able as data. Even based on this method, in the sensing method for actual channel occupation, a method of performing channel sensing by prioritizing transmission including CSI information when the same QoS value is obtained may be applied.

Method x-2: The QoS value or priority value included in the SCI may be determined based on the QoS value corresponding to the transport block 1602 and whether CSI information is transmitted or not. In this method, whether CSI information is transmitted or not is included in determination of the QoS value, and thus transmission including CSI is prioritized over transmission without CSI.

Figure 17:
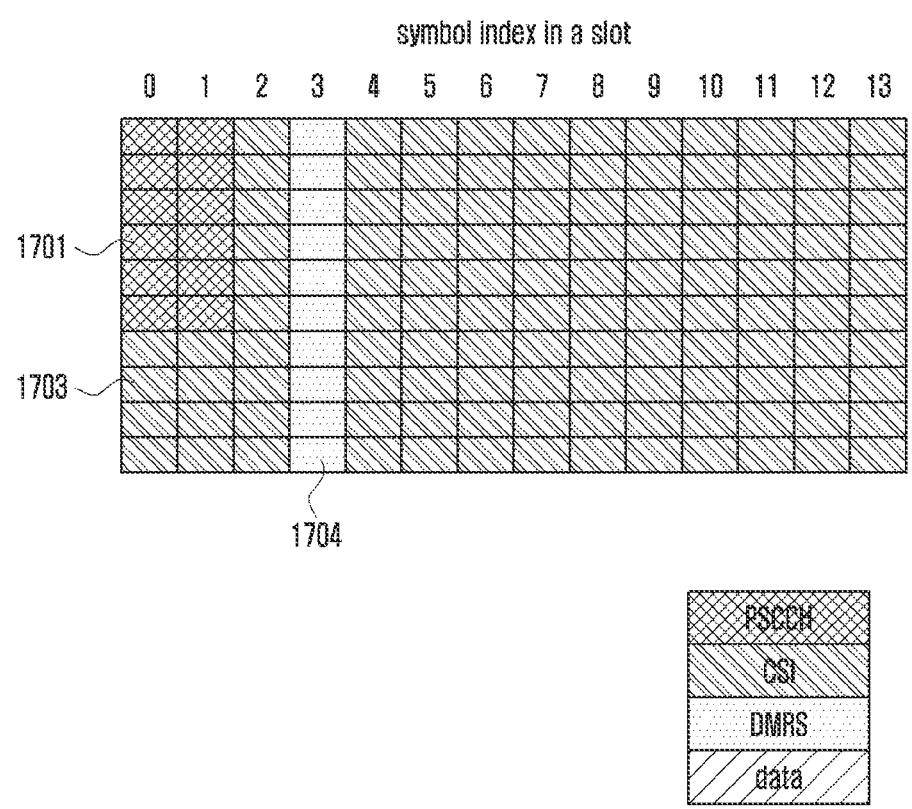
FIG. 17 illustrates an example in which only CSI information is included and transmitted in a PSSCH according to an embodiment of the disclosure.

FIG. 17 illustrates an example in which only CSI information is included in the PSSCH without data transmitted from a higher layer in the PSSCH, that is, transport block information, and transmitted while transmitting CSI information through the PSSCH 1703. In addition, a DMRS, which is a reference signal for PSSCH reception, is transmitted together with the CSI information (indicated by reference numeral 1704). In the disclosure, FIG. 17 illustrates an example in which only CSI is transmitted, but a case in which CSI is transmitted via higher signaling such as an RRC layer or MAC control element (CE) may indicate a case in which CSI is included in the PSSCH in the form of a transport block and transmitted. FIG. 17 may illustrate a case in which only CSI information is transmitted without data to be transmitted, and in this case, a QoS value or a priority value of data transmitted from a higher layer may not exist. Therefore, at this time, a method of determining, by the transmission UE, the QoS value included in SCI 1701 is required. The disclosure provides a method of determining the QoS value in this case as follows.

Figure 18:
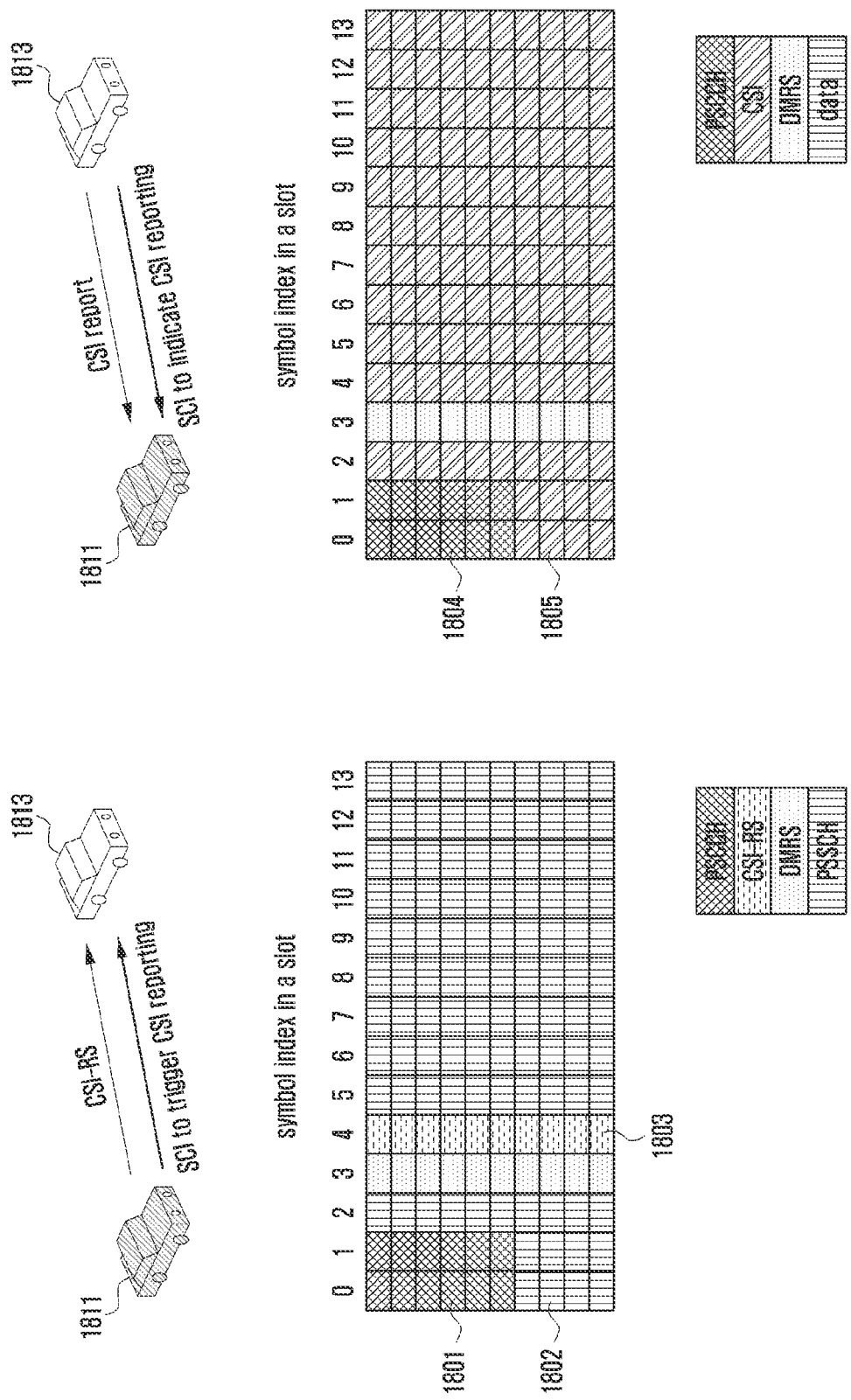
FIG. 18 illustrates an example of a slot structure when CSI-RS is transmitted and an example of a slot structure when CSI information is reported according to an embodiment of the disclosure.

Method y-1: In a case of reporting CSI information, if there is no QoS value transmitted from a higher layer (that is, if only CSI is transmitted without data transmitted from the higher layer), the QoS value included in the SCI at the time of reporting CSI information is determined based on the QoS value included in the SCI transmitted together when CSI-RS is transmitted. As an example, the QoS value included in the SCI at the time of reporting the CSI information may be determined to be the same value as the QoS value included in the SCI transmitted together when the CSI-RS is transmitted. FIG. 18 illustrates an example of a slot structure when CSI-RS is transmitted and an example of a slot structure when CSI information is reported. When transmitting a CSI-RS 1803, a transmission UE 1811 transmits SCI 1801 and a PSSCH 1802 together. The SCI 1801 may include a QoS value corresponding to the PSSCH 1802. A reception UE 1813 measures the transmitted CSI-RS 1803 to identify a channel state, generates CSI information, and transmits the CSI information to a transmission UE 1811. When reporting CSI information, the CSI information is mapped to a PSSCH 1805 and transmitted, and the SCI 1804 is also transmitted in order to schedule the PSSCH 1805. The SCI 1804 may include a QoS value, and the value may be the same as the QoS value included in the SCI 1801 used when the CSI-RS 1803 is transmitted. In a case where CSI information, which is channel state information, is included in the MAC CE and transmitted, if only CSI is included in the MAC CE and transmitted without other data, the QoS value corresponding to the MAC CE is determined as the QoS value included in the SCI when the CSI-RS used for CSI measurement is transmitted.

Method y-2: When the PSSCH is transmitted with only CSI information included therein, a method of fixing the QoS value included in the SCI for scheduling the PSSCH to the lowest priority and transmitting the same may be used. For example, if only CSI information is included in the PSSCH 1703 without other data transmitted from the higher layer as shown in FIG. 17 and transmitted, the QoS value included in the SCI 1701 for scheduling the PSSCH 1703 may be determined as "8". In the above example, the QoS value of 8 may be a value indicating the lowest priority, which may result from determining CSI as a lower priority compared to other data. In a case where CSI information, which is channel state information, is included in the MAC CE and transmitted, if only CSI is included in the MAC CE and transmitted without other data, the QoS value corresponding to the MAC CE may always be set to the lowest QoS value and included.

Method y-3: In this method, a UE that transmits CSI information randomly configures and transmits a QoS value included in SCI, which is control information used at the time of transmitting CSI, and when a UE performing channel sensing decodes the SCI and determines the channel occupancy, if the corresponding SCI is an SCI for scheduling a PSSCH including only CSI information without other data, resources occupied or reserved by the corresponding SCI may not be excluded from a resource list. That is, the SCI for scheduling the PSSCH including only CSI information without other data may be ignored in the channel sensing method. In one example, the UE 1811 receiving the PSSCH including only CSI information in FIG. 18 may ignore resource occupancy or resource reservation information included in the corresponding SCI information (SCI to indicate CSI reporting) when performing channel sensing. Alternatively, the UE 1811 may ignore the corresponding SCI reception itself in a process of channel sensing. This method may be a method in which a reception UE receives the SCI, identifies an indicator indicating whether the SL-SCH is included, and then ignores the corresponding scheduling in the channel sensing if the SL-SCH is not included. The method of ignoring the corresponding scheduling may be such that the SCI is not counted or the SCI is not considered when non-transmissible resources are subtracted in a process of determining transmittable resources.

In the above description, a 1-stage SCI method for decoding one piece of SCI for data reception has been described as a reference, but it may be applied to a 2-stage SCI method for decoding two pieces of SCIs for data reception.

Figure 19:
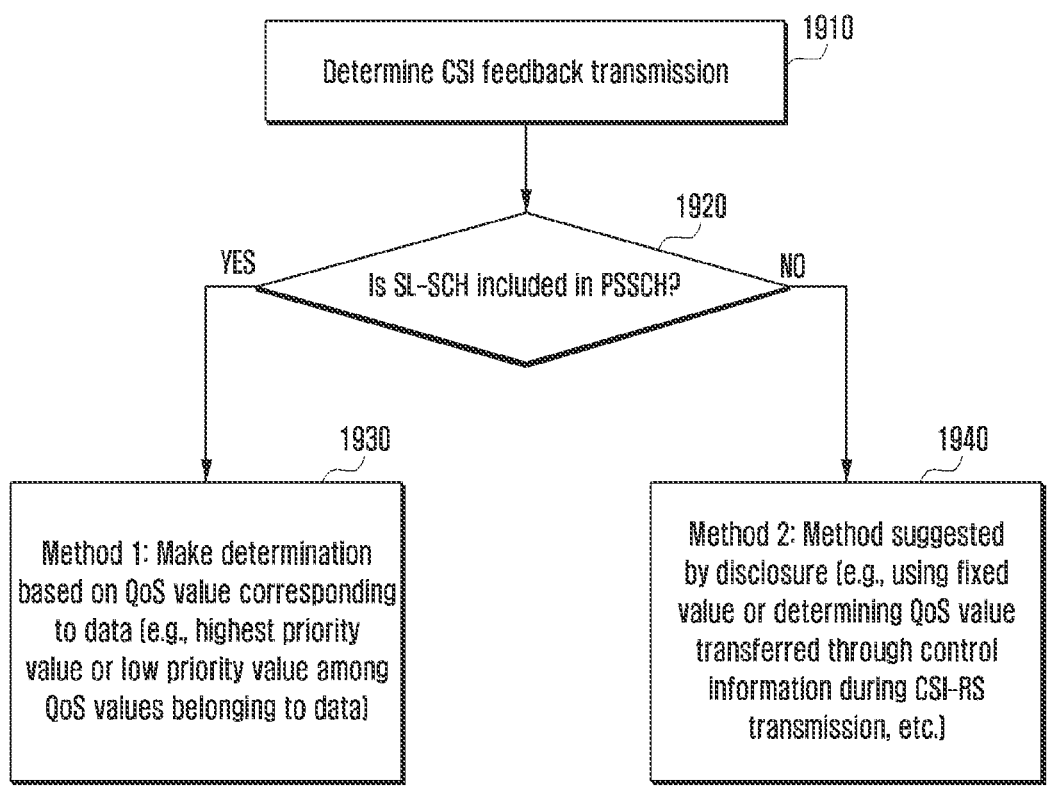
FIG. 19 illustrates an example of a method of determining a QoS value to be included in control information for scheduling a PSSCH to which CSI is mapped, by piggybacking CSI information onto a PSSCH according to an embodiment of the disclosure.

FIG. 19 illustrates an example of a method in which a QoS value to be included in control information for scheduling a PSSCH to which CSI is mapped is determined, when CSI information is piggybacked to the PSSCH (that is, when CSI information is encoded and mapped using a channel coding method different from an SL-SCH) and is fed back.

A UE 1910, which wants to feed-back CSI, determines whether the SL-SCH is included in the PSSCH to be transmitted in operation 1920. If the SL-SCH is included therein, the UE determines the QoS of the SCI based on the QoS of the SL-SCH in operation 1930. If the SL-SCH is not included, the UE determines the QoS value of the SCI by applying the methods suggested in method y-1 and method y-2 in operation 1940. The UE, which wants to feedback the CSI, may determine whether the SL-SCH is included in the PSSCH to be transmitted, based on the SL-SCH indicator mapped to the SCI to be transmitted.

Figure 20:
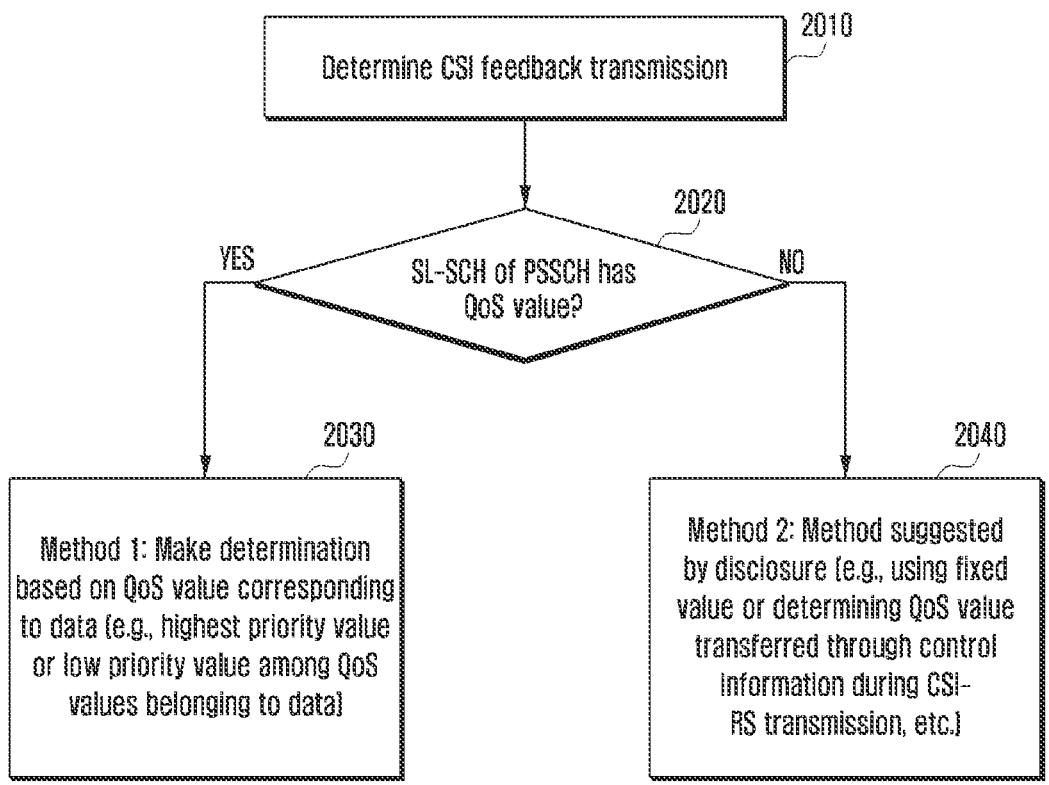
FIG. 20 illustrates an example of a method of determining a QoS value to be included in control information for scheduling a PSSCH to which CSI is mapped, when CSI information is transmitted using an MAC CE transmitted through a PSSCH according to an embodiment of the disclosure.

FIG. 20 illustrates an example of a method in which a QoS value to be included in control information for scheduling a PSSCH to which CSI is mapped is determined, when CSI information is transmitted using an MAC CE transmitted through a PSSCH (that is, an SL-SCH is included in the corresponding PSSCH without other data, and the SL-SCH may include the MAC CE to which CSI is mapped). A UE 2010, which wants to feedback the CSI, determines whether the SL-SCH in the PSSCH to be transmitted has a QoS value in operation 2020. If the SL-SCH has the QoS value, the UE determines the QoS of the SCI based on the QoS of the SL-SCH in operation 2030. If the SL-SCH does not include the QoS value, the UE determines the QoS value of the SCI by applying the methods suggested in method y-1 and method y-2 in operation 2040.

Fourth Embodiment

The fourth embodiment provides a method of calculating the number of coded bits after applying channel coding to CSI feedback information when method 1 provided in the second embodiment is applied, that is, when CSI feedback is mapped to a PSSCH resource and transmitted, and a method of mapping the coded bits to PSSCH resources.

When an SL-SCH is not included in a PSSCH: the number of bits $Q'_{SL-CSI}$ in which sidelink CSI is coded may be calculated as follows.\

$$Q'_{SL-CSI} = \sum_{l=0}^{N_{symbol}^{PSSCH}-1} M_{sc}^{SL-CSI}(l)$$

In the above, MSC-CSI (1) is the number of resource elements (REs) used for sidelink CSI feedback information mapping in the PSSCH in the l-th OFDM symbol, and $N_{symbol}^{PSSCH}$ is the number of symbols used for the PSSCH, including DMRS symbols.

When the SL-SCH is included in the PSSCH: The number of bits $Q'_{SL-CSI}$ in which the sidelink CSI is coded may be calculated as follows.

$$Q'_{SL-CSI} = \min\left\{ \left\lceil \frac{(Q_{SL-CSI} + L_{SL-CSI}) \cdot \beta_{offset}^{PSSCH}}{R \cdot Q_m} \right\rceil, \sum_{l=0}^{N_{symbol}^{PSSCH}-1} M_{sc}^{SL-CSI}(l) \right\}$$

In the above, R is a coding rate of the PSSCH, $Q_m$ is a modulation order, and R and $Q_m$ may be obtained from MCS information included in the SCI for scheduling the PSSCH. $\beta_{offset}^{PSSCH}$ is a parameter for adjusting the number of coded bits of the sidelink CSI information, and may be determined based on at least one of a resource pool configuration, a PC5-RRC configuration, or a bit field of the SCI. In the above, $Q_{SL-CSI}$ is the number of bits of sidelink CSI feedback information, and $L_{SL-CSI}$ is the number of CRC bits added before channel coding.

Figure 21:
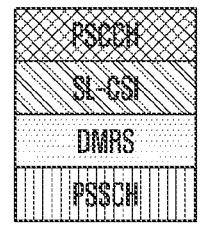
FIG. 21 illustrates an example of mapping sidelink CSI to a PSSCH according to an embodiment of the disclosure.

FIG. 21 illustrates an example of mapping sidelink CSI to a PSSCH. A PSCCH may include information for scheduling a frequency resource and a time resource of the PSSCH. Accordingly, upon receiving the PSCCH, a UE may know a resource to which the PSSCH scheduled by the corresponding PSCCH is mapped. In order for a reception UE to receive the PSSCH and obtain sidelink CSI information as soon as possible, the sidelink CSI can be mapped to an earliest region in a time resource among mapping resources of the PSSCH.

Figure 22:
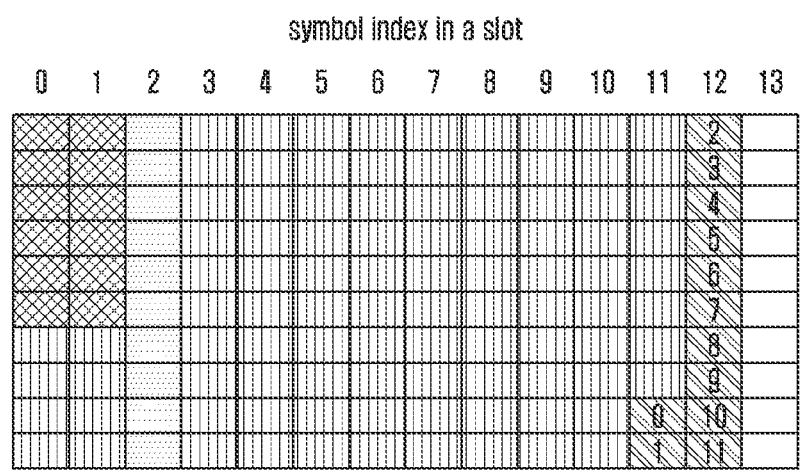
FIG. 22 illustrates another example of mapping sidelink CSI to a PSSCH according to an embodiment of the disclosure.
Figure 22:
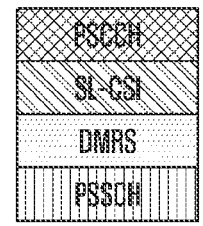

FIG. 22 illustrates another example of mapping sidelink CSI to a PSSCH. The PSCCH may include information for scheduling a frequency resource and a time resource of the PSSCH. Accordingly, upon receiving the PSCCH, the UE may know a resource to which the PSSCH scheduled by the corresponding PSCCH is mapped. In order for the reception UE to receive the PSSCH and start data decoding as soon as possible, the sidelink CSI can be mapped to a latest region in the time resource among the mapping resources of the PSSCH.

Fifth Embodiment

The fifth embodiment provides a method and apparatus in which a reception UE receives a CSI-RS through a sidelink, measures a channel state, and then determines whether to perform transmission in connection with a time at which CSI feedback information (CSI report information) is transmitted to a transmission UE.

When the reception UE receives, for example, a CSI-RS through a sidelink in slot n, the reception UE may start processing for CSI information generation from slot n. If it is assumed that the sidelink CSI report is ready to be transmitted to the transmission UE in slot n+k (k is a natural number greater than 1), the reception UE may not transmit the CSI information if a resource to be transmitted through the sidelink cannot be found even though the CSI information is ready to be transmitted. If the reception UE does not continuously occupy a resource to be transmitted to the transmission UE, the reception UE cannot transmit CSI information for a long time, and after a predetermined time, the CSI information may not be valid information. Therefore, even if the CSI information is transmitted after a long time, the transmission UE may not need to use the CSI information. (This may be because the information may be meaningless after a long time has passed). Therefore, if a predetermined time has passed after the reception UE receives the sidelink CSI-RS, the CSI information obtained from the sidelink CSI-RS may not be transmitted or an operation of discarding the CSI information by a buffer of the reception UE may be required. To this end, at least one of the following methods may be applied.

Method 1: Transmission occurs only at a CSI reporting timepoint fixed in advance, preset in a resource pool, or preset via PC5-RRC, and transmission does not occur other than at the set timepoint. The timepoint may refer to a slot or a specific time at which CSI feedback information is transmitted in response to a transmission of a sidelink CSI-RS. That is, after the timepoint has passed, a UE may discard the generated CSI in the buffer.

Method 2: Based on a defined or set duration time window, a time interval in which the corresponding CSI feedback information should be transmitted is determined, transmission is allowed only in the time interval, and when the interval passes, a transmission of the corresponding CSI feedback is not allowed.

Method 3: Sidelink CSI reporting valid timer (timer_valid_SL_CSI_reporting) may be introduced, and CSI feedback information, which is sidelink channel information obtained from the sidelink CSI-RS, may be transmitted to a transmission UE until the sidelink CSI reporting valid timer expires. That is, after the timer_valid_SL_CSI_reporting timer expires, CSI feedback information, which is sidelink channel information, may not be transmitted to the transmission UE. Although it is possible for the transmission UE to transmit the sidelink CSI-RS to the reception UE every time transmission of the PSSCH occurs, in this case, resources for transmission of the sidelink CSI-RS are additionally consumed, and thus the resource efficiency may decrease. Therefore, after transmission of the sidelink CSI-RS to the reception UE, if the sidelink CSI feedback information is not transmitted from the reception UE until the timer_valid_SL_CSI_reporting timer expires, the transmission UE may transmit the sidelink CSI-RS once again after the timer_valid_SL_CSI_reporting timer has expired, and may request a CSI feedback report.

Sixth Embodiment

The sixth embodiment provides a method and apparatus for mapping information such as control information, feedback information, and CSI in a sidelink and a transport channel to a physical channel, and a method and apparatus for applying examples relating thereto.

Information transmitted through the sidelink may include sidelink control information (SCI), sidelink feedback control information (SFCI), sidelink channel state information (SCSI), and a sidelink shared channel (SL-SCH) that is a transport channel.

The information and the transport channel may be mapped to physical channels in the following method.

| TrCH (Transport channel) | Physical Channel |
| --- | --- |
| SL-SCH | PSSCH |

| Control information | Physical Channel |
| --- | --- |
| SCI | PSCCH |
| SFCI | PSFCH |
| SCSI | PSSCH |

Alternatively, if SCSI is transmitted through the PSFCH, the following transport channel-physical channel mapping may be applied thereto.

| TrCH (Transport channel) | Physical Channel |
| --- | --- |
| SL-SCH | PSSCH |

| Control information | Physical Channel |
| --- | --- |
| SCI | PSCCH |
| SFCI | PSFCH |
| SCSI | PSSCH, PSFCH |

Alternatively, if SCSI is transmitted to a higher layer, for example, to a MAC control element (MAC CE) of the MAC layer, corresponding to the SC-SCH, the SCSI may be transmitted to the PSSCH, and the following transmission channel-physical channel mapping may be applied thereto.

| TrCH (Transport channel) | Physical Channel |
| --- | --- |
| SL-SCH | PSSCH |

| Control information | Physical Channel |
| --- | --- |
| SCI | PSCCH |
| SFCI | PSFCH |
| SCSI | PSSCH, PSFCH |

When the CSI of the sidelink is transmitted to the MAC CE, the reception UE may transmit at least one of the following additional information simultaneously to the transmission UE.

Information on a slot in which the sidelink CSI-RS used when measuring CSI is transmitted, that is, information on a timing at which the sidelink CSI-RS is transmitted Information on a frequency domain in which the CSI is measured, that is, information on a frequency domain in which the sidelink CSI-RS is transmitted. The information may include an index of a subchannel, and the like.

Information of a rank indicator (RI) and a channel quality indicator (CQI)

Information of a preferred precoding matrix

Preferred beamforming-related information

ID information of a reception UE that has received the sidelink CSI-RS

ID information of a transmission UE that has transmitted the sidelink CSI-RS

ID information of a transmission UE that has transmitted sidelink CSI feedback information ID information of a reception UE that has received sidelink CSI feedback information In the disclosure, although the reception UE that has received the sidelink CSI-RS and the transmission UE that has transmitted the sidelink CSI feedback information have been described as the same terminal, the disclosure is not limited thereto and may be applied to different terminals. In addition, in the disclosure, although the transmission UE that has transmitted the sidelink CSI-RS and the reception UE that has received the sidelink CSI feedback information have been described as the same terminal, the disclosure is not limited thereto and may be applied to different terminals.

Seventh Embodiment

The seventh embodiment provides a method and apparatus for transmitting sidelink CSI feedback information through a PSFCH.

The CSI feedback information of the sidelink in the corresponding resource pool may be configured to be transmittable through the PSFCH (e.g., configured to be enabled). In addition, it may be possible to configure the PSFCH transmission resource to exist in every N slot (N>1) rather than every slot in the corresponding resource pool. In this case, a timing of transmitting the CSI feedback may be determined as follows.

Method 1: A method of transmitting a CSI feedback report after a specific time (slot) set for each resource pool after a transmission of the sidelink CSI-RS. In this method, if there is a PSFCH resource in a slot for a transmission of CSI feedback, the CSI feedback is transmittable through the PSFCH, and if there is no PSFCH resource in the corresponding slot, the CSI feedback is transmittable through the PSSCH. In the above, a specific time (slot) set for each resource pool after a transmission of the sidelink CSI-RS can be defined differently for each subcarrier spacing (SCS) set for the resource pool.

Method 2: A method of transmitting a CSI feedback report through the PSFCH resource that enables the fastest transmission after a specific time (slot) set for each resource pool after a transmission of the sidelink CSI-RS. In the above, a specific time (slot) set for each resource pool after a transmission of the sidelink CSI-RS can be defined differently for each subcarrier spacing (SCS) set for the resource pool.

Although the first to seventh embodiments of the disclosure have been separately described above for ease of description, it may be possible to combine at least two embodiments because each embodiment includes operations related to each other. In addition, the first to seventh embodiments may be implemented by being included in the operation of FIG. 12 or FIG. 13. In addition, the corresponding configuration or operation among the configurations of FIGS. 1 to 15 may be combined with respect to the first to seventh embodiments.

Figure 23:
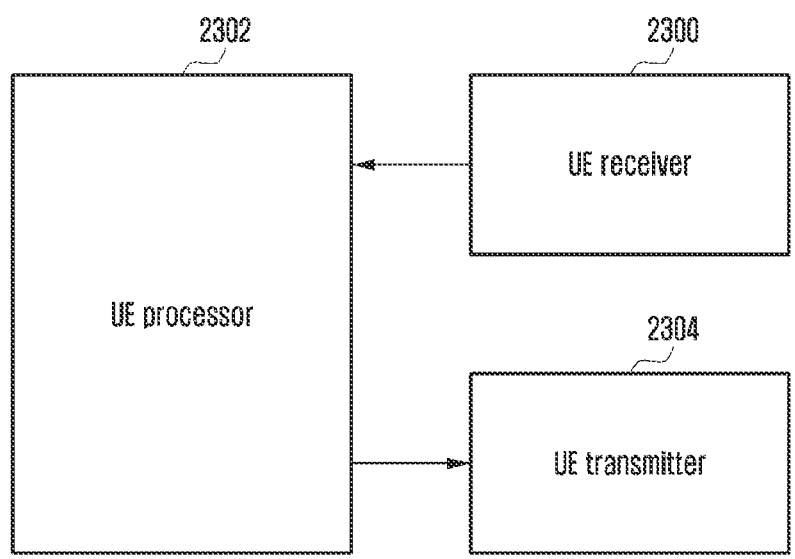
FIG. 23 is a block diagram illustrating an internal structure of a UE according to an embodiment of the disclosure.
Figure 24:
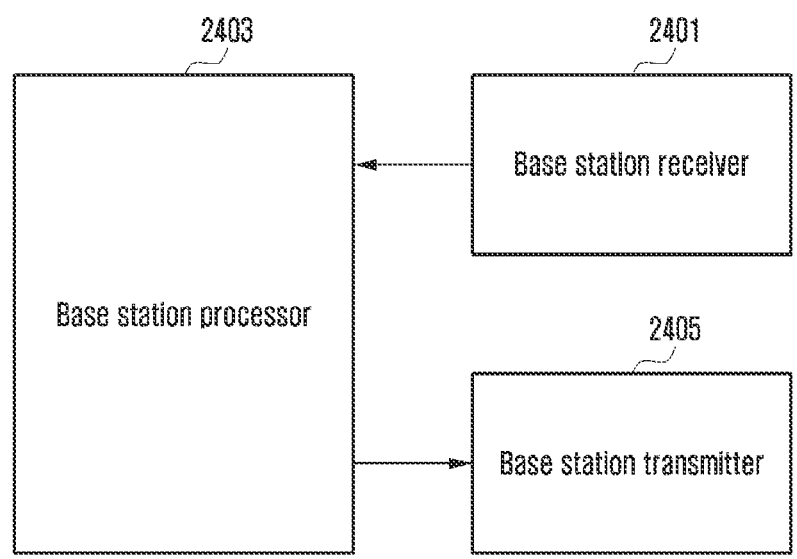
FIG. 24 is a block diagram illustrating an internal structure of a base station according to an embodiment of the disclosure.

In order to perform the above embodiments of the disclosure, a transmitter, a receiver, and a processor of a UE and a base station are shown in FIGS. 23 and 24, respectively. FIGS. 23 and 24 illustrate the device configuration of a UE and a base station for performing a method of transmitting sidelink control information including whether or not the CSI-RS is transmitted, whether or not CSI information is reported, whether or not SL-SCH is included, a method of determining the size of CSI feedback, a method of configuring scheduling information of the PSSCH, a method of applying channel coding to CSI feedback information and a mapping method thereof, and a method of mapping feedback information and CSI information to a physical channel.

Specifically, FIG. 23 is a block diagram illustrating an internal structure of a UE according to an embodiment of the disclosure. As shown in FIG. 23, the UE of the disclosure may include a UE receiver 2300, a UE transmitter 2304, and a UE processor 2302. The UE receiver 2300 and the UE transmitter 2304 are collectively referred to as a transceiver in an embodiment of the disclosure. The transceiver may transmit/receive a signal to/from the base station. The signal may include control information and data. To this end, the transceiver may include an RF transmitter for up-converting and amplifying a frequency of a transmitted signal, and an RF receiver for low-noise amplifying a received signal and down-converting the frequency thereof. In addition, the transceiver may receive a signal via a radio channel and output the received signal to the UE processor 2302, and may transmit a signal output from the UE processor 2302 via a radio channel. The UE processor 2302 may control a series of processes such that the UE operates according to the above-described embodiments. For example, the UE receiver 2300 may receive control information from the base station, and the UE processor 2302 may determine feedback information and whether to transmit sidelink CSI feedback according to the control information and preconfigured configuration information, and thus prepare transmission according thereto. Thereafter, the UE transmitter 1604 may transmit scheduled feedback to the base station. Both the transmission UE and the reception UE may have the structure shown in FIG. 23. The transmission UE may be referred to as a first UE, and the reception UE may be defined as a second UE.

According to an embodiment of the disclosure, in a first terminal, the UE processor 2302 may perform control to acquire channel state information (CSI), transmit a physical sidelink control channel (PSCCH) including sidelink control information (SCI) to a second terminal via the transceiver, and transmit a physical sidelink shared channel (PSSCH) including the CSI and data received from a higher layer to the second terminal via the transceiver. The SCI includes quality of service (QOS) information and mapping information about the CSI and data, and the QoS information may be determined based on whether the CSI is transmitted through the PSSCH. In addition, the QoS includes a priority value, the priority may be determined based on the priority of the data and whether the CSI is transmitted, and the CSI may be transmitted in a format of a medium access control (MAC) control element. The QoS information may indicate that a transmission of the PSSCH including the CSI has a higher priority than transmissions of other PSSCHs not including the CSI, and a preset value may be used as the priority of the CSI.

According to an embodiment of the disclosure, in a second terminal, the UE processor 2302 may perform control to transmit a channel state information (CSI)-reference signal (RS) to the first terminal via the transceiver, receive a physical sidelink control channel (PSCCH) including sidelink control information (SCI) from the first UE via the transceiver, and receive a physical sidelink shared channel (PSSCH) including the CSI and data based on the SCI from the first UE via the transceiver. The SCI includes quality of service (QOS) information and mapping information about the CSI and data, and the QoS information may be determined based on whether the CSI is transmitted through the PSSCH. In addition, the QoS includes a priority value, the priority may be determined based on the priority of the data and whether the CSI is transmitted, and the CSI may be received in a format of a medium access control (MAC) control element. The QoS information may indicate that a transmission of the PSSCH including the CSI has a higher priority than transmissions of other PSSCHs not including the CSI, and a preset value may be used as the priority of the CSI.

FIG. 24 is a block diagram illustrating an internal structure of a base station according to an embodiment of the disclosure. As shown in FIG. 24, the base station of the disclosure may include a base station receiver 2401, a base station transmitter 2405, and a base station processor 2403. The base station receiver 2401 and the base station transmitter 2405 may be collectively referred to as a transceiver in an embodiment of the disclosure. The transceiver may transmit/receive a signal to/from the UE. The signal may include control information and data. To this end, the transceiver may include an RF transmitter for up-converting and amplifying a frequency of a transmitted signal, and an RF receiver for low-noise amplifying a received signal and down-converting the frequency thereof. In addition, the transceiver may receive a signal through a radio channel and output the received signal to the base station processor 2403, and transmit a signal output from the UE processor 2403 through a radio channel. The base station processor 2403 may control a series of processes so that the base station performing the sidelink operation may operate according to the above-described embodiment of the disclosure. For example, a base station or a road side unit (RSU) may perform an operation of a transmission UE or a reception UE in sidelink communication, and in this case, the structure of the base station and the RSU may have the structure of FIG. 24.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. Further, other variants of the embodiments, based on the technical idea of the embodiments, may be implemented in LTE systems, 5G systems, and the like.

ABSTRACT

The present disclosure relates to a communication technique for converging an IoT technology with a 5G communication system for supporting a higher data transfer rate beyond the 4G system, and a system therefor. The present disclosure may be applied to intelligent services (for example, smart homes, smart buildings, smart cities, smart cars or connected cars, health care, digital education, retail, security and safety related services, etc.) on the basis of 5G communication technologies and IoT-related technologies. Further, the present disclosure may be applied to a method and apparatus for transmitting/receiving channel state information in a communication system.

The invention claimed is:

1. A method performed by a first terminal in a wireless communication system, the method comprising:
   obtaining channel state information (CSI);
   transmitting sidelink control information (SCI) to a second terminal on a physical sidelink control channel (PSCCH); and
   transmitting, to the second terminal on a physical sidelink shared channel (PSSCH), a medium access control (MAC) control element (CE) including the CSI,
   wherein a preset value is used as a priority of the MAC CE including the CSI, and
   wherein the SCI includes priority information determined based on the preset value.

2. The method of claim 1,
   wherein data received from a higher layer of the first terminal is transmitted to the second terminal through the PSSCH together with the MAC CE including the CSI,
   wherein the SCI includes scheduling information for the data and the MAC CE, and
   wherein the priority information is determined based on a priority of the data and the preset value.

3. The method of claim 1, wherein a transmission of the MAC CE including the CSI has a higher priority than a transmission of data not including the CSI.

4. The method of claim 1,
   wherein a lowest value is used as the preset value for the MAC CE including the CSI.

5. A first terminal of a wireless communication system, the first terminal comprising:
   a transceiver; and
   a controller configured to:
      obtain channel state information (CSI),
      transmit sidelink control information (SCI) to a second terminal on a physical sidelink control channel (PSCCH), and
      transmit, to the second terminal on a physical sidelink shared channel (PSSCH), a medium access control (MAC) control element (CE) including the CSI,
   wherein a preset value is used as a priority of the MAC CE including the CSI, and
   wherein the SCI includes priority information determined based on the preset value.

6. The first terminal of claim 5,
   wherein data received from a higher layer of the first terminal is transmitted to the second terminal through the PSSCH together with the MAC CE including the CSI,
   wherein the SCI includes scheduling information for the data and the MAC CE, and
   wherein the priority information is determined based on a priority of the data and the preset value.

7. The first terminal of claim 5, wherein a transmission of the MAC CE including the CSI has a higher priority than a transmission of data not including the CSI.

8. The first terminal of claim 5,
   wherein a lowest value is used as the preset value for the MAC CE including the CSI.

9. A method performed by a second terminal in a wireless communication system, the method comprising:
- transmitting a channel state information (CSI)-reference signal (RS) to a first terminal;
- receiving sidelink control information (SCI) from the first terminal on a physical sidelink control channel (PSCCH); and
- receiving, from the first terminal on a physical sidelink shared channel (PSSCH), a medium access control (MAC) control element (CE) including the CSI, based on the SCI,
- wherein a preset value is used as a priority of the MAC CE including the CSI, and
- wherein the SCI includes priority information determined based on the preset value.

10. The method of claim 9, wherein data received from a higher layer of the first terminal is transmitted to the second terminal through the PSSCH together with the MAC CE including the CSI,
- wherein the SCI includes scheduling information for the data and the MAC CE, and
- wherein the priority information is determined based on a priority of the data and the preset value.

11. The method of claim 9, wherein a transmission of the MAC CE including the CSI has a higher priority than a transmission of data not including the CSI.

12. The method of claim 9,
- wherein a lowest value is used as the preset value for the MAC CE including the CSI.

13. A second terminal of a wireless communication system, the second terminal comprising:
- a transceiver; and
- a controller configured to:
  - transmit a channel state information (CSI)-reference signal (RS) to a first terminal via the transceiver,
  - receive sidelink control information (SCI) from the first terminal on a physical sidelink control channel (PSCCH), and
  - receive, from the first terminal on a physical sidelink shared channel (PSSCH), a medium access control (MAC) control element (CE) including the CSI, based on the SCI,
- wherein a preset value is used as a priority of the MAC CE including the CSI, and
- wherein the SCI includes priority information determined based on the preset value.

14. The second terminal of claim 13, wherein data received from a higher layer of the first terminal is transmitted to the second terminal through the PSSCH together with the MAC CE including the CSI,
- wherein the SCI includes scheduling information for the data and the MAC CE, and
- wherein the priority information is determined based on a priority of the data and the preset value.

15. The second terminal of claim 13,
- wherein a transmission of the MAC CE including the CSI has a higher priority than a transmission of data not including the CSI.

16. The second terminal of claim 13,
- wherein a lowest value is used as the preset value for the MAC CE including the CSI.

* * * * *